(12) United States Patent
Gallus

(10) Patent No.: US 6,301,905 B1
(45) Date of Patent: Oct. 16, 2001

(54) TROUGH CONSTRUCTION

(76) Inventor: Timothy D. Gallus, 35 Leebarry La., Las Cruces, NM (US) 88012

(*) Notice: Subject to any disclaimer, the term of this patent is extended or adjusted under 35 U.S.C. 154(b) by 0 days.

(21) Appl. No.: 09/535,292

(22) Filed: Mar. 24, 2000

Related U.S. Application Data

(63) Continuation-in-part of application No. 09/276,987, filed on Mar. 26, 1999, and a continuation-in-part of application No. 09/277,004, filed on Mar. 26, 1999, and a continuation-in-part of application No. 09/277,289, filed on Mar. 26, 1999, and a continuation-in-part of application No. 09/277,505, filed on Mar. 26, 1999.

(51) Int. Cl.$^7$ .............................. F25D 17/02; B65B 55/00
(52) U.S. Cl. ............................... 62/64; 62/376; 426/405; 426/412
(58) Field of Search .................... 62/63, 64, 373, 62/374, 375, 376; 432/124; 426/405, 412; 99/483

(56) References Cited

U.S. PATENT DOCUMENTS

| | | | | |
|---|---|---|---|---|
| 2,942,429 | * | 6/1960 | Van Dolah et al. | 62/375 |
| 3,426,546 | * | 2/1969 | Crane | 62/375 |
| 3,966,980 | | 6/1976 | McGuckian | 426/393 |
| 4,306,857 | | 12/1981 | Hofstetter et al. | 432/121 |
| 4,384,463 | | 5/1983 | Rica et al. | 62/374 |
| 4,384,849 | * | 5/1983 | Marchetti | 432/197 |
| 4,385,035 | | 5/1983 | Akitoshi et al. | 422/297 |
| 4,403,479 | | 9/1983 | Rasovich | 62/63 |
| 4,437,315 | | 3/1984 | Rica et al. | 62/63 |
| 4,457,702 | | 7/1984 | Marchetti | 432/11 |
| 4,505,670 | | 3/1985 | Silvestrini et al. | 432/124 |
| 4,565,452 | | 1/1986 | Wild | 366/149 |
| 4,619,191 | | 10/1986 | Dumas et al. | 99/483 |
| 4,627,224 | | 12/1986 | Hamamoto et al. | 53/502 |
| 4,702,161 | | 10/1987 | Andersen | 99/470 |
| 4,858,445 | | 8/1989 | Rasovich | 62/374 |
| 4,929,459 | | 5/1990 | Silvestrini | 426/399 |
| 5,009,150 | | 4/1991 | Andersen | 99/360 |
| 5,243,833 | | 9/1993 | Coelho et al. | 62/376 |
| 5,259,212 | | 11/1993 | Engler | 62/266 |
| 5,351,495 | | 10/1994 | Lermuzeaux | 62/63 |
| 5,370,174 | | 12/1994 | Silvestrini et al. | 165/2 |
| 5,374,435 | | 12/1994 | Silvestrini et al. | 426/231 |
| 5,377,492 | | 1/1995 | Robertson et al. | 62/63 |
| 5,417,074 | | 5/1995 | McAfee et al. | 62/63 |
| 5,456,091 | * | 10/1995 | Zittel | 62/375 |
| 5,494,691 | | 2/1996 | Sizer | 426/392 |
| 5,555,702 | | 9/1996 | Sizer | 53/127 |
| 5,606,861 | * | 3/1997 | Renz | 62/63 |
| 5,630,327 | | 5/1997 | Kiczek et al. | 62/374 |
| 5,644,977 | | 7/1997 | Rodriguez | 99/517 |
| 5,766,002 | | 6/1998 | Silvestrini | 432/121 |
| 5,809,787 | | 9/1998 | Zittel | 62/63 |
| 6,073,540 | * | 6/2000 | Garrett | 99/330 |

\* cited by examiner

*Primary Examiner*—William C. Doerrler
(74) *Attorney, Agent, or Firm*—Andrea L. Mays

(57) ABSTRACT

A trough construction including a trough along which water is propelled to convey bagged product therealong. A plurality of nozzles jet-spray cooling or heating water onto the product as it is conveyed along the trough. The nozzles are oriented in opposing first and second series so as to impart a rotation on the bagged product generally about a longitudinal axis of the trough. According to one embodiment, a first suction tube having openings through the trough wall is opposite to the first series of nozzles and with a first pump forms a first fluid circuit. Similarly, a second suction tube with suction openings, together with a second pump and the second series form a second fluid circuit. The two fluid circuits keep the bags centered in the trough, surrounded by cooling or heating water. According to a second embodiment, the trough is positioned in a sump and has trough openings so that the water in the trough communicates with that in the sump, and the suction tubes are not used.

72 Claims, 35 Drawing Sheets

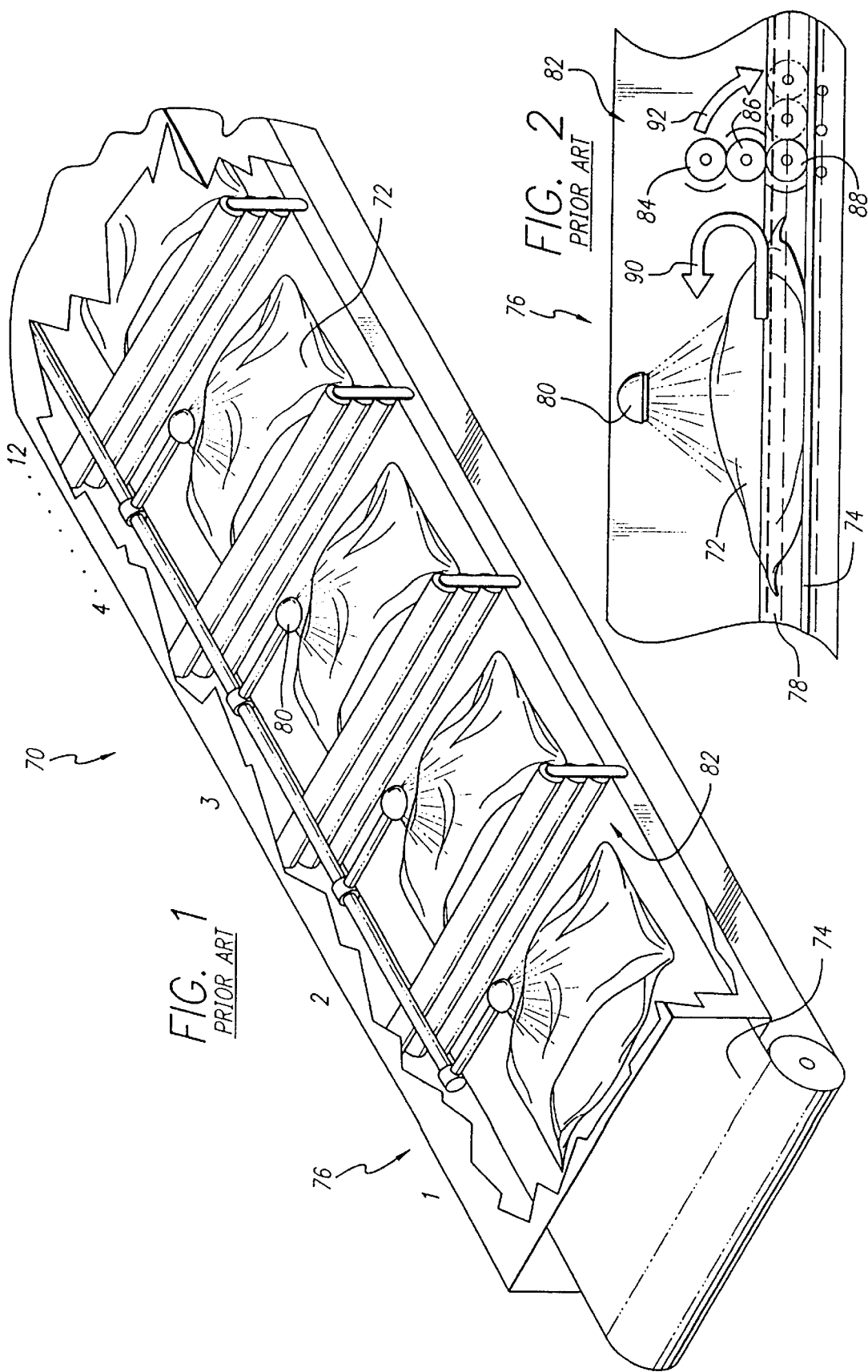

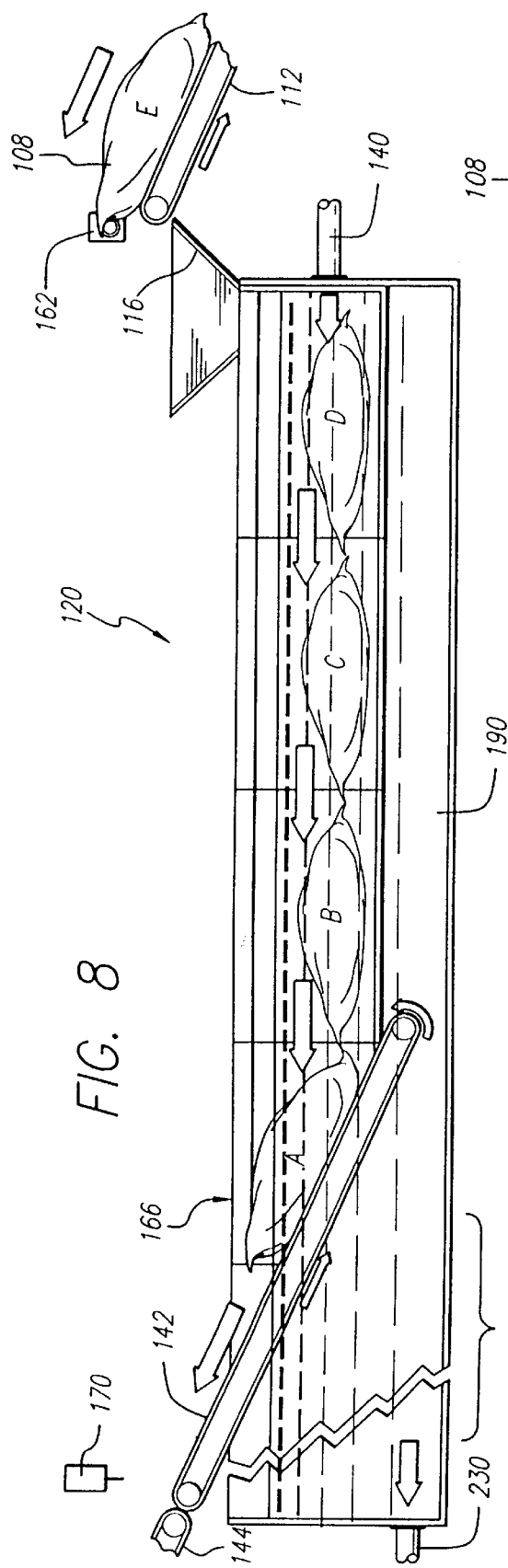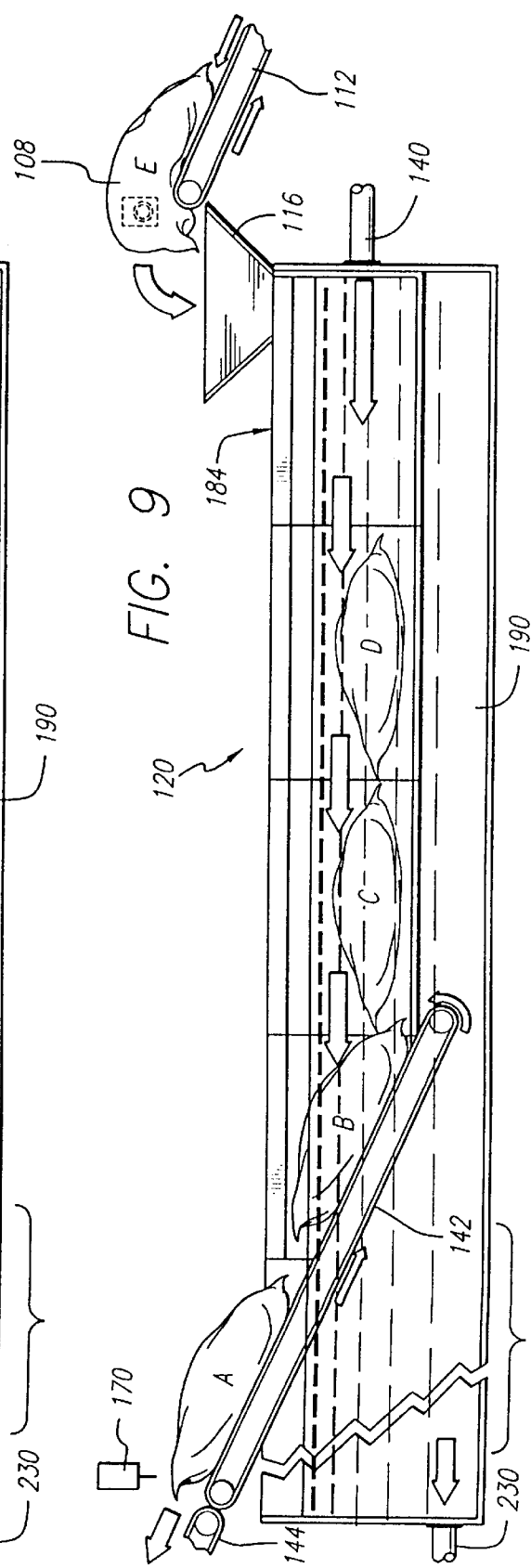

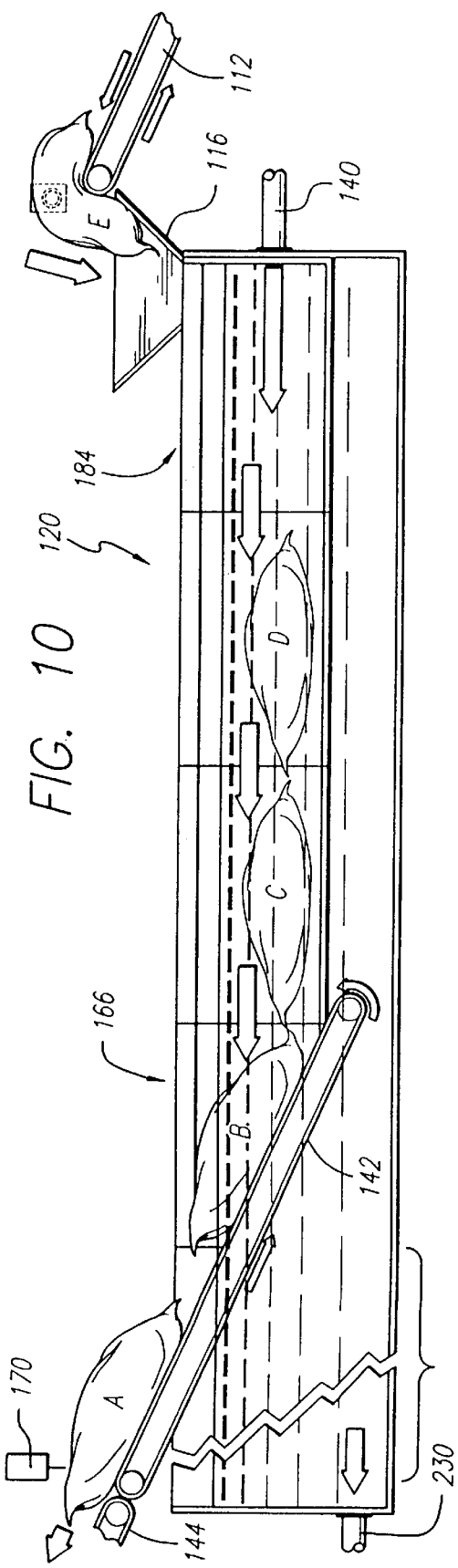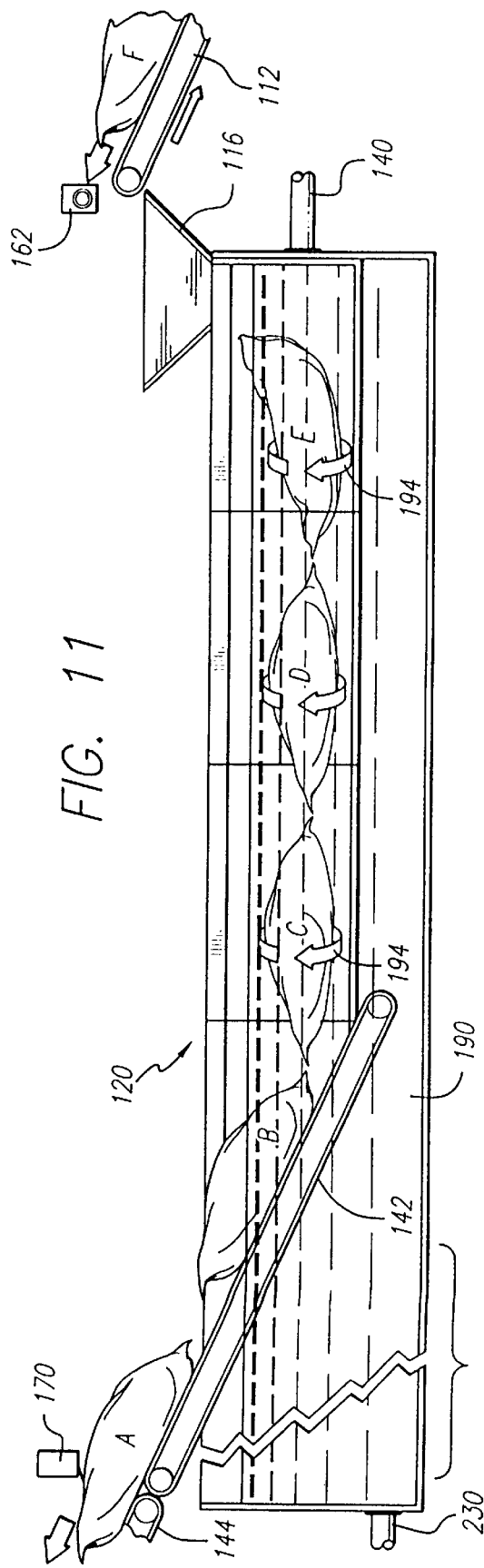

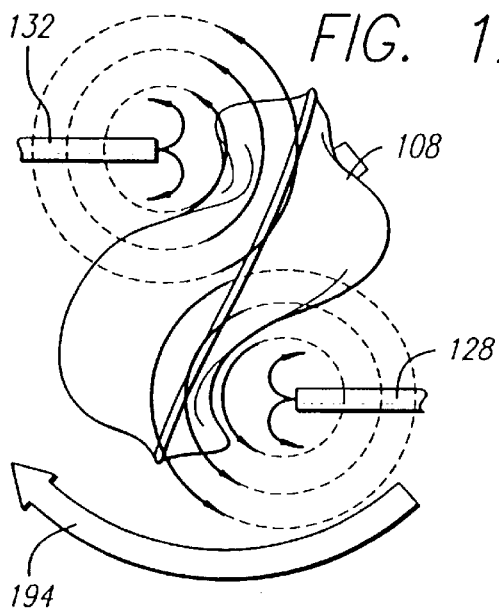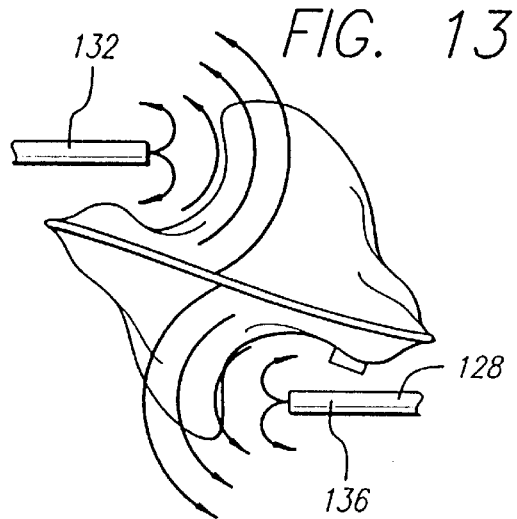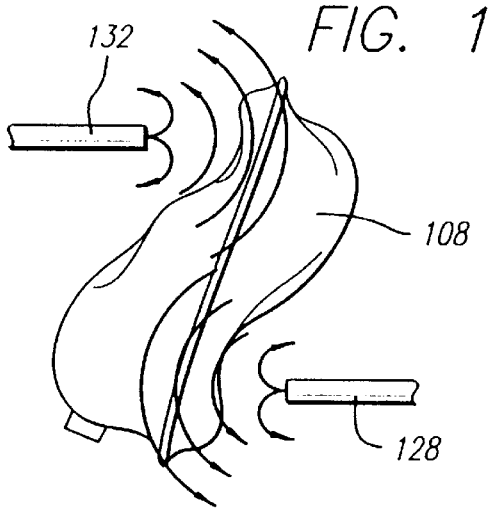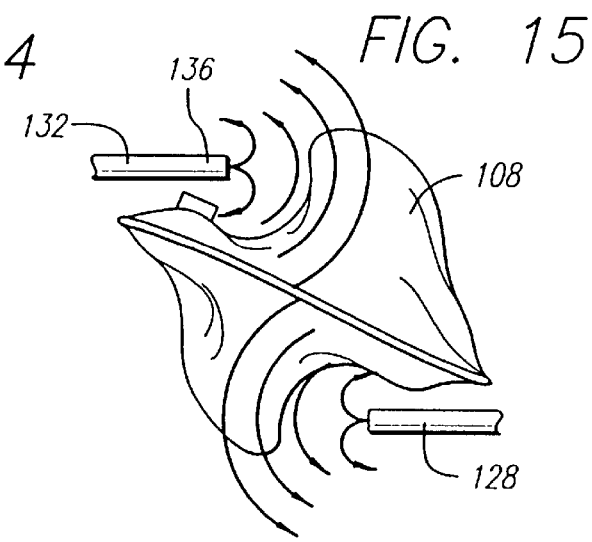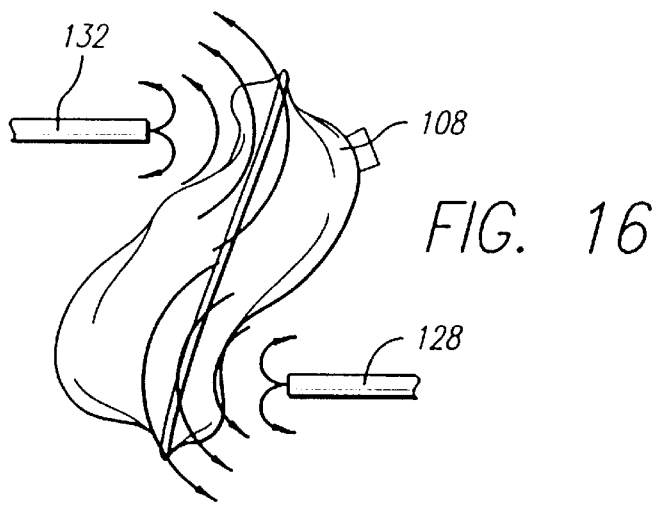

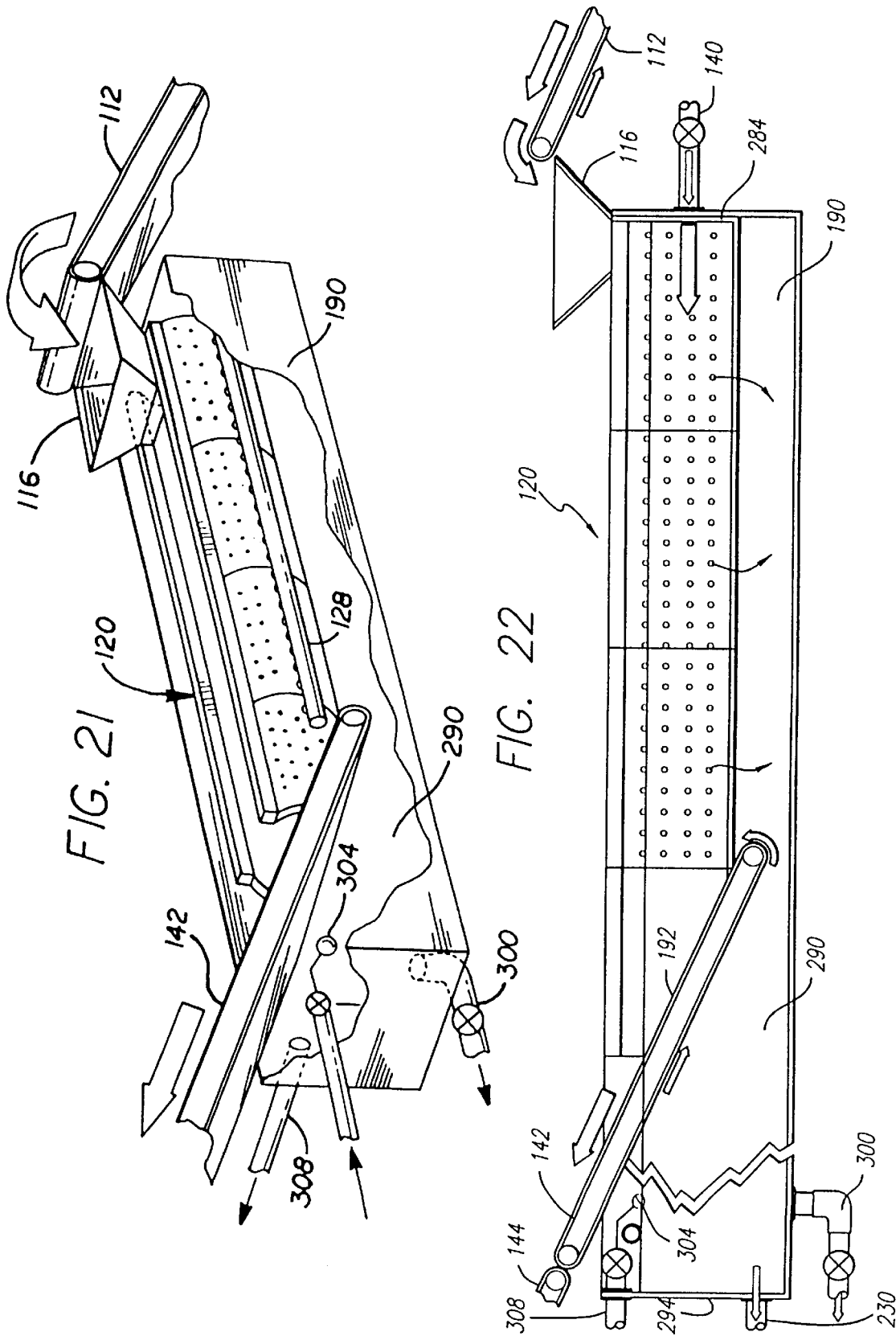

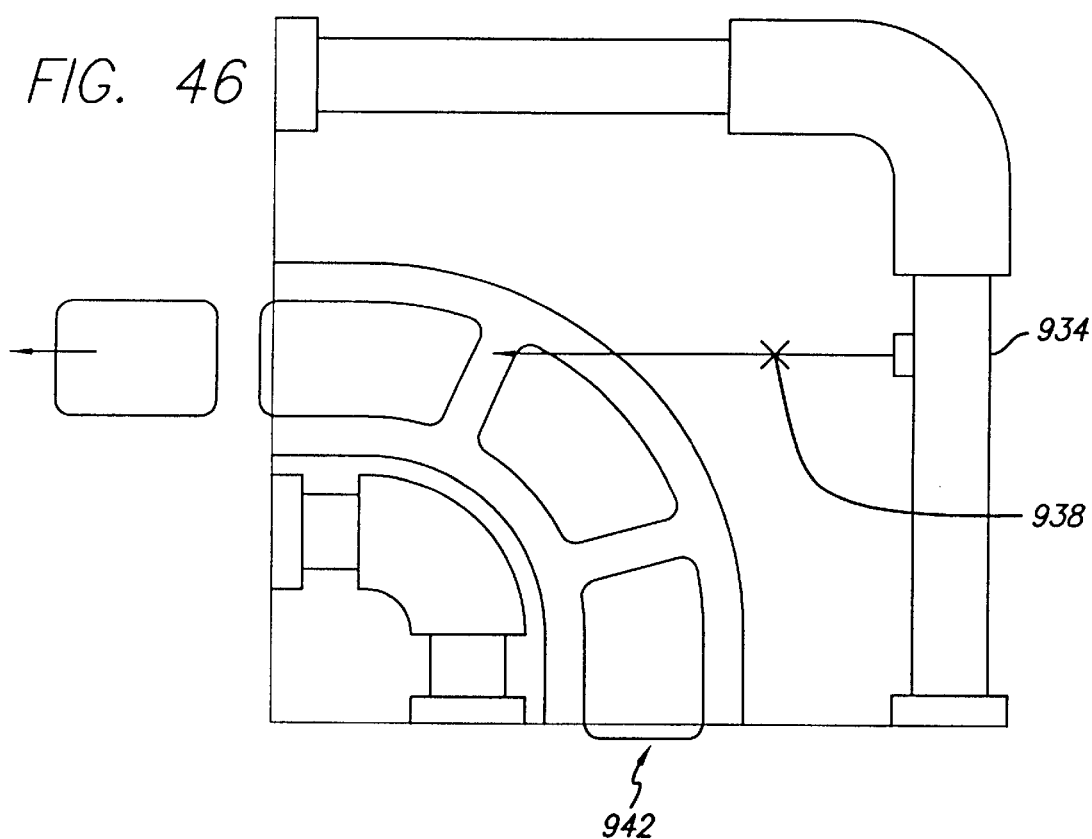
FIG. 46
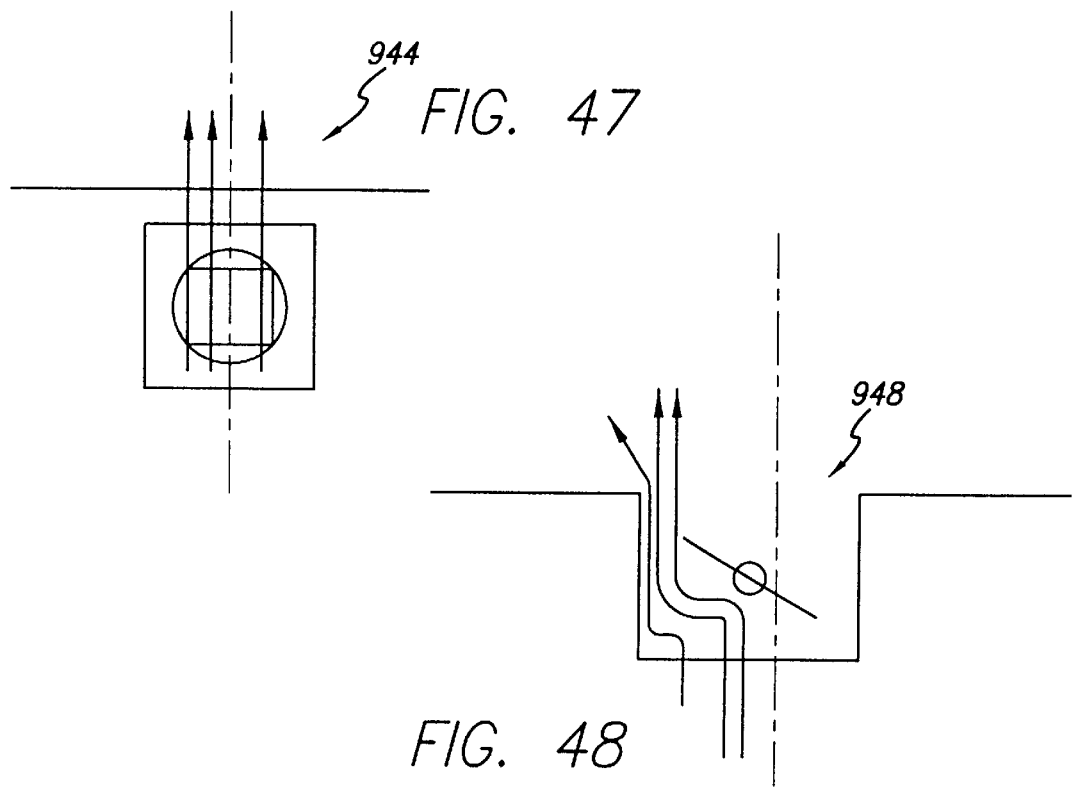
FIG. 47
FIG. 48

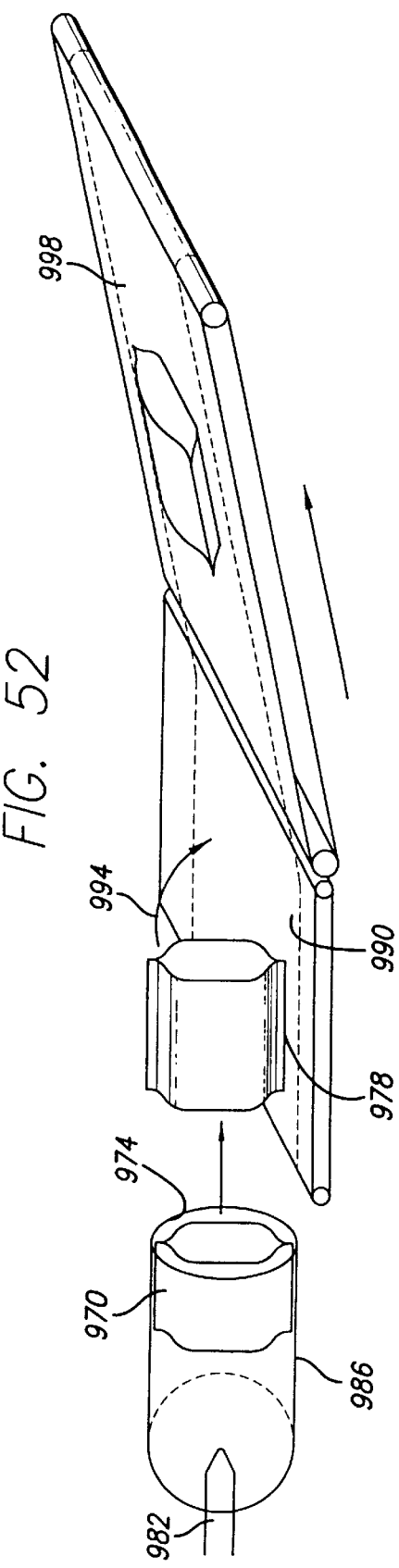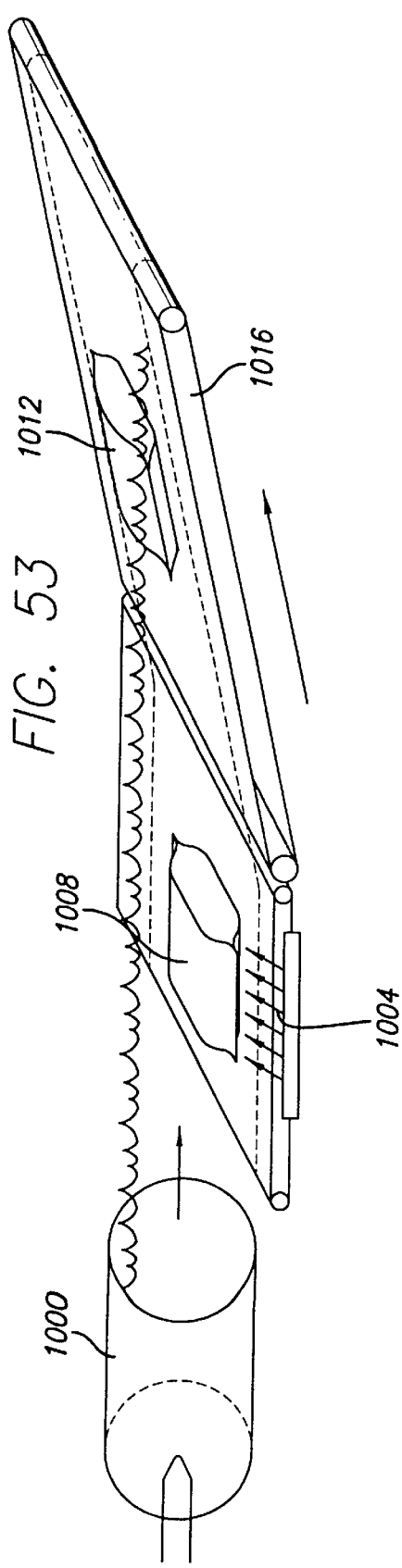

TROUGH CONSTRUCTION

CROSS-REFERENCE TO RELATED APPLICATIONS

This is a continuation-in-part of copending applications Ser. Nos. 09/276,987, 09/277,004, 09/277,289, and 09/277,505, each filed on Mar. 26, 1999. The entire contents of each of these applications are hereby incorporated by reference.

BACKGROUND OF THE INVENTION

Many foodstuffs today, such as tomato paste, orange juice, crushed pineapple and diced tomatoes, are cooked and filled hot into flexible bags. The containers with the heated product (foodstuffs) must then be cooled for subsequent handling and storage.

An example of a system of the prior art for cooling contents of flexible bags is shown in FIG. 1 generally at 70. Referring thereto, the bags 72 enter the open-plastic belt conveyor 74 at one end into a first cooling station as shown generally at 76. Station 76 is shown in isolation in FIG. 2. The bag 72 is in a bath 78 of cooling water up to about its mid point. Overhead sprayers 80 spray cooling water on the tops of the bags 72. The bag 72 is conveyed by the mechanical action of the conveyor 74 to a gate 82 at the forward end of the station.

The gate 82 is formed by three stacked, upwardly rolling rollers 84, 86, 88. The actions of the conveyor 74 and the rollers 84, 86, 88 cause the bag 72 to rotate or turn over, as shown by arrow 90, about an axis generally perpendicular to the travel direction of the conveyor 74 to thereby partially mix the bag contents and to expose the bottom surface of the bag to the cooling water from the sprayers 80. The gate 82 is then pivoted down as shown by arrow 92, and the bags 72 are conveyed together to the next station for a subsequent cooling process, and so forth through the twelve or so stations.

There are a number of problems with the prior art system 70. One is that the overall process of system 70 is slow. It takes about forty minutes to cool the contents of the bag 72 from two hundred degrees down to below one hundred and twenty degrees Fahrenheit. Another problem is that the bags 72, and particularly when they are underfilled, occasionally get caught in the rollers 84, 86, 88 and break, spilling their contents. A further disadvantage of the prior art system 70 is that it occupies a large amount of floor space since it is approximately seventy feet long.

Other systems for cooling or heating the contents of flexible containers are shown in the following U.S. Pat. Nos.: 4,384,463 (Rica et al.), U.S. Pat. No. 5,009,150 (Andersen) and U.S. Pat. No. 5,370,174 (Silverstrini et al.). The contents of each of these patents and all other patents mentioned in this disclosure are hereby incorporated by reference in their entireties.

Examples of trough and product conveyor constructions known in the prior art are disclosed in the following U.S. Pat. Nos.: 5,377,492 (Robertson et al.), U.S. Pat. No. 5,809,787 (Zittel), U.S. Pat. No. 5,417,074 (McAfee et al.), U.S. Pat. No. 5,351,495 (Lermuzeaux), U.S. Pat. No. 5,269,212 (Engler), U.S. Pat. No. 4,858,445 (Rasovich), U.S. Pat. No. 5,630,327 (Kiczek et al.), and U.S. Pat. No. 4,403,479 (Rasovich).

SUMMARY OF THE INVENTION

Accordingly, the present invention is directed to trough constructions. A preferred trough construction embodiment includes an elongate trough disposed in a sump structure with the inlet end of the trough secured to an inlet end of the sump structure. The liquid in the trough freely communicates with and is at the same level as the sump structure. The bottom of the trough is about one foot above the bottom of the sump structure. The outlet end of the trough is spaced a distance from the outlet end of the sump structure. A take-out conveyor conveys objects, such as flexible bags containing flowable liquid or semi-liquid product, from the outlet end of the trough up and out of the sump structure.

First and second series of nozzles are positioned along opposite sides of the trough and inject liquid laterally into the trough. They preferably direct the liquid into the liquid in the trough and below the liquid level. According to a preferred embodiment one series of nozzles is spaced above the other, thereby imparting a rotating motion on the conveyed objects about an axis generally parallel to the longitudinal trough axis, that is along the conveyance path. Liquid is injected into the inlet end of the trough to convey the objects along the conveyance path to the take-out conveyor. A bypass valve alternately directs the liquid to the inlet end (to convey the objects along the trough) and to the nozzles (to rotate the objects as they are conveyed down the trough).

The present invention is also concerned with providing an efficient means for cooling (and/or heating) contents of flexible containers or bags. The bags with their hot contents are dropped into an infeed end of a trough containing cooling water. The bags are advanced from one station to the next in the trough by the periodic actuation of a fluid jet conveyor at the inlet end of the trough, as mentioned in the paragraph above. After the bags are advanced to their respective next stations, the fluid jet conveyor is turned off and the fluid nozzle system is turned on.

The fluid nozzle system includes a first series of nozzles on one side of the trough and directed into the trough and a second series of nozzles on the other side of the trough and similarly directed into the trough. The first series of nozzles are disposed in a horizontal plane spaced about four inches above the horizontal plane of the second series of nozzles. Thus, when the bag reaches the next station and the nozzle system is turned on, the water from about the five or so nozzles of the first series impinge against the adjacent side of the bag about two inches above the midline of the bag, and the water from the five or so nozzles of the second series impinge on the opposite side of the bag, about two inches below the midline of the bag.

The two sets of opposing and offset nozzles have two actions on the bag. First, they impinge and push in on the side of the bag, about twelve inches, for example, on each side. This "massaging" action causes the central contents of the bag to move away from the center of the bag and towards the side of the bag thereby promoting the transfer of heat from the central contents of the bag to the cooling water at the surface of the bag. Second, they cause the bags to rotate about an axis generally parallel to the axis of the trough. This rotation motion in the bath of cool water in the trough also assists in the cooling of the bag's contents. It is additionally within the scope of the invention to orient the nozzles so that the bag is rotated in a clockwise direction at one station and an opposite counterclockwise direction at a next station in the trough.

The bags generally abut one another end-to-end as they travel from station to station in the trough of the present system, and no gates or other structures separates them from the adjacent bags. The movement of the bags into, along and out of the trough is now described with respective bags in the three active stations in the trough and one in the ramped station ("dead zone") at the exit end of the trough and with the offset nozzle system on. A detector at an infeed station above the trough input end detects the arrival of a hot filled bag. When this is detected the flow of the cooling water is switched from the offset nozzle system to the fluid jet conveyor and the first extraction conveyor is turned on. The bag at the ramped station is pushed onto the first extraction conveyor and conveyed away on it. The three bags in the trough move to their respective next stations by the action of the fluid jet conveyor. A detector generally at the outlet end of the extraction conveyor detects the arrival of the extraction bag and turns the first extraction conveyor off.

The first infeed station is then empty, and the hot filled bag detected by the infeed station detector slides down into the first infeed station. Thus, bags are now in the three active stations and in the ramped station. The bag at the ramped station advantageously acts as a plug or a soft gate, blocking the further advancement of the bags relative to the trough. The infeed station detector detects that no hot filled bag is at or nearly at the infeed station, and causes the cooling water to switch and flow to the nozzle system and not the fluid jet conveyor. The three bags in the three active stations are thereby massaged and rotated. When the infeed station detector detects the arrival of another hot filled bag, the process starts again.

A centrifugal pump pumps the cooling (or heating) fluid (water) from a cooling tower to a butterfly valve, which directs the fluid flow to either the fluid nozzle system or the fluid jet conveyor. A bleed tube at the exposed eye of the impeller bleeds air out of the pump. The "exposed eye" is defined when the impeller center can be seen when looking down the suction line in the direction of liquid flow. U.S. Pat. No. 4,981,413 calls it the "center of the pump impeller." (In contrast, see U.S. Pat. No. 3,575,521.) A low pressure check valve prevents air from being sucked into the pump through the bleed tube. Bleeding the pockets of air in the pump prevents the pump from losing its prime.

This pump arrangement invention, in addition to being used in the present heating/cooling environment, can be used aboard ships where the pump suction may become exposed in a rolling sea. It can be used generally in any application where the supply level is difficult to control and the pump loses its prime when air gets into the suction line.

An exemplary method for retrofitting such a pump in accordance with the present invention first disassembles the suction line from the pump. The bleed assembly is then attached to the pump. If the pump has a threaded housing, a threaded style bleeder is preferably used and screwed into place. On the other hand, if the pump has a flange face then a flanged bleeder or a threaded bleeder with a flange adapter can be used. Next, the bleeder line is extended to be as close as possible without actually touching the impeller. The suction line is then reattached (replumbing to shorten the suction line will probably be needed due to the space occupied by the bleeder). The outlet from the check valve to a drain may need to be plumbed. The bleed assembly's operation is then checked by starting the pump, introducing air into the pump so that it loses its prime, stopping air introduction and making sure the pump "burps" the air bubble through the bleeder and regains its prime.

Instead of cooling the contents of a flexible bag, it is also within the scope of the invention to heat the bag contents. More specifically, a large flexible bag is filled with unsterile product. The bag is sealed (or otherwise closed), and the (sealed) bag is loaded into a trough similar to that in the above-described cooling invention system. However, hot water is used instead of cool or cold water for both the fluid jet conveyor and the fluid nozzle system. The hot water from the nozzles impinges on opposite sides of the bag, massaging it and moving its central contents towards the surface or skin of the bag. The bag is also thereby rotated. The heating is done quickly before the bag contents turn to mush, as would happen if the slower prior art system 70 used ambient product and hot water. Cooling can be performed, and the bags can then be boxed, providing a very economical replacement for cans. Small bags at a slow production rate can be handpacked in boxes. However, at faster rates and/or larger bags, automatic case packers, such as are currently available from FMC, Hayssen and Scholle, can be used.

Also disclosed herein is a novel nozzle assembly useful in the heating and cooling systems of this invention for heating or cooling contents of flexible containers and in other applications where a focused fluid flow is desirable as would be apparent to those skilled in the art. The nozzle assembly includes a nozzle unit, a first sleeve, a second sleeve and a clamp. The nozzle unit has an aft collar and an inner fluid contact surface. The surface tapers gradually to increase the velocity of fluid flowing therethrough about ten fold. Additionally, the elastomeric lining of the inner surface acts like an interior "skin" preventing turbulence from feeding back or building up on itself and thereby increasing the fluid power delivered by the nozzle assembly. The first sleeve has a first rear fitting, and the second sleeve has a second forward fitting. The clamp encircles the first and second fittings, holding them together with the collar sandwiched between them.

Accordingly, another way to define the present invention is that the shape and movement of the flexible bags are carefully controlled to maximize the heat transfer to the contents of the bags to quickly, efficiently and thoroughly heat or cool the contents. This is preferably done using water jets, but other means such as mechanical means including rollers, as would be apparent to those skilled in the art from this disclosure are also included herein. One way to adjust the shape and movement is to massage or otherwise manipulate the bags to move the central contents of the products therein towards the bag surface or skin. This can be done by opposing but offset forces on the bag. The action of the massaging (or offset forces) can also be done with a force on the bags causing them to rotate, preferably in a bath of heating or cooling fluid.

A further definition of the invention is the use of the heating or cooling fluid (e.g., liquid and specifically water) as the heat transfer medium for heating or cooling the contents of the flexible containers and also as the means for changing the shape and/or movement of the flexible containers to improve the heat transfer to their contents. The fluid thereby serves two functions. The fluid additionally can serve as the motive force (a third function) for moving the containers from one work station to the next.

The invention can thus be used to heat and/or cool contents of flexible containers. One embodiment fills the bags with hot product, closes the bags and then cools them pursuant to this invention. Another embodiment fills the bags with product at a cold or ambient temperature, closes the bags and then heats them pursuant to this invention. And a preferred way to close them is to seal them shut. The bags with heated product can then be cooled using a system of this invention. Alternatively, they can be cooled by other means as would be apparent to those skilled in the art.

In other words, disclosed herein is a fluid conveyor jet which moves flexible containers or bags along a trough from one station to the next in the trough in a process which efficiently heats or cools the contents of the containers. Side fluid jets positioned along opposite sides of the trough direct heating or cooling fluid (water) on the flexible containers at the stations. They direct the fluid generally in spaced horizontal planes on the flexible containers therebetween causing (1) the central contents of the containers to move away from central areas of the container towards the sides to promote temperature transfer between the contents and cooling or heating fluid from the fluid jet conveyor and the fluid jets and (2) the containers to rotate generally about axes parallel to a longitudinal axis of the trough also helping in the cooling or heating process. The side fluid jets are operatively positioned below the waterline of the trough. The fluid conveyor jet and the side fluid jets act alternately whereby the fluid conveyor jet moves the flexible containers from one active station to the next, and at each active station the side fluid jets are activated to massage the central contents towards the skin of the containers and to rotate the containers in the cooling or heating fluid in the trough. Thorough and efficient cooling or heating of product in the flexible containers results.

A system for cooling (or heating) bagged product using cooling (or heating) fluid impacting and bathing the bagged product. The bags are conveyed down a tube or enclosed trough and periodically are stopped at different stations along the tube. A pair of discharge tubes are positioned on opposite sides of the tube, each tube having a series of nozzles projecting into the tube. At each station, both of the series of nozzles jet-spray cooling (or heating) fluid into the tube and against the flexible bag. The two sets of nozzles are offset from one another to thereby impart a rotation motion on the bag, as well as a massaging action, causing the product at the center of the bag to move towards the bag surface, thereby efficiently heating or cooling the product. The cooling or heating water in the tube and surrounding the bag stays with the bag during the bag rotation, providing reduced-friction lubrication with the walls of the tube.

First and second suction lines parallel to the tube have openings into the tube, sucking the heated (or cooled) water away from the bag. The first and second suction lines are positioned diametrically opposite to the first and second series of nozzles, respectively. Thus, the fluid flow is generally from the nozzles of the first series around the outside of the bag in the direction of bag rotation against the tube wall, about one hundred and sixty degrees and out the openings in the first suction line, and similarly from the nozzles of the second series around the outside of the bag in the direction of bag rotation against the tube wall, about one hundred and sixty degrees and out the openings in the second suction line.

A first pump pumps the warmed cooling (or cooled heating) fluid from the first suction line to the first set of nozzles. And a second pump pumps the fluid from the second suction line to the second set of nozzles. The present cooling (or heating) system also includes a means for removing (or adding) heat from (or to) the fluid from the suction lines before pumping it into the discharge tubes. If the bag drifts to the openings in the first suction line the first pump stops or slows and the second set of nozzles push it to the other side of the tube. Thereby, the bag tends to be centered in the tube or oscillate slowly side to side in the tube.

The bagged product conveyance tube in addition to being straight can be angled. For example when angled at ninety degrees, a bypass jet inline with the exit axis helps advance the bags around the corner when signaled to do so.

When the cooled (or heated) bag exits the conveyance tube it is important that it be correctly oriented. This can be done by passing it through an elliptical opening which lays it down oriented or by using fluid jets to orient it centered on the exit conveyor.

The conveyance tube is preferably constructed in sections which are bolted together with an elastomeric gasket sandwiched between opposing mounting faces of adjacent sections. The gaskets have pressure line and suction line openings aligned with the pressure pipes and suction lines.

The timing of the pumps at the different cooling stations can be by any of three methods. A preferred first method is to provide a separate bypass (main bag conveyance) pump which is turned on to advance the bags along the tube. A second method is to use a bypass valve, and a third method is to tap into the outer pressure manifold with a jet assist valve.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of a prior art system for cooling contents of flexible bags, with portions of the system broken away for illustrative purposes;

FIG. 2 is a side elevational view of a station of the prior art system of FIG. 1;

FIG. 8 is a cross-sectional, side elevational view of the trough of the system of FIG. 3 showing a first step in the cooling process of the present invention;

FIG. 9 is a view similar to FIG. 8, showing a second step;

FIG. 10 is a view similar to FIG. 8, showing a third step;

FIG. 11 is a view similar to FIG. 8, showing a fourth step;

FIG. 12 is an enlarged view of one of bags C, D or E of FIG. 11 depicted in isolation for illustrative purposes and showing a first massaging and cooling (or heating) step of the present invention;

FIGS. 13, 14, 15, and 16 are views similar to FIG. 12 and illustrating subsequent massaging and cooling (or heating) steps on the bag through a rotation of the bag;

FIG. 21 is a front perspective view of the trough of the system of FIG. 3 illustrating the fluid flow system;

FIG. 22 is a side elevational cross-sectional view of the trough of FIG. 21;

FIG. 45 is a time line showing a first method of timing of the pumps;

FIG. 46 shows a third conveying method;

FIG. 47 shows a ball valve action in any design of this invention;

FIG. 48 shows a butterfly valve action in any design;

FIG. 52 is a perspective view of a first bag orientation exit system of the invention;

FIG. 53 is a perspective view of a second bag orientation exit system;

DETAILED DESCRIPTION OF PREFERRED EMBODIMENTS OF THE INVENTION

Figure 3:
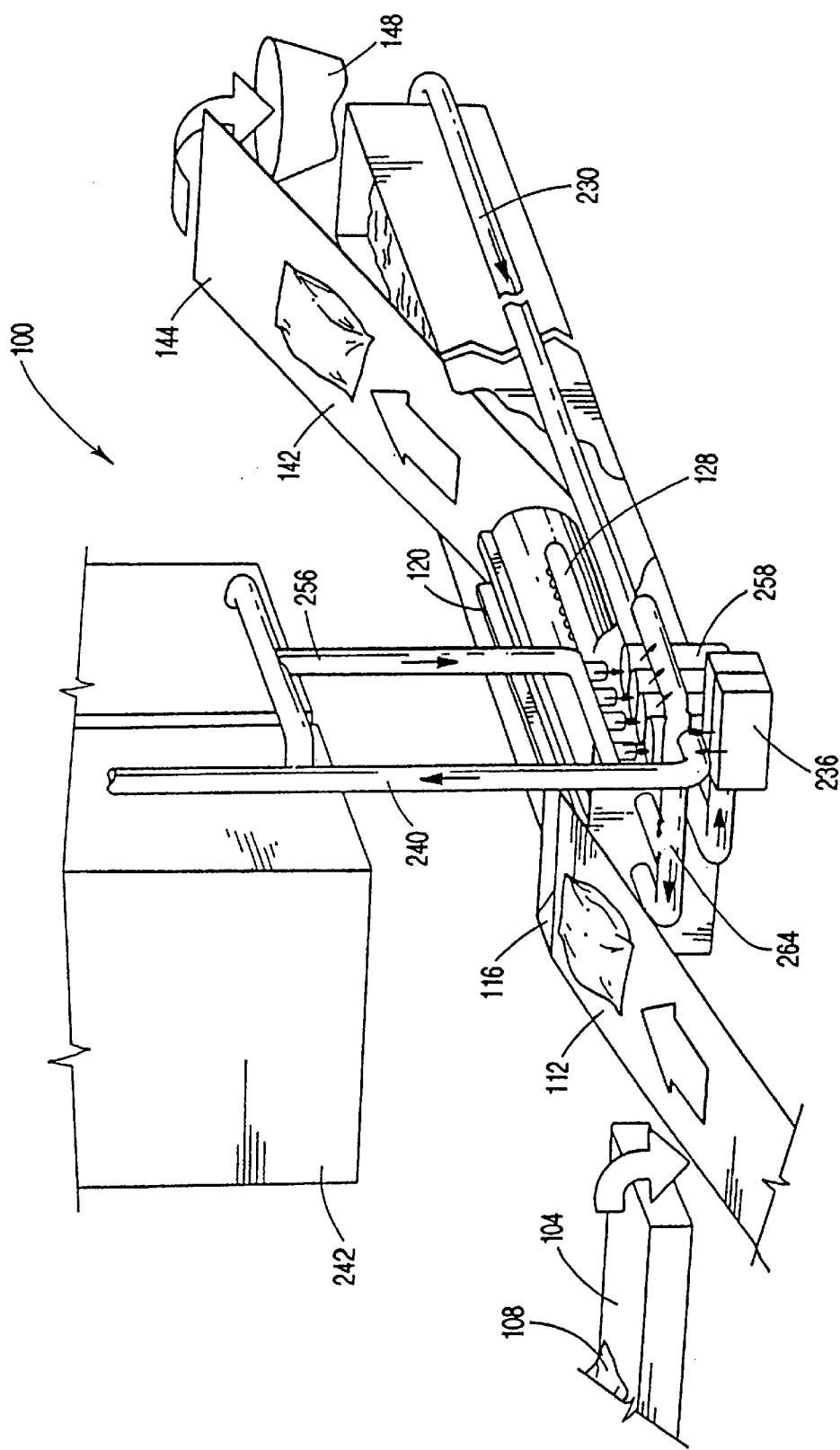
FIG. 3 is a rear perspective view of a system of the present invention for cooling (or heating) contents of flexible bags.

A system of the present invention for heating or cooling flexible containers or bags is illustrated in the drawings at FIGS. 3–7 generally at 100. Referring thereto the bags are filled with the hot product at the fill table depicted generally at 104. The filled bags 108 are dropped one by one onto an infeed conveyor 112 where they are slowly conveyed to an infeed slide 116. They drop from the infeed slide 116 into a horizontal cooling (or heating) trough 120. Briefly, in the cooling trough 120, the bags 108 are acted upon by two fluid systems. The first is a nozzle system shown generally at 124, which includes two manifolds or pipes 128 and 132, each on an opposite side of the cooling trough 120 and each having a series of spaced nozzles 136 along its length. (The construction of the nozzles 136 is shown in greater detail in FIGS. 26–28.) Although the pipes 128 and 132 are preferably both horizontal and their nozzles 136 are horizontally disposed, the pipes are positioned in different horizontal planes, that is, offset vertically from one another.

The other fluid system is a fluid jet conveyor 140 at the inlet end of the cooling trough 120 and which conveys the filled bags 108 to the outlet end of the trough. At the outlet end, the cooled bags 108 are picked up by a first discharge conveyor 142. The first discharge conveyor 142 conveys the bags 108 to a second discharge conveyor 144, which in turn conveys them to its bag drop end where they drop into a fifty-five gallon drum 148. An air drying area is positioned at adjacent ends of first and second discharge conveyors 142, 144. An air blower motor 149 (FIG. 25) supplies about two psi air at high volumes to air knives that blow the water off of the bags 108 in this air drying area. The motor 149 can be a ten horsepower regenerative type blower. An optional (photoeye) detector 150 (FIG. 24) for bag drop safety and accumulation can be provided at the top of the second discharge conveyor 144.

The travel time of fifty-five gallon bags 108 in system 100 is thirteen to fifteen minutes (eight minutes hold, plus five minutes cooling, plus one minute conveying) from the fill table 104 to the fifty-five gallon drum 148. The time variation is caused by the accumulation of bags on the discharge conveyors 142, 144. The time from the infeed slide 116 to the discharge conveyor 142 is only five to seven minutes.

Figure 24:
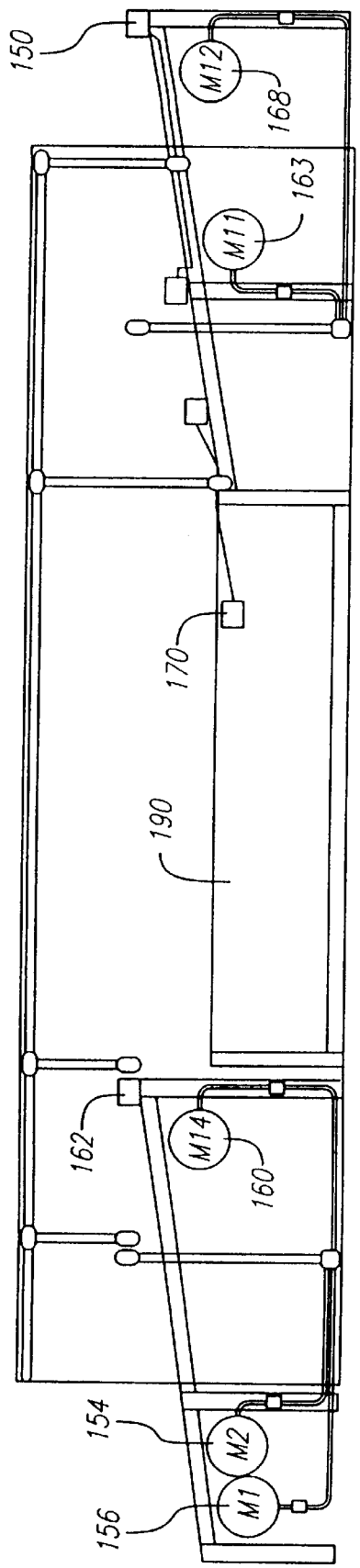
FIG. 24 is a side elevational view of the motor/pump arrangement of the system of FIG. 3, inside the cargo container.

The fill table 104 is a short conveyor having a motor 154 mounted on weigh cells with a robotic decapper/filler/recapper positioned above, as is known in the prior art. Fill table 104 includes a motor 156 as depicted in FIG. 24. The operator places a bag into the device, the cap is automatically removed from the bag and the fill spout is inserted. The fill sequence continues until the correct weight of product has entered the bag. At that time, the filling is stopped, the spout removed, and the bag is recapped and released. A lighted button advises the operator that the bag 108 is ready to be advanced to the infeed or hold conveyor 112. The operator pushes a button causing a short conveyor to roll the bag 108 face down onto the hold conveyor 112. The face down/fitment down orientation causes the fitment to heat to a sterilization temperature as it travels slowly up the conveyor 112.

When a hot filled bag (E) slowly arrives at the top of the conveyor 112 (which is driven by motor 160), as shown in FIG. 8, the following sequence is initiated. The arrival is detected by a detector 162, which through a computer 164 (FIG. 23) causes the flow of the cooling fluid (cold water) to be switched by a butterfly bypass valve 165 from the nozzle system 124 to the fluid jet conveyor 140 (the eye at the infeed end of the cooling trough 120), which has a pressure between twenty and thirty psi. The detector 162 preferably is a photoeye detector, but it alternatively can be a capacitance probe, a proximity switch, a retroreflective photoeye, a whisker switch, an ultrasonic sensor, a microswitch with rollers, a load cell underneath the conveyor to detect weight strain, a sensor which senses current changes in the conveyor drive motor or any other "detector" as would be apparent to those skilled in the art. The detector 162 also causes the motor 163 of the first discharge conveyor 142 (the extraction conveyor) to be turned on. The combination of the water flow induced by the fluid jet conveyor 140 and the travel of the first discharge conveyor 142 pushes the end bag (A) in the dead station 166, as shown in FIG. 8, onto the first discharge conveyor and then onto the second discharge conveyor 144, which is driven by a motor 168 (FIG. 24).

A detector 170 associated with the first (or second discharge) conveyor 142 (or 144) senses that a bag has been extracted and instructs the computer 164 to turn off the motor 163 of the discharge conveyor 140. The detector 170 is preferably a whisker switch, but it can be any of the other detectors listed above with respect to detector 162. With one bag (A) out of the cooling trough 120, the three remaining bags (B, C, D) advance four feet to their respective next stations, as shown in FIG. 9. This four foot advancement makes room at the infeed station 184 of the trough 120 for the incoming bag (E).

The incoming bag (E) is moving so slowly on the infeed conveyor 112 that there is time for the process described above to empty infeed station 184 before the incoming bag slides off of the infeed conveyor, down the slide 116 and into the infeed station. As the bag (E) slides into the infeed station 184, the flow from the fluid jet conveyor 140 keeps the bags (B, C, D) moving towards the outlet end of the cooling trough 120. The bags 108 are prevented from tumbling end over end by the narrow trough diameter; this is important because the customers want the fill spout to be at the top of the drum 152. In other words, the fill spouts on the bags need to be on the downhill end as they arrive at the infeed hold conveyor for proper sterilization. When the tail of the bag .(E) clears the detector 162, the computer 164 causes bypass valve 165 to reverse the bypass state and send pressure back to the nozzle system 124. Referring to FIG. 11, the cooling trough 120 has bags (B, C, D, E) in each of the four stations. The bag (B) in the dead station 166 advantageously acts as a soft plug (resembling a beached whale), blocking forward movement of the three bags (C, D, E) in the three active stations. That is, the three bags (C, D, E) are end-to-end in the narrow trough 120, preventing bags from leapfrogging over one another, which would result in inconsistent and ineffective cooling of the bag contents. The nozzles 136 of the pipes 128 and 132 do not extend into the dead station 166.

The cooling trough 120 is perforated to allow the escape of the cooling fluid in the trough into the sump 190 therebelow. The sump 190 is preferably a three foot deep, large rectangular stainless steel vessel. The last four feet of the cooling trough 120 at the dead station 166 are not perforated. Additionally, the bottom of the cooling trough 120 at the dead station 166 is cut away diagonally upward at end 192 so that the discharge or extraction conveyor 142 can efficiently pick up the bag in the dead station 166 and carry it out of the cooling trough 120. Extraction conveyor 142 has a slope of approximately twelve degrees, since a larger slope greater than approximately sixteen degrees would result in the bag breaking the static friction of the conveyor and sliding back down into the trough 120. Thus, the dead station 166 is important because it allows a bag which has been cooled to act as a plug or soft gate holding the other three bags in the three active stations behind it. This importantly provides a gentle transition and stop for the bags in the cooling trough 120. Of course, more or fewer than three active stations can be provided as needs require.

Since the pipes 128 and 132 of the nozzle system 124 are offset, the action of the fluid from the nozzles 136 on the soft flexible bags 108 has two actions, as depicted in FIGS. 12–16. First, the action of the water impinges on both sides of the bags pushing their flexible sides in. This causes the hot contents at the center of the bag 108 to be moved outward towards the skin of the bag where they can be cooled more quickly by the cool water bath of the cooling trough 120. In other words, the nozzle system 124 causes a massaging action on the bags 108, moving hot contents in the middles of the bags towards the flexible skins of the bags to promote quicker cooling, thereby solving the prior art problem of cooling the last to cool central contents.

The water from the nozzles or jets 136 should push the bag 108 surfaces in as far as possible. Although the preferred fluid of the system 100 is water, other liquids such as brine or oil can be used as would be apparent to those skilled in the art. The greater or deeper the dimpling of the bags 108, the greater the internal circulation of the bag contents. The surface can be pushed in as far as the radius of the free floating bag for fifty-five gallon and five gallon. bags 108. The depth of the dimple depends upon the force delivered to the bag,. the slack of the bag around the product, the viscosity of the product in the bag and the speed of rotation of the bag. An example for a fifty-five gallon bag 108 is a dimple of approximately twelve inches. Another description of the depth of the dimple or indent is approximately forty percent of the free floating diameter of the bag 108.

The second action of the nozzle system 124 on the bags 108 is a rotating action, which can be understood from FIGS. 12–16, by arrow 194. The rotation is about an axis of the bags 108 which is parallel to the longitudinal axis of the cooling trough 120, or in other words, parallel to the travel path of the bags caused by the periodic actuation of the fluid jet conveyor 140. The rotation circulates the bag 108 within the surrounding cooling water in the trough 120 thereby promoting efficient cooling, in addition to assisting in the massaging action. The bags 108 can be rotated at one-half revolution per second or thirty revolutions per minute. Thus, for an actuation period of under two minutes, this means about fifty rotations at each of the three active stations. The three stations are based on diced Chile peppers cooling in five minutes at a rate of one bag every two minutes, pursuant to this invention.

The number of stations and the time at each station are selected for the desired product and to provide enough cooling to take enough heat to prevent product degradation but no more cooling than necessary. A range of workable rotations for typical products is between twenty and thirty-five rotations per minute with a preferred rate being thirty rotations a minute, which cools faster than twenty rotations a minute. The time spent by the bags 108 at each station is determined by the frequency of bag arrivals at the infeed station 184. For example, the system 100 can be designed for 1.5 minutes dwell per station, and used initially at three minutes per station and then later ramp up to the 1.5 minutes per station frequency.

FIGS. 12–16 show a preferred arrangement wherein the nozzles 136 on opposite sides of the bag 108 are parallel to each other. This provides the best turning or rotating of the bags. Other arrangements are also within the scope of the invention, however. For example, a fifteen degree offset has been shown to provide an effective cooling but occasional slowing of the bag rotation occurred. Alternative nozzle orientations are illustrated in FIGS. 17a–17d. The top view arrangement 200 of FIG. 17a likely would provide good product mixing and thus cooling (or heating). Arrangement 204 of FIG. 17b works, although it suffers from reduced bag rotation. Arrangement 208 of FIG. 17c massages the bag contents but does not effectively rotate the bag. More than two nozzles can work as illustrated by arrangement 212 of FIG. 17d. While the nozzles of arrangement 212 should be symmetrical, they should preferably not be directed straight in but rather at an angle (e.g., fifteen degrees) off center to impart a torque on the bags (108).

Figure 29A:
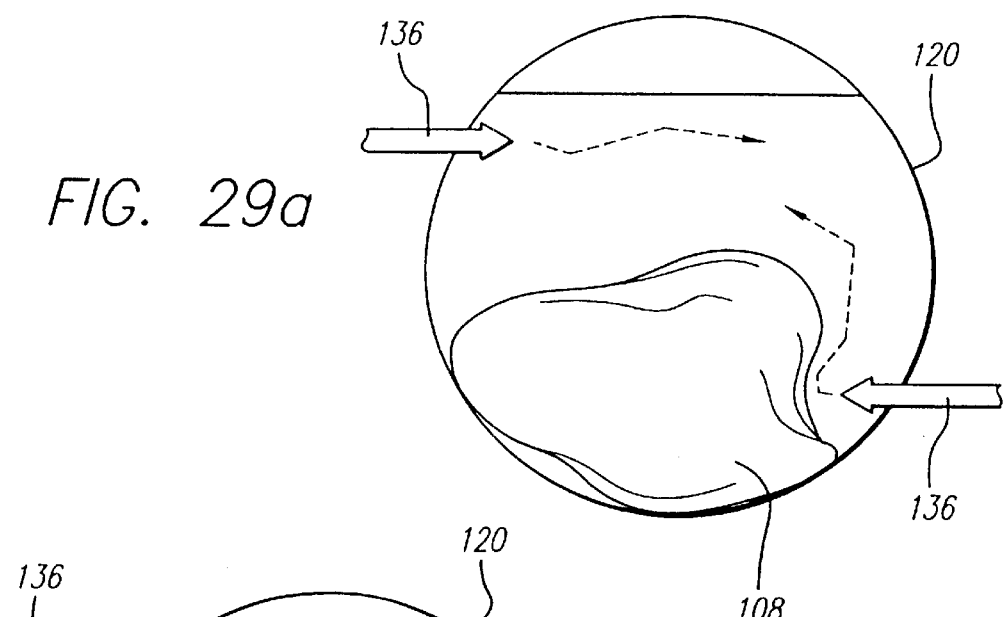
FIGS. 29a, 29b and 29c are simplified cross-sectional views through the trough of the system of FIG. 3, showing the relationships of various ratios of flexible container diameters to trough diameters.
Figure 29B:
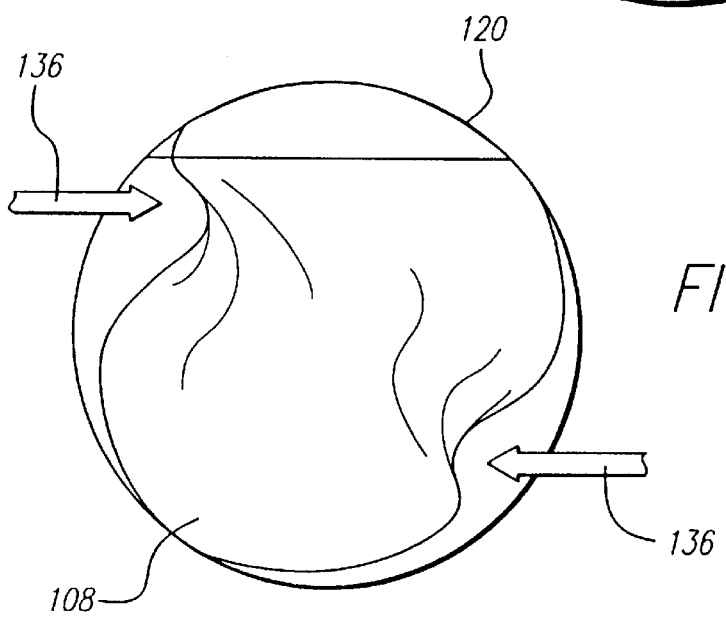

The containment vessel or trough 120 fits around the bags 108 to prevent them from moving out away from the nozzles or jets 136. The nozzles 136 work well in the range of one third to two thirds of the radius of the trough offset from the horizontal centerline. Less than one third radius makes bag rotation unsure. And larger than a two third offset creates little dimpling of the bag and therefore low circulation of the product in the bag. The best internal circulation is created by a combination of bag rotation and impingement. A preferred ratio of the diameter of the bag (108) to the diameter of the trough (120) 0.9 and a workable range is 0.8 to 0.95. (See FIG. 29a) Too much slack (as shown by arrangement 200 in FIG. 29a) allows the bag to "hide" in the trough from the jets or nozzles 136 and not turn. As depicted in FIG. 29b, too little slack results in the bag 108 dragging against the wall of the trough 120 and not turning.

Figure 29C:
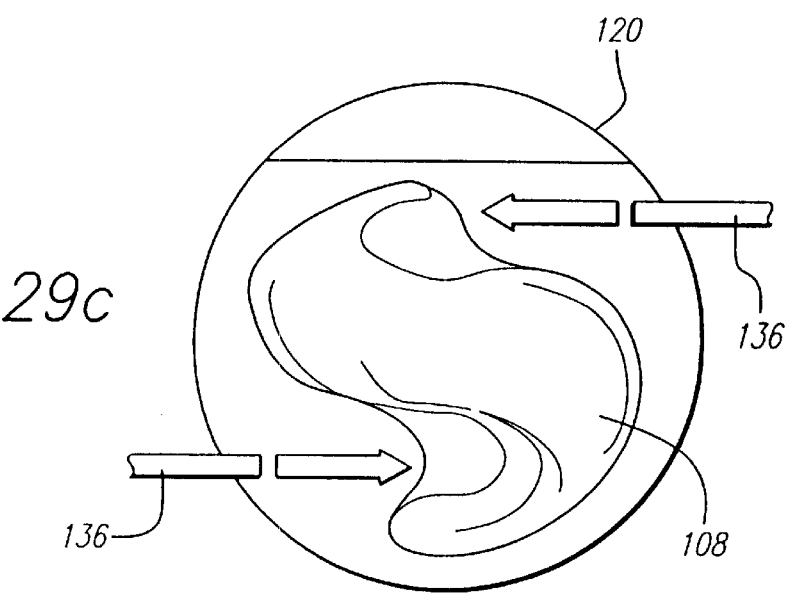

The above-mentioned preferred ratio and range are affected by the percentage "fill" of the bags (108). The bag diameters discussed above are the "free floating" diameters and on a typical fill of sixty percent of their ultimate burst volume. Sixty percent fill allows for a lot of slack which makes the bag supple when free floating and allows the massaging action of the nozzle system 124 to work effectively. Referring to the arrangement 204 of FIG. 29c, a fifty-five gallon bag 108 has a (flat) width of thirty-seven inches or a 23.56 inch diameter working in a twenty-six inch diameter vessel of cooling trough 120. By knowing the above-discussed ratio, designers can design vessels (120) for any size of bag.

Preferred bags which can be used with system 100 are today's fifty-five gallon bags constructed of two polyethylene layers covered by a layer of polyester or nylon, five gallon bags comprising two polyethylene layers, three gallon single-ply bags, and one gallon bags. In other words, the bags can be made of plural layers with most of the layers made of polyethylene, and the outer layer can also be made of nylon for added strength. A filled bag has a bottom flattened elliptical cross-section. A fifty-five gallon bag is approximately seven inches thick, thirty-four inches wide and fifty-five inches long. Those dimensions are maximum because the surface is constantly curving, attempting to form a sphere. A five gallon bag is approximately a one-eleventh scale model of a fifty-five gallon bag.

The product which is to be cooled (or heated) pursuant to this invention is generally any semi-fluid product which can be placed in these flexible bag containers. The lower the viscosity of the product the better the heat transfer. Most foodstuffs (including tomatoes, peppers and peaches) can be used. The product can also be non-foodstuffs, such as blood plasma, corrosive chemicals and reactants for chemical reactions to produce a finished product. High viscosity or thick products, such as Karo syrup, need considerable power to massage the bag, requiring high nozzle pressures.

Nozzle pressures from thirty to one hundred and twenty psi work well with system 100. Although the pressure can go higher than one hundred and twenty psi to three hundred or four hundred psi, pressures generally greater than four hundred and fifty psi would have enough energy to cut or otherwise damage typical bags. The force delivered to the bags depends on the distance of the tip of the nozzle 136 to the surface of the bag 108, which has a practical limit of about one inch without damaging the bags.

In one preferred system, fifteen nozzles 136 are provided on each side of the twelve foot active portion of the trough 120. The nozzles 136 can be spaced every eight inches. Tests using twelve inch spacing for fifty-five gallon bags, three inch spacing on fifty-five gallon bags, and four inches for five gallon bags have been successful. It is also within the scope of the invention to arrange the nozzles 136 so that the direction of rotation of the bag 108 caused by the action of the nozzles 136 is changed from active station to station.

Figure 4:
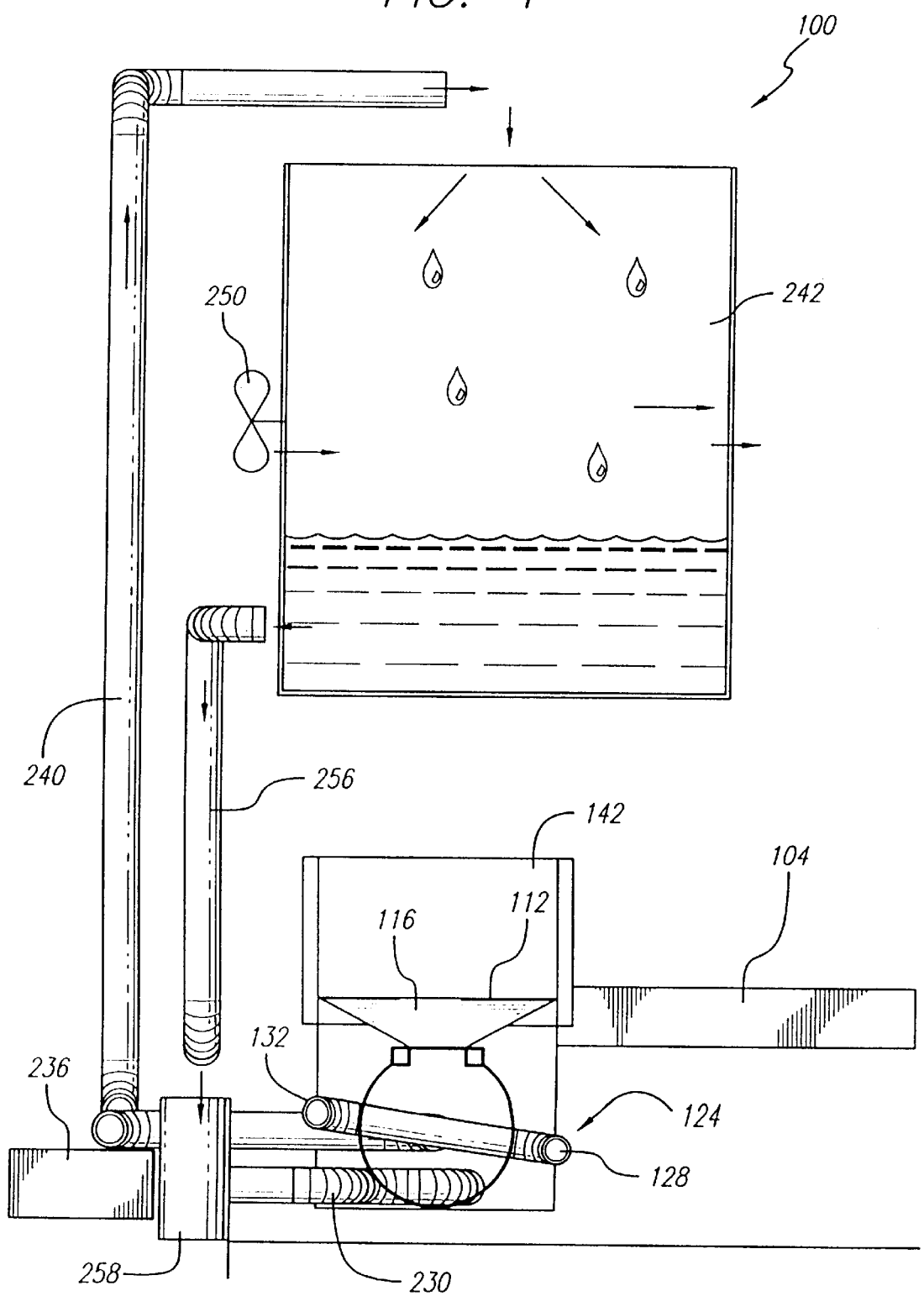
FIG. 4 is an end view of the system of FIG. 3.
Figure 5:
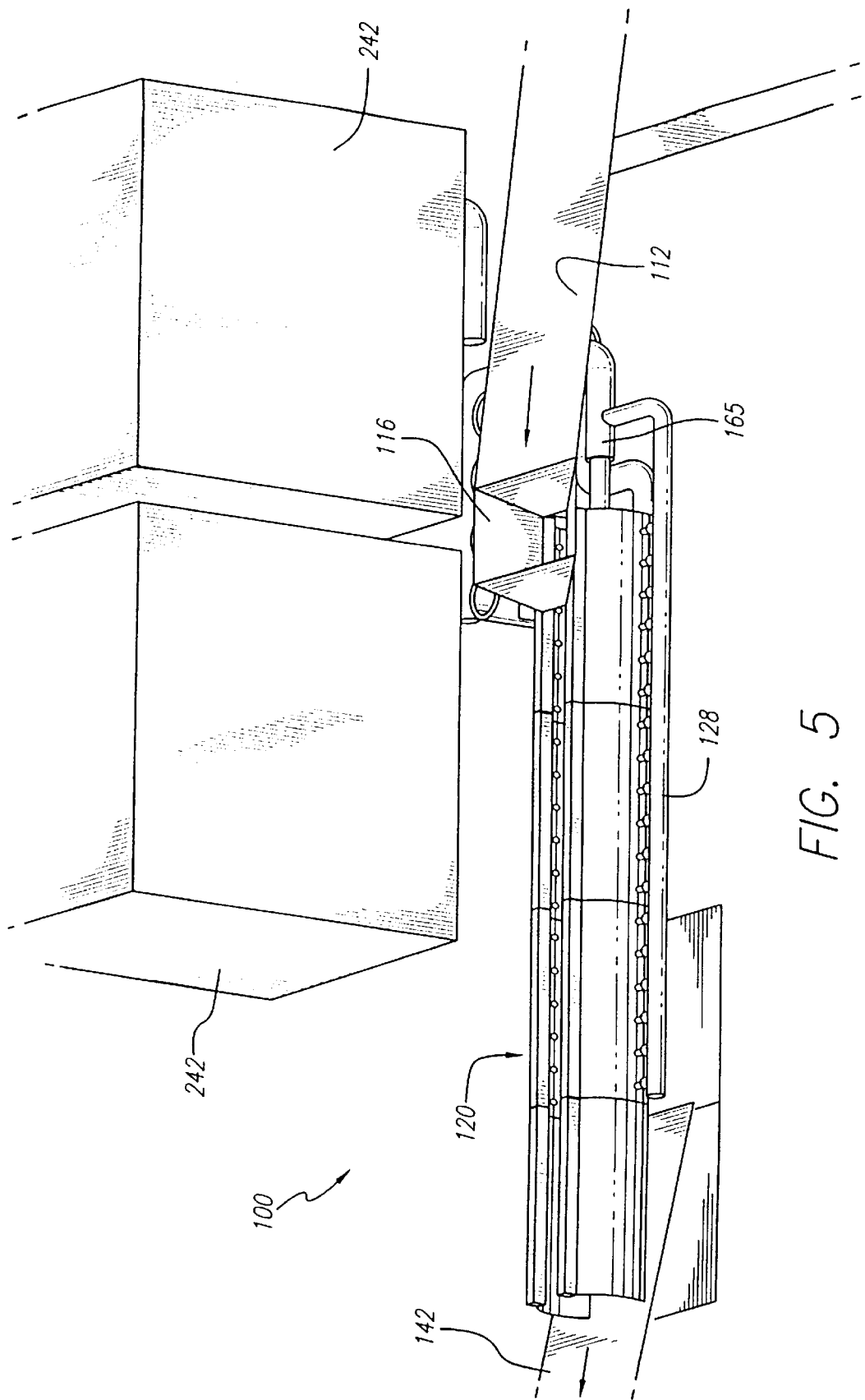
FIG. 5 is a side perspective view of the system.
Figure 6:
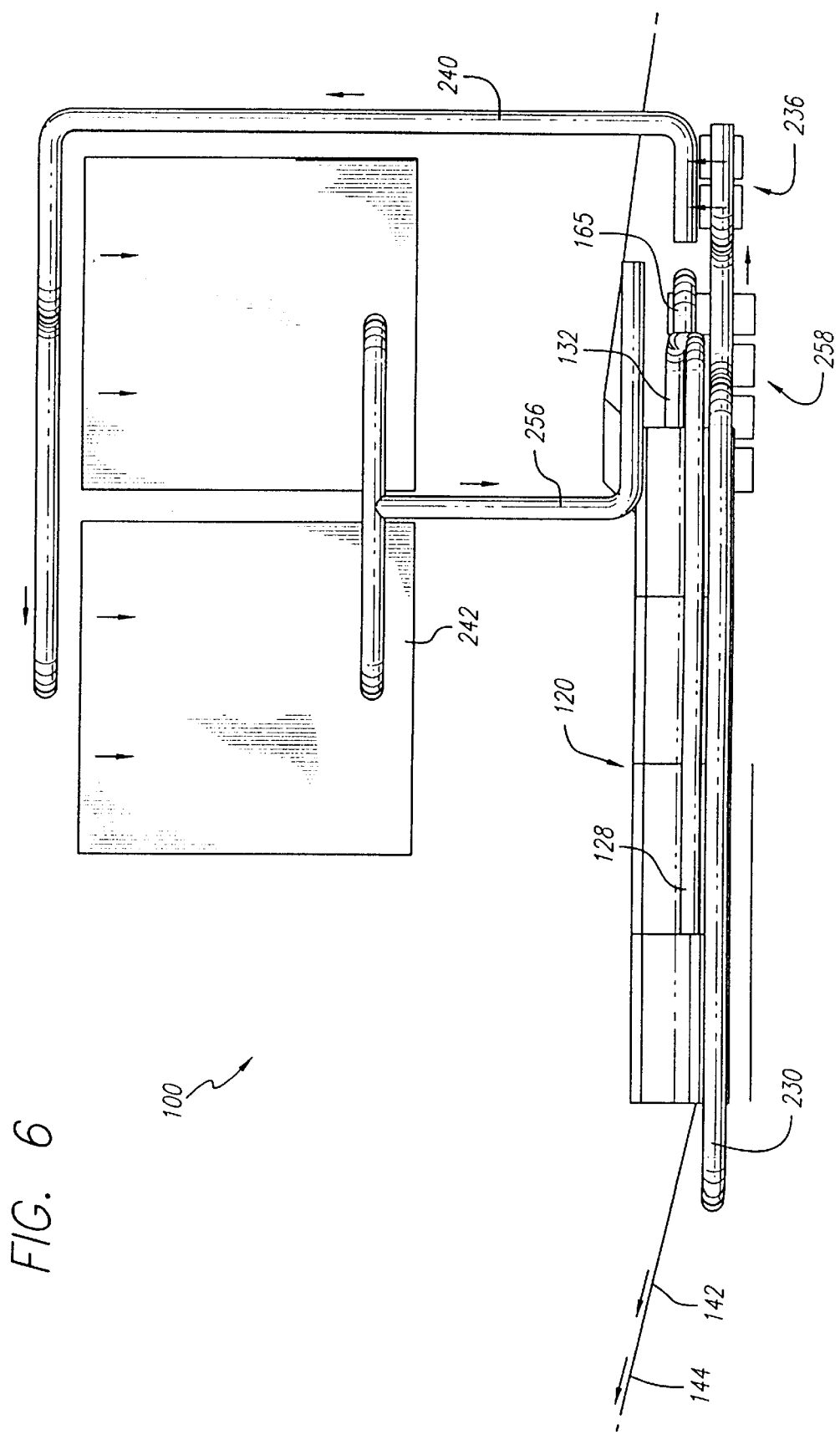
FIG. 6 is a side elevational view of the system.
Figure 7:
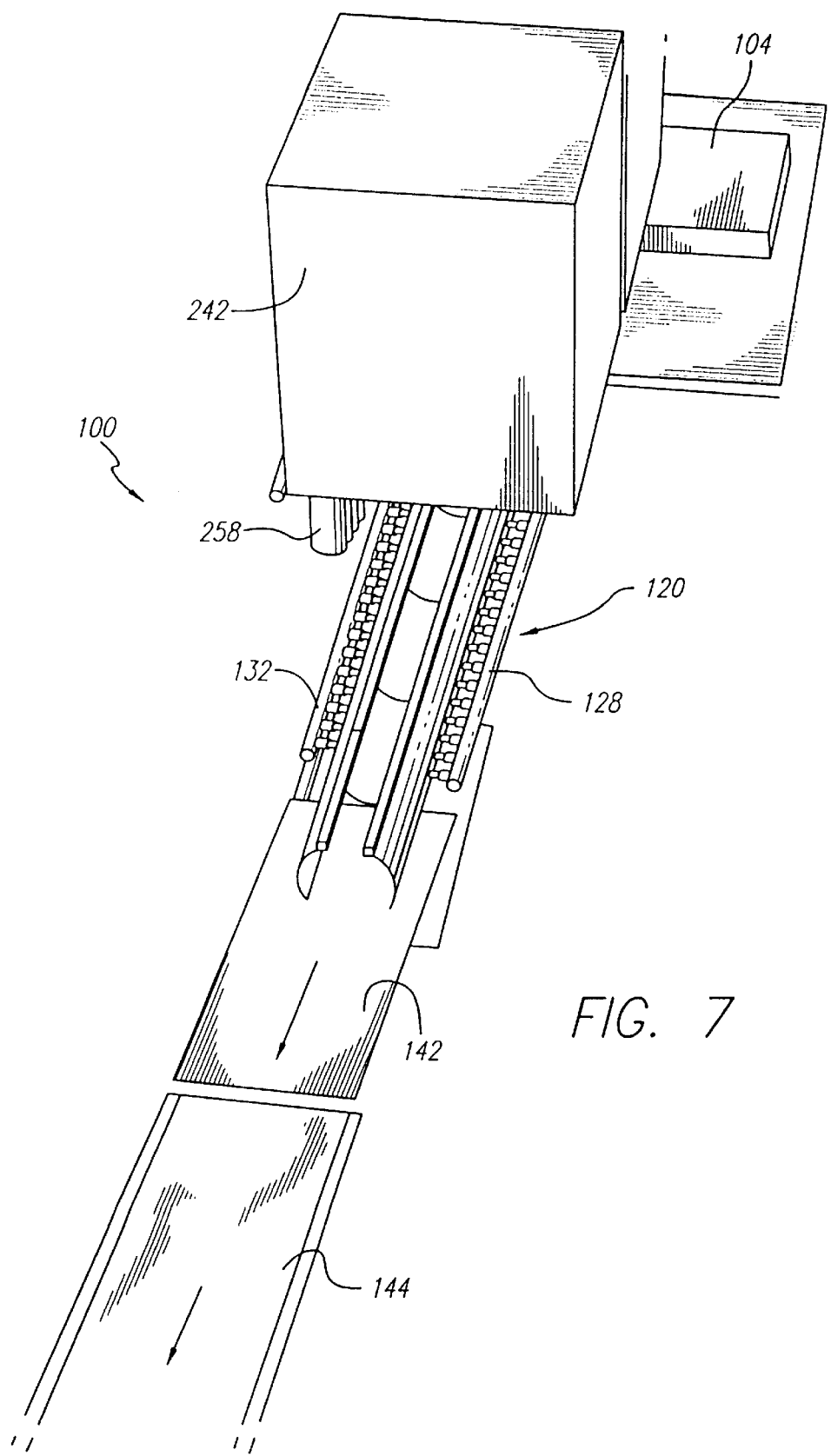
FIG. 7 is a front perspective view of the system.
Figure 17A:
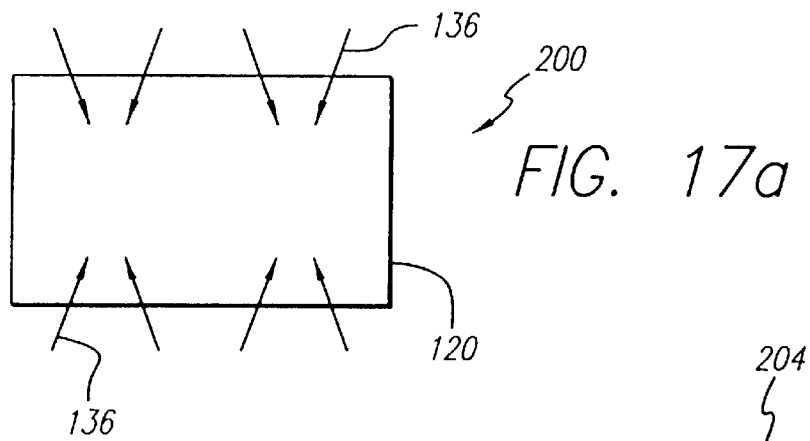
FIGS. 17a, 17b, 17c and 17d illustrate diagrammatically various alternative fluid jet nozzle arrangements relative to the flexible bag.
Figure 17B:
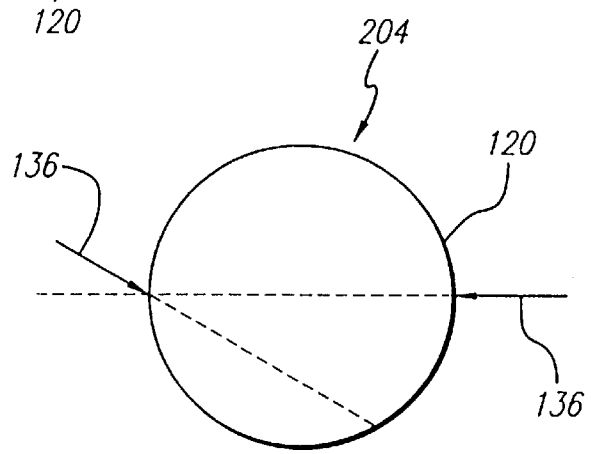
Figure 17C:
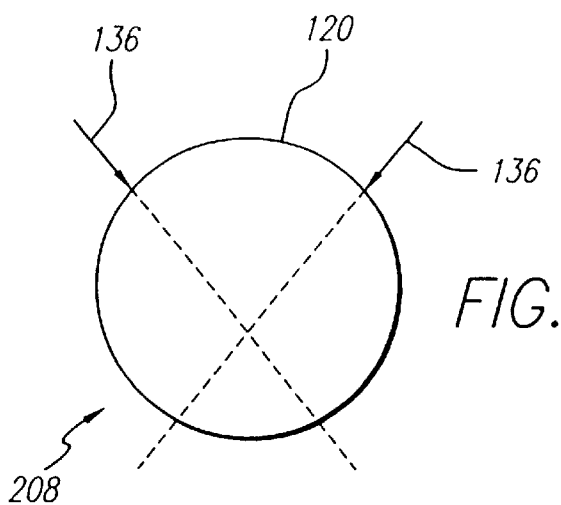
Figure 17D:
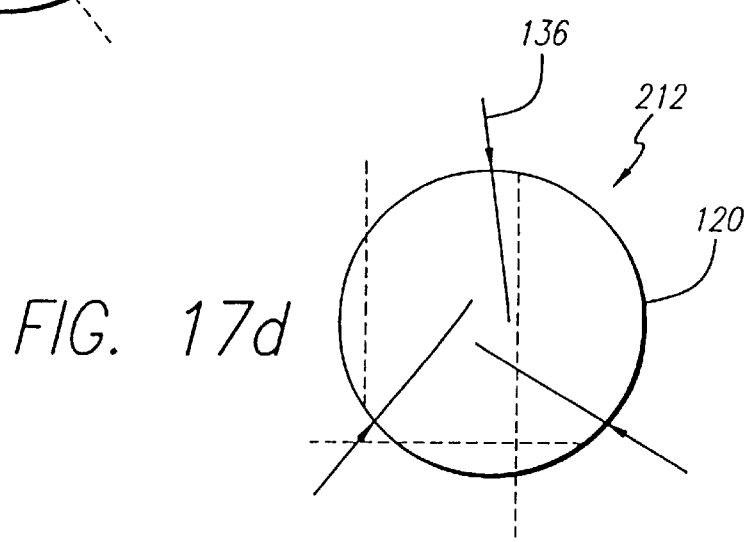
Figure 25:
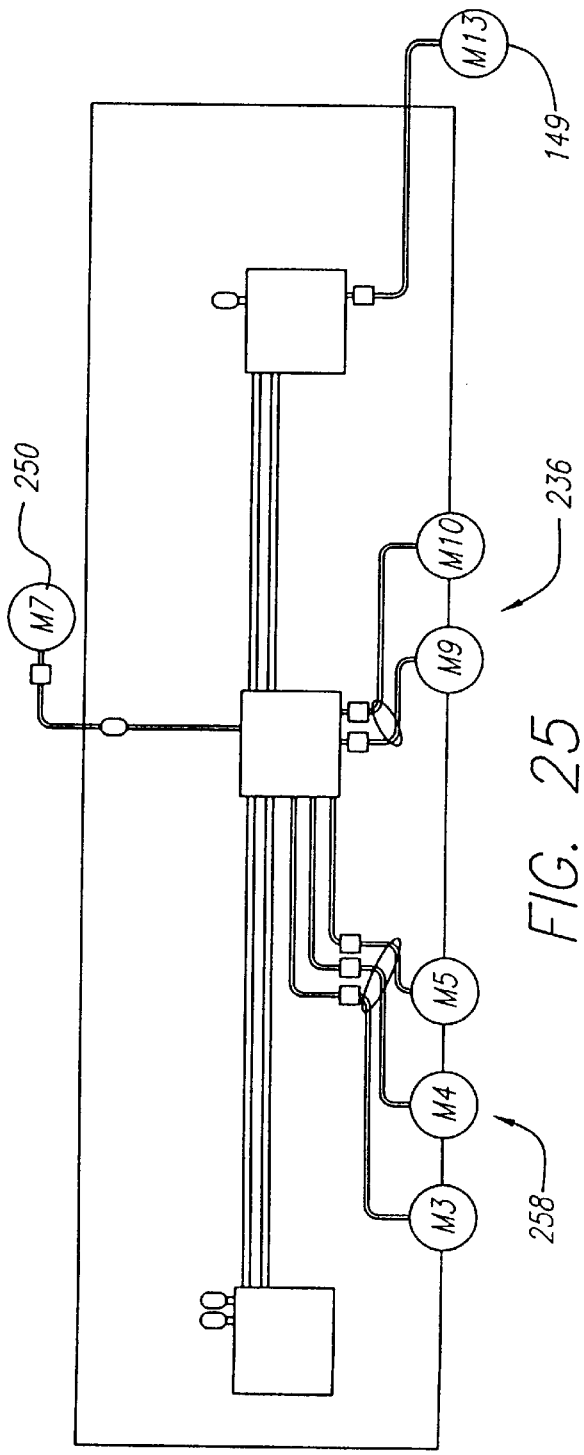
FIG. 25 is a top view of the motor/pump arrangement of the system, outside the cargo container.

Thus, the cooling water (or other cooling fluid) leaves the nozzles 136 and impinges on the bags 108. It then escapes through the perforations in the cooling trough 120 and into the surrounding sump 190. The water flows to the discharge end of the sump 190 and into the (Schedule forty PVC) end (or alternatively, side) suction line 230. From the suction line 230 the water flows to two (Teel brand) circulating sump pumps 236, which pump the water up pipes 240 to the (two) Marley cooling tower 242. Evaporative cooling occurs in tower 242 by the distribution of the water at the inlet from where it falls through the stream of cooling air from a fan 250 (FIGS. 4 and 25). The water is cooled in the tower 242 to a wet bulb temperature of approximately seventy degrees Fahrenheit. The water has been heated approximately four to ten degrees in the system before it enters the cooling tower 242. (See, e.g. FIG. 6.) The amount of temperature rise is very dependent upon the nozzle flow rates and level of the fluid in the trough 120.

The cooled water from the tower 242 flows in pipes 256 into the suction of three (blue Goulds high head) pressure pumps 258. Pumps 258 pump the water through (gray six-inch Schedule-eighty PVC) pipe 264 to the manifold under the infeed conveyor 112. Normal flow in that manifold is split into two (four-inch gray Schedule-eighty PVC) manifolds or pipes 128 and 132 that house the pressure nozzles 136.

As discussed earlier, the (six inch) butterfly valve 166 is triggered by the (photoeye) detector 162 and when opened provides a low resistance path for the water from the high head pumps 258. This essentially shuts off the nozzles 136 and creates a flow down the center of the containment vessel or cooling trough 120 by the fluid jet conveyor 140. This flow forces the bags 108 in the trough 120 to advance to their respective next stations and makes room at infeed station 184 for the incoming hot filled bag 108 from the infeed conveyor 112.

Thus, the pressure pumps 258 provide water to alternating loads, namely the cooling jet conveyor 140 and the nozzle system 124. When the system changes between the two loads, the resistance to flow changes. This resistance combined with the occasional influx of air into the suction manifold system from the cooling tower 242 causes gulps of air to enter the pressure pumps 258. The pockets of air cause the pumps 258 to lose their prime. Operator intervention is then required to bleed the air to get the pumps 258 working again. The present invention solves this problem. The pump system as described below has applications in other types of systems where when a prime is lost, shut down is not a practical option.

Figure 18:
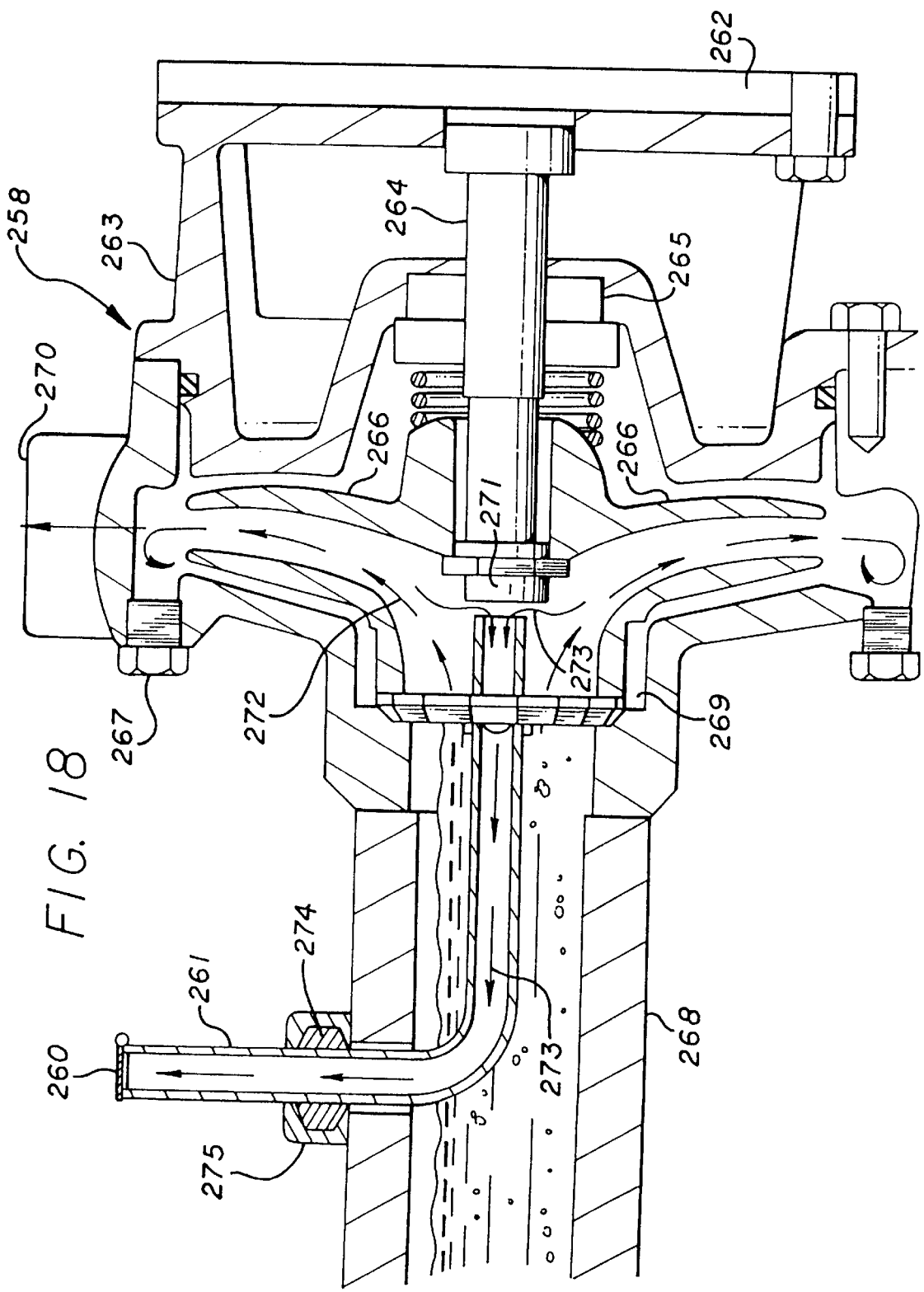
FIG. 18 is an enlarged cross-sectional view of a pressure pump assembly of the present invention used in the system of FIG. 3.

Referring to FIG. 18, it is seen that the solution to the problem is rather simple—a check valve 260 and a bleed tube 261 are added to the pump 258. Illustrated with reference numerals in this drawing figure are the following pump components: motor face 262, pump housing 263, motor shaft 264, shaft seal 265, impeller 266, static bleed port 267, suction line 268, wear ring 269, and discharge port 270. The bleed tube 261 is positioned at the eye of the pump 258 and close to the bolt head 271 to get all of the air out. The water flow is shown by arrow 272 and the air flow by arrow 273. Although there are bleed ports 267 at the extreme outer edges of the pump housing 263, they are only effective in a non-rotating system.

Thus, to bleed a centrifugal (rotating) pump in operation, the inventor has discovered that the air has to be bled from the eye of the pump 258. (See U.S. Pat. No. 4,981,413.) As the impeller 266 spins and there is no fluid flow through the pump 258, there is essentially a centrifuge which drives the heavier water to the outside, thereby displacing the air at the outside. The only place for the air to go is to the eye of the impeller 266, as shown by arrow 273. Once the air is burped out of the eye, the pump 258 begins to move fluid (water) again, as shown by arrow 272.

The bleed tube 261 passes upwardly out an opening in the suction line 268 and is secured in position thereto with a compression coupling ferrule 274 and a compression bonnet 275. The check valve 260 is a forward bias check valve positioned at the end of the bleed tube 261 and can be a flap valve or a small ball valve. Thus, this light touch (one to five psi) check valve 260 lets air out of the bleed tube 261 but not in and is needed because the venturi effect at the eye creates a vacuum tending to suck air into the pump.

The pump 258 can be the Model #3656 pump manufactured by Goulds Pumps, Inc. of Seneca Falls, N.Y. This pump has an impeller diameter of 8 $\frac{1}{16}$ inch and a size of 1 ½×2–3. The air volume which causes this pump to lose it prime is two hundred to three hundred milliliters. That volume depends, however, on pump size, impeller design, fluid viscosity, fluid temperature, and so forth. Generally any pump which has a straight shot to its impeller so that a bleed tube can be positioned close to the impeller can be used. Most single-stage centrifugal pumps are of this type.

Figure 19:
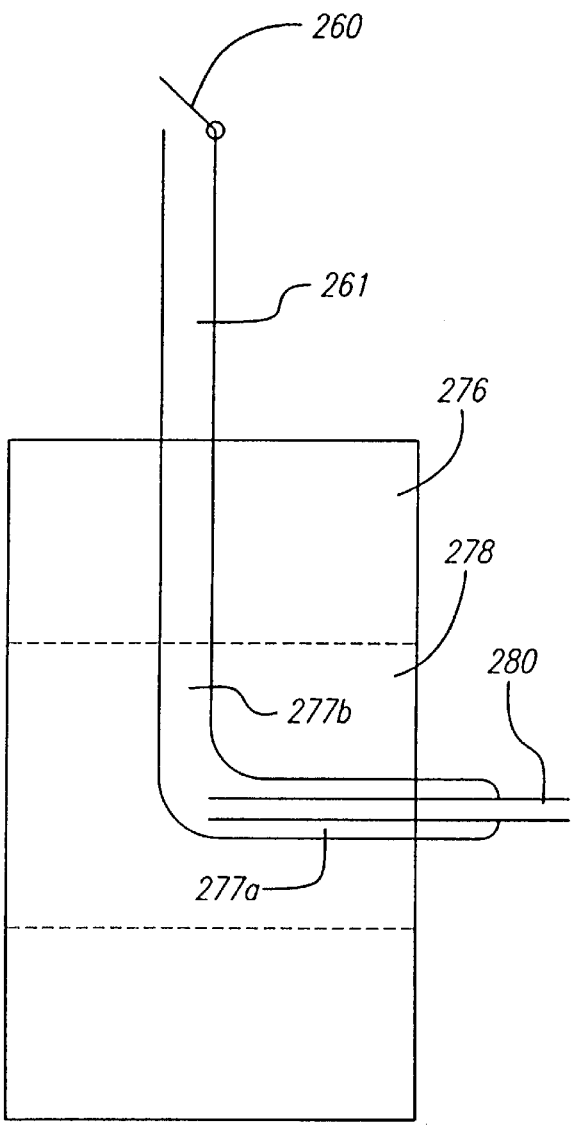
FIG. 19 is a side elevational view of a bleed-tube retrofit housing alternative useful in a pump assembly similar to that of FIG. 18.

One system for installing the bleed tube 261 and check valve 260 to the pump 258 is illustrated in FIGS. 20a–20e. For this system the bleed tube 261 is mounted in a retrofit housing 276, as best shown in FIG. 19. The horizontal portion 277a of the bleed tube 261 is mounted generally centered in a horizontal channel 278 through the retrofit housing 276. The bleed tube 261 can have a one-quarter inch diameter, while the channel 278 and suction line 268 have larger two inch diameters. The vertical portion 277b of the bleed tube 261 is secured in a top opening in the housing 276 with the check valve 260 disposed outside of the housing.

Figure 20A:
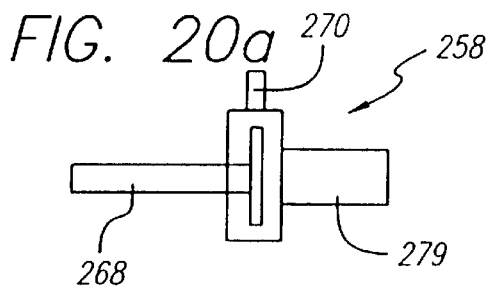
FIGS. 20a, 20b, 20c and 20d illustrate sequential steps for mounting the retrofit housing to an existing pump.
Figure 20B:
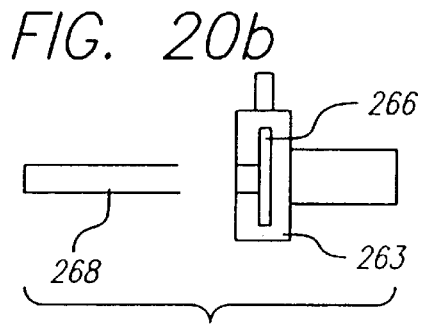
Figure 20C:
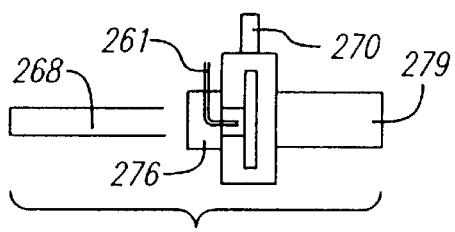
Figure 20D:
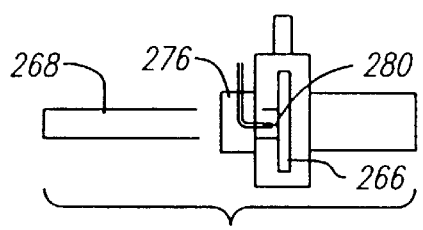

FIGS. 20a–20e show the steps of a retrofit process of the present invention. FIG. 20a shows the pump 258 to be retrofitted with its motor 279, impeller 266, discharge port 270, pump housing 263 and suction line 268. The suction line 268 is disconnected as illustrated in FIG. 20b. The retrofit housing 276 is then installed to the pump housing 263, as shown in FIG. 20c. The attachment can be by threaded means for smaller pumps (up to one thousand gallons per minute) and by flange means for larger pumps. Attachment clamps can also be used.

The effective length of the horizontal portion 277 of the bleed tube 261 is then adjusted by moving the inner tube 280, similar to a vehicle radio antenna. The inner tube 280 is moved until it terminates approximately one-eighth of an inch (as close as possible without touching) from moving parts of the impeller 266. On larger pumps, the installer can make this adjustment by sticking his hands physically into the suction line 268 or channel 278 and pushing the inner tube 280 towards the impeller 266. However, on smaller pumps, the installer may need to use angled needle nose pliers and a one-eighth inch feeler gauge.

Figure 20E:
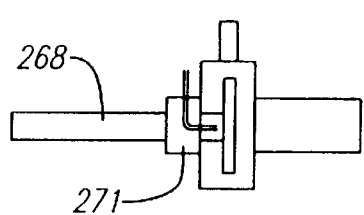

Instead of providing the adjustable inner tube 280, the horizontal portion 277 of the bleed tube can be extra long. And the installer can then cut it to fit. The suction line 268 is then mounted to the housing 276 as depicted in FIG. 20e, using threaded, flange or clamp means. The suction line 268 may first, however, have to be shortened to get a good connection.

The construction and operation of the sump 190 and related components will now be discussed with particular reference to FIGS. 21 and 22. The sump 190 is approximately twenty-eight feet long and thus extends about sixteen feet from the outlet end of the trough 120. The floor of the sump 190 is approximately a foot below the bottom of the trough 120. The trough 120 and sump 190 share a common inlet plate 284 through which the fluid jet conveyor 144 injects the bag transport fluid pressure.

A quiet backwater area 290 is defined in the sump 190 underneath the discharge conveyor 140 and to the end plate 294 of the sump. The suction line 230 sucks water from the backwater area 290 out through an opening in the end plate 294. Positioned in the backwater area 290 and depicted in FIGS. 21 and 22 are the drain 300, the fill float 304 (which keeps the water in the trough 120 at three-quarters full) and the overflow line 308 for the sump 190.

Figure 23:
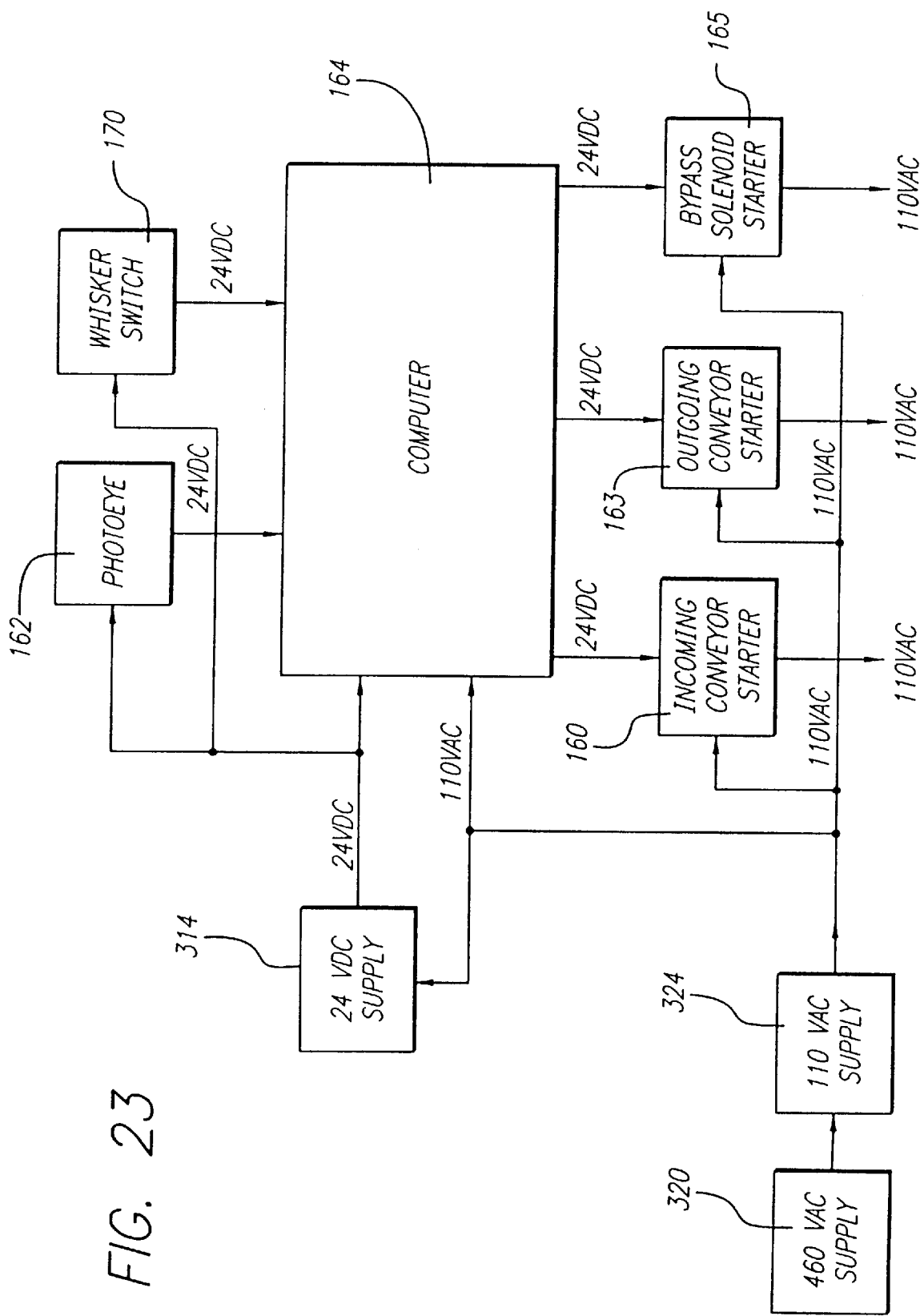
FIG. 23 is a block diagram of the computerized electrical system of the cooling system of FIG. 3.

Referring now to FIG. 23, all of the controls operate from a twenty-four volt DC supply 314. All of the one hundred and ten volt AC power comes from a four hundred and sixty volt AC supply 320, which is stepped down by a transformer to a one hundred and ten volt AC supply 324. The twenty-four volt DC control power comes from the one hundred and ten volt AC power supply 324 and the twenty-four volt DC power supply 314. The two discharge conveyors 140, 144 are powered by three phase, four hundred and sixty volt AC, and the two infeed conveyors 152, 112 are powered by one-phase, one hundred and ten volt AC. All of the power to the motors are switched using motor starters that use the twenty-four volt DC control voltage to power their coils.

Figure 26:
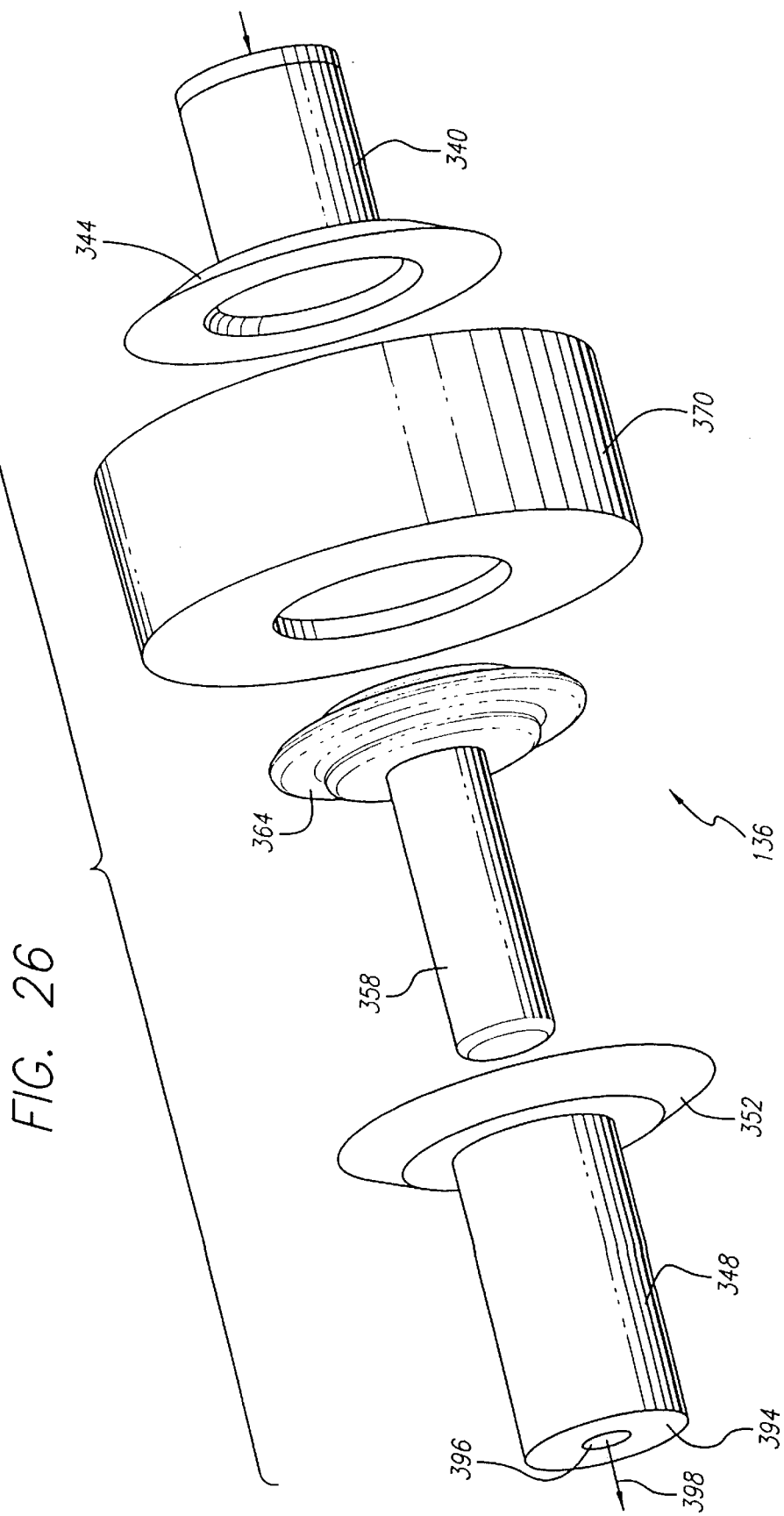
FIG. 26 is an enlarged exploded perspective view of one of the fluid jet nozzles of the system of FIG. 3 illustrated in isolation.
Figure 27:
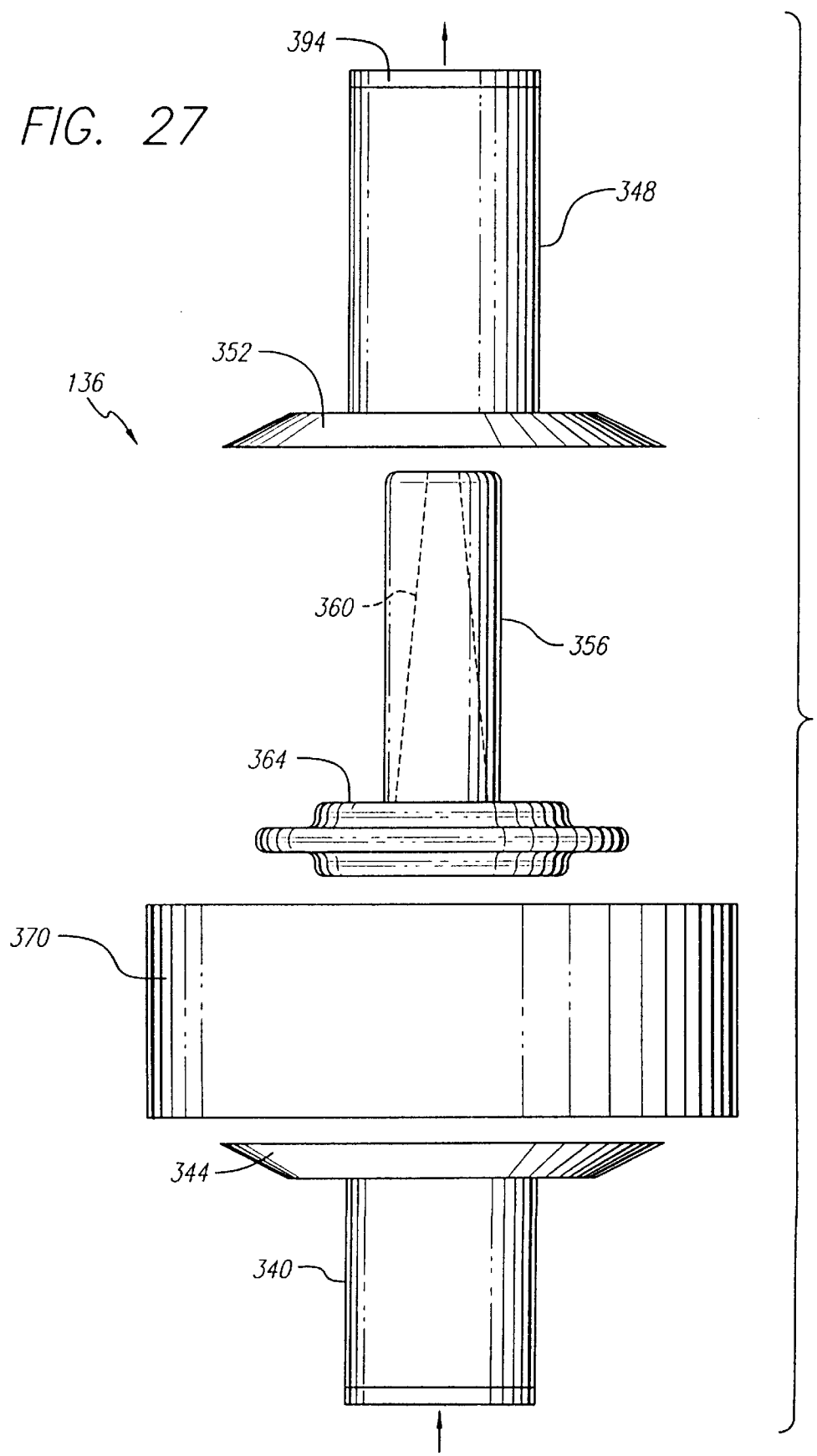
FIG. 27 is a top plan view of the nozzle assembly of FIG. 26.
Figure 28:
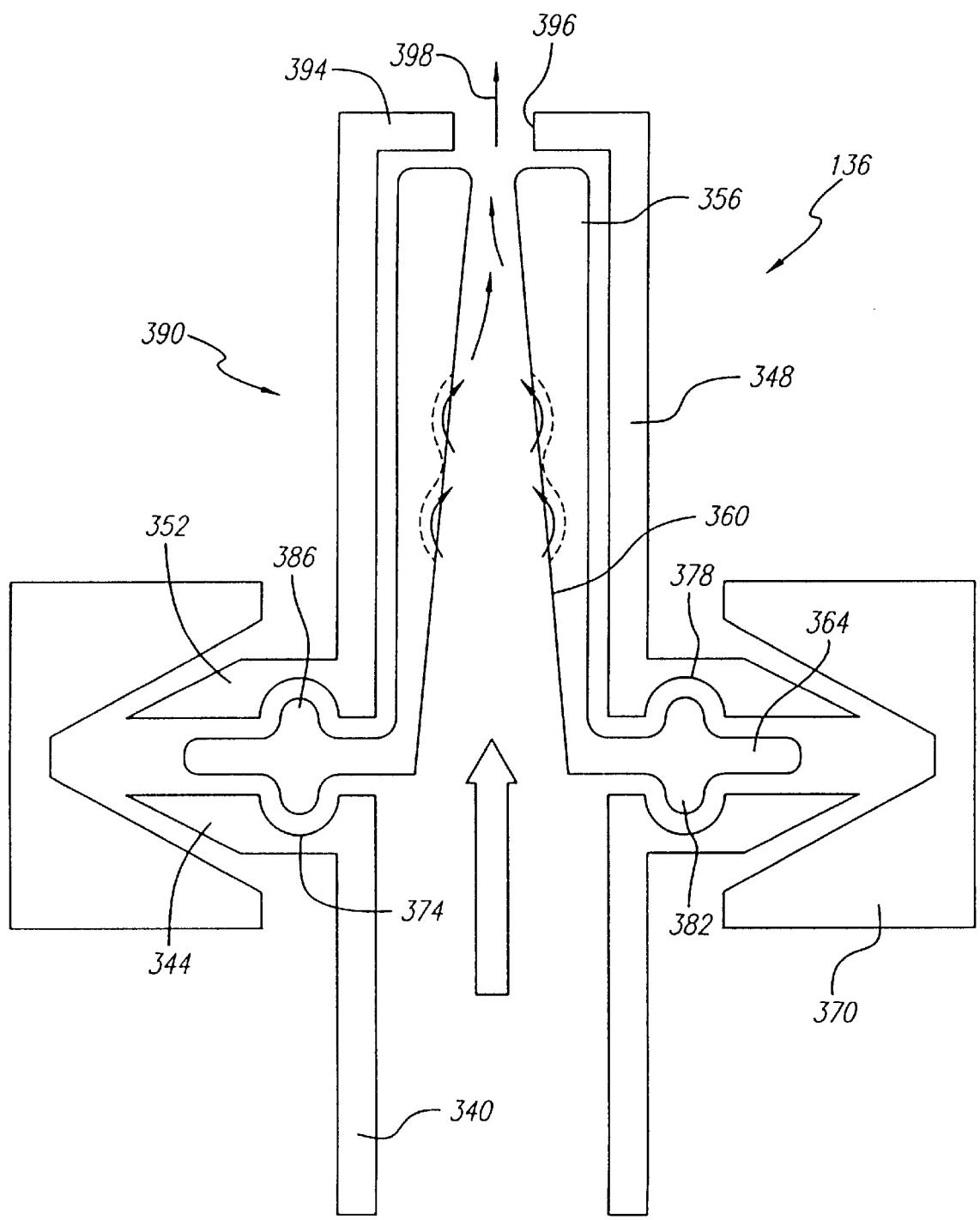
FIG. 28 is a cross-sectional assembled view of the nozzle assembly of FIG. 26.

A preferred nozzle (or nozzle assembly) 136 of the present invention is illustrated in isolation in FIGS. 26–28. Referring to these figures, the nozzle assembly 136 is seen to be formed of four parts. One of these parts is an inlet sleeve 340 having a TRICLOVER-type sanitary fitting 344 at its outlet end. Another of these parts is an outlet sleeve 348 having a TRICLOVER-type sanitary fitting 352 at its inlet end. The third of these parts is an elastomeric nozzle unit 356 having a tapered inner fluid contact surface 360 and an aft collar 364. And the fourth of these parts is a TRICLOVER clamp 370. Referring to FIG. 28, two fittings 344, 352 have respective grooves or indents 374, 378, which receive therein the circumferential cast-in rims 382, 386, respectively, on rearward and forward faces of the aft collar 364. The clamp 370 encircles the fittings 344, 352 holding them together with the collar 364 sandwiched therebetween.

The housing 390 defined by the two sleeves 340 and 348 has a lip 394 at its outlet end which prevents the nozzle unit 356 from extending out too far, and the lip 394 has a small (3/16 inch) opening 396 defining the outlet opening of the nozzle assembly 136. The housing 390 can be cast and machined out of stainless steel. The nozzle unit 356 can be made by casting or injection molding silicone or buna-n. It can have an inlet diameter of approximately one inch and a total length of approximately six inches. Alternatively, the various parts can be assembled by TIG welding. The materials used should be selected to meet the mechanical strength and corrosion resistance requirements of the particular use.

As shown in FIG. 28, the elastomeric contact surface 360 is deformed by eddies in the stream of fluid 398 to minimize turbulent flow through the nozzle assembly 136. The elastomeric lining is similar to the skin of a sea mammal in that it does not allow turbulence to feed back or build up on itself. Lower turbulence in the nozzle 136 means that higher power is delivered to the bag 108 with the same driving force. The elastomeric lining is also self-clearing of hard debris. In other words, as long as the pieces of debris are not too sharp or too big, the elastomer will "give" enough dimensionally so that the piece can slip by the orifice 396. In contrast, a hard lined nozzle would not "give" to allow large hard objects to pass through it.

The contact surface 360 of the nozzle unit 356 is tapered to gradually increase the velocity of the flow of the cooling or massaging fluid 398 therethrough. For example, the velocity can increase from an inlet velocity of approximately one foot per second to a high exit velocity of approximately ten feet per second. In other words, the exit velocity of the fluid stream can be approximately ten times that of the inlet velocity and with an improved focus.

Figure 30:
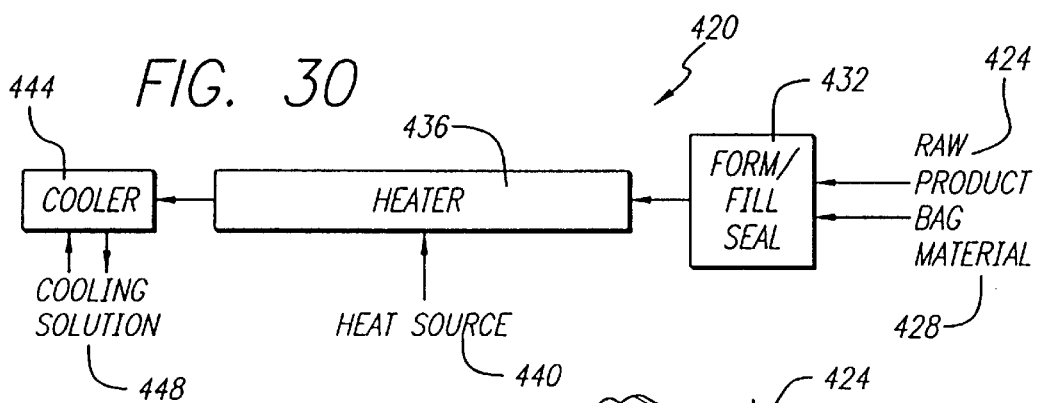
FIG. 30 is a block diagram of a system of the present invention for heating and subsequently cooling product in sealed flexible containers.

As previously stated, the system 100 can be used to efficiently heat product in flexible bags instead of cooling it. It further can be used to heat product in sealed flexible bags and then cool the heated product in the bags. The basic steps of a heating and cooling system are shown generally at 420 in FIG. 30. Referring thereto, the raw product 424 is filled in bags formed from bag material 428 at a form/fill/seal station 432. The filled and sealed bags 434 are then passed through a heating trough 436 where the heating fluid (water) is heated by a heat source 440, as will be discussed later in greater detail with the discussion of FIG. 32. The heated bags are then delivered to and passed through a cooling trough 444 where they are subjected to a cooling solution 448 (as described previously for system 100).

Figure 32:
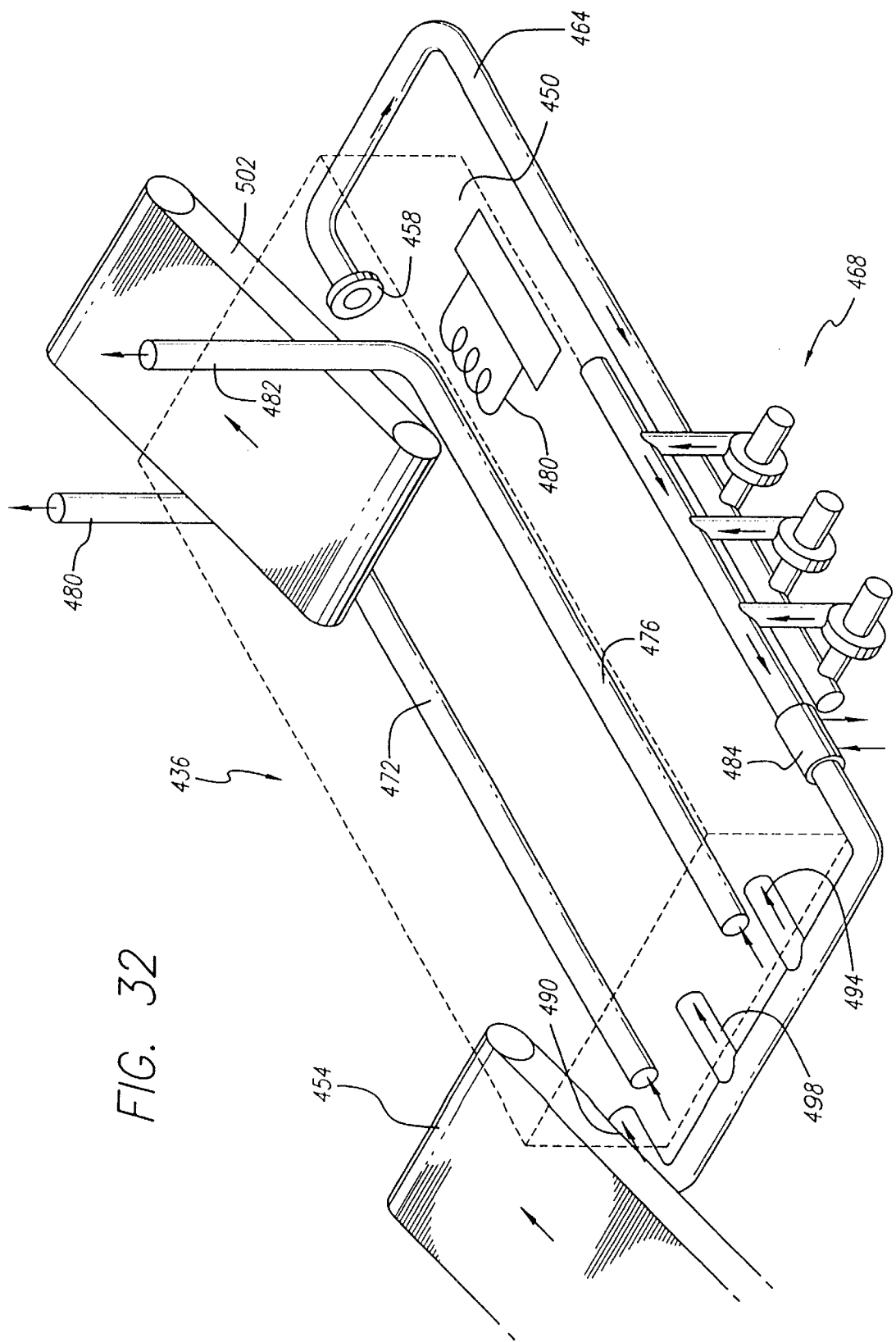
FIG. 32 is a simplified perspective view of a heating trough of the system of FIG. 30.

An exemplary heating trough 436 is shown in simplified form in FIG. 32. The sump vessel 450 (similar to sump 190) is shown, but for illustrative purposes the perforated trough (120) in the vessel is not shown. Also not shown in this figure (but shown in other earlier figures) are the two rows of heating jets, which would be positioned on opposite sides of the trough. Thus, the product filled and sealed bags (as will be described later) are carried by the infeed conveyor 454 and deposited into the trough in the sump vessel 450. The water in the vessel 450 is sucked out outlet 458 at an end of vessel 450, through pipe 464 by high pressure pumps 468.

Three different heat sources (440) for the water are illustrated in FIG. 28. Although they are preferably alternative heat sources (that is, only one would be used), it is within the scope of this invention to use two or more if desired. One heat source uses fire tubes, such as shown by reference numerals 472, 476, submerged in the water in the vessel 450. Hot combustion gases forced through the fire tubes 472, 476 heat the surrounding water and the gases are discharged out the flues 480, 482. A second heat source (440) can be an electric immersion heater 480 positioned to heat the water in the vessel 450. And a third heat source includes passing the pipe 464 through a heat exchanger 484 to heat the water flowing therethrough. The heat exchanger 484 can be a water-tube boiler where hot flue gases pass over the pipe (or plurality of tubes) within a furnace enclosure, thereby heating the water, and then the flue gases are exhausted out through a stack.

The hot water in the pipe 464 passes to the two pipes 490 and 494 of the nozzle system and to the fluid jet conveyor 498, similar to the system provided in the earlier-described (cooling) troughs. The nozzles then direct the hot water against the bags providing the massaging and rotating action as previously described to efficiently heat the bag contents. And the jet conveyor 498 conveys the bags along the trough as previously described to the trough end. At the trough end a discharge conveyor 502 removes the bags from the trough and conveys them to the cooling trough 444. Special precautions are taken in the design and operation of the heating trough 436 to insure that the operator thereof is not scalded by the boiling water. The clear cover used for the cooling trough may be replaced by a metal (opaque) cover for the heating trough variation.

Heating and cooling system 420 is a commercially important system because it allows product to be sterilized and cooled in bags, which can be subsequently boxed. This process is considerably cheaper and better for the environment than the current process of using cans. Particularly, it allows one gallon cans to be replaced with one gallon bags, which are shipped in boxes (similar to wine bags in boxes). If the relatively expensive spouts are eliminated and the bags sealed closed, the present bag-in-a-box system provides a very economical replacement for cans.

Figure 31:
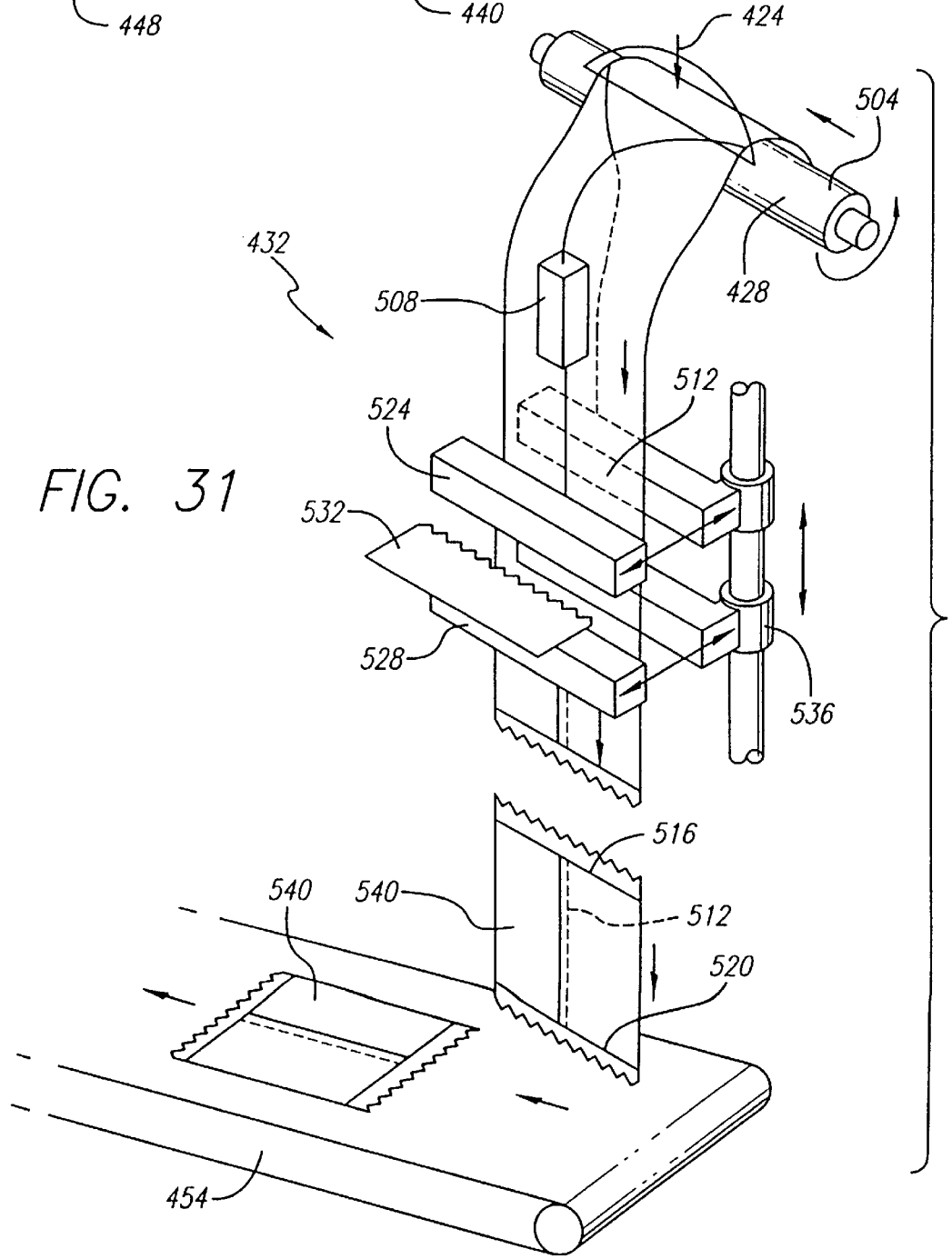
FIG. 31 is a simplified perspective view of a system of the invention of FIG. 30 for forming the flexible containers, filling the containers with product and sealing the filled containers for discharge onto a conveyor.

The bags are made without fill spouts by making them from a continuous roll of bag material preferably using the prior art PENTA PAK SYSTEM equipment as illustrated generally in FIG. 31. A portion of the sheet material 428 unwound from the roll is folded onto itself, sealed transversely along the bottom edge and sealed along the overlapped longitudinal edges. A tube is thereby formed which is closed at the bottom edge and open at the top. Raw product (424) is then poured in through the open top. The top is sealed along a top edge, and the material cut above the top seal. And the process continues to form the next filled and sealed bag, and so forth. This process allows the bag to be sealed before the product (424) is heated, which is advantageous because sealing cannot be controlled well when the product is hot.

More particularly and referring to FIG. 31, the plastic material 428 is unrolled off of a film roll 504 over a collar (much like a shirt collar) and the flat stock is automatically formed into an unsealed tube. As the tube travels down vertically, it slides past a longitudinal sealing bar 508 which joins the two lapping edges in the back in a longitudinal seal 512 (a potato chip bag is a good example where the seam that runs straight down the back is the longitudinal seal). Transverse seals 516, 520 across the top and bottom of the bag are made with two retractable sealing jaws or bars 524, 528 with a retractable knife blade 532 between. The traverse sealing bar assembly on vertical carriage 536 moves up past the sealed tube when its jaws are open. At the top of the upward stroke (the length is determined by the desired bag length) the heated jaws 524, 528 close and start sealing the bag. With the jaws still closed, the jaw assembly or carriage 536 moves downward to pull more bag material 428 off the roll 504 and over the collar and past the longitudinal seal bar 508.

As the traverse sealing bar assembly nears the lower end of its stroke, the knife blade 532 extends between the two sealing bars 524, 528 to cut and separate the top of the first bag from the bottom of the second bag. The jaws 524, 528 then open, the first (lower) bag 540 drops onto a conveyor 454, and the jaw assembly starts upward to make another bag. As the sealing jaw is moving to its upward position, the product 424 to be packaged is dropped into the neck of the collar and slides down to the seal that was just formed by the last jaw closure in the bottom of the new bag. This process works well for room temperature products 424, but not for hot filling since the heat from the product within interferes with the sealing process. That is a reason why filling cold then heating and cooling pursuant to this invention is such a valuable invention.

There is no scale limit for system 420. It can be scaled down to process individual ketchup pouches or scaled up to process bags the size of large railroad cars. The fluid dynamics would change, but the systems would have to tailored to each product in any event.

The heating trough 436 would be very similar to the system 100 and would utilize the principles thereof including the massaging and rotating of the flexible bags in the heat transfer fluid. Of course, the main difference is that a (sterilizing) heating fluid would be used instead of a cooling fluid. Thus, the cooling tower (242) would be replaced with a heating system (440). This means that the components of the system which would be exposed to the high boiling temperatures would have to be made of suitable materials. For example, the pressure manifold (128, 132), suctions lines (230) and jets (136) would be made of metal, such as stainless steel, instead of PVC. Also, take-up rollers would be needed to compensate for the large thermal expansion of the plastic of the polypropylene conveyor belting.

The sterilization in the heating trough 436 raises the temperature of the product from ambient to one hundred ninety-five to two hundred degrees Fahrenheit, using only two hundred and eight degree fluid. This takes time, probably ten or fifteen minutes to heat a fifty-five gallon bag 428. In contrast, the cooling trough 444 takes the product from two hundred degrees to one hundred and twenty degrees, but uses seventy degree water. Thus, the cooling only takes five minutes. This means that the heating trough 436 must be two to three times as long as the cooling trough 444. It thus may have approximately nine active massaging and rotating stations.

Figure 33:
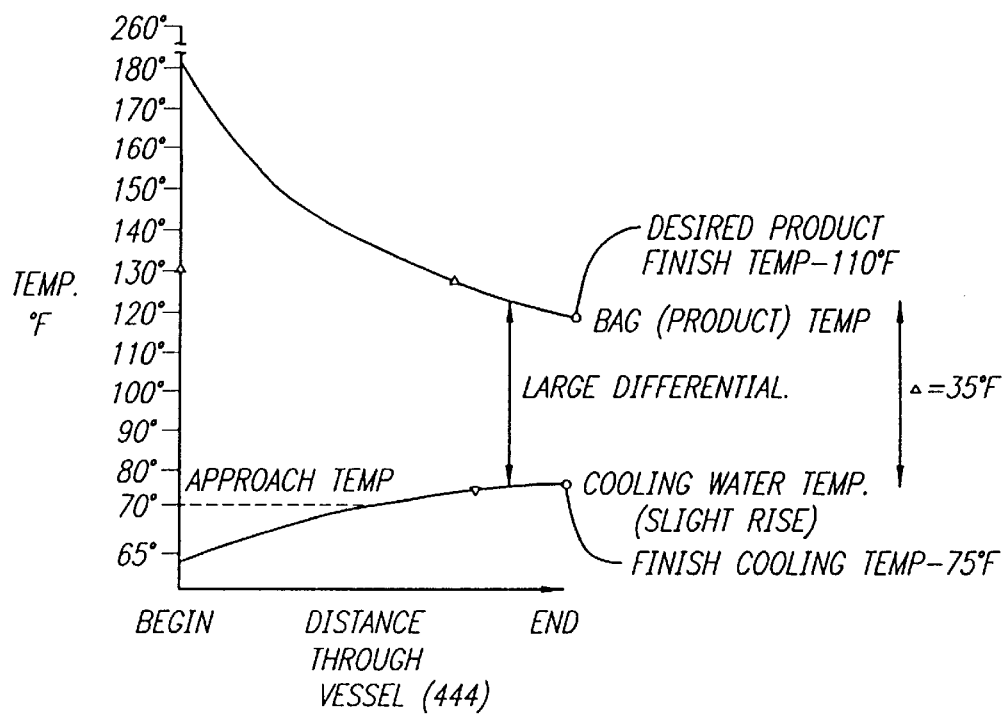
FIG. 33 is a temperature graph of the cooling portion of the system of FIG. 30.
Figure 34:
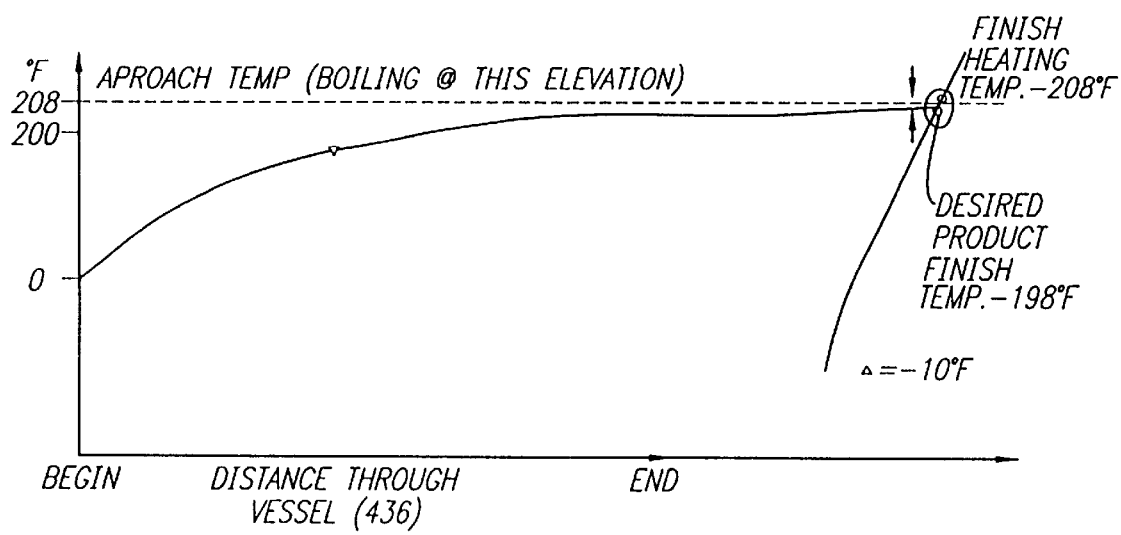
FIG. 34 is a temperature graph of the heating portion of the system of FIG. 30.

The large difference between the time to heat and the time to cool can be readily understood from FIGS. 33 and 34. FIG. 33 shows the situation in the cooling trough 444 where there is a large difference in the temperature between the product in the bag and the vessel solution. This means that there is always a large driving force and therefore a large heat transfer across the bag film. In contrast, FIG. 34 shows the situation in the heating trough 436, where only a ten degree Fahrenheit difference between the temperatures of the product and the heating solution is left. Therefore the driving force for heat transfer is much less, and consequently the time to reach the desired temperature in the bag is about three times longer for heating than cooling. To significantly raise the temperature of the heating solution is likely not commercially practical.

Thus, the heating trough 436 will be about three times longer than the cooling trough 444 in system 420 if water at atmospheric conditions is used as the heat transfer solution. The heating trough 436 can be three cooler-sized troughs (120) running end to end (in series) or parallel into a cooling trough running three times faster. In either case the heating volume will be three times larger than the cooling volume. If the bags are run in series, there would be nine active stations in the heating trough 436. The system can also be designed so that there are fewer active stations with more time spent at each station, but a single file unit would likely then be used to combine parallel tubes into one row before entering the cooling trough 444.

For a fifty-five gallon bag of diced tomatoes, approximately fifteen minutes is needed to heat to a sterilization temperature of one hundred ninety-five to two hundred degrees, starting at a seventy degree temperature. Although hold time at a sterilization temperature varies for each product and container, it will typically be eight minutes for a fifty-five gallon bag with a fill spout when the bag is "hot filled" (product heated in a heat exchanger and dumped into a cold bag and capped with a cold cap). Without a fill spout that time can probably be reduced to four minutes. The reason for that reduction is that the fill spout is a large piece of plastic and plastic is a thermal insulator. While the product probably only needs two minutes at sterilization temperature to be sterilized and the bag probably needs the same, the fill spout probably requires four minutes. Therefore, the system comprised of the product (heated in a heat exchanger and delivered to the bag) plus bag plus spout requires eight minutes of hold after assembly.

Heating after assembly of the package allows for container heating in parallel with product heating. So the hold time in a bag with or without a fill spout can likely be reduced to two minutes after leaving the heating section. It would be most practical to size the heating vessel so that the hold time is accomplished in the dead zone of the vessel. The big time saving is in heating the fill spout (the longest time requirement) while the product is being heated. The total dwell time in the heating trough will probably be fifteen to eighteen minutes for a fifty-five gallon bag of tomatoes and most other common foodstuffs.

The bag material only needs to hold a slight vapor pressure within the bag in system 420. Using water as the heating fluid that is open to atmospheric pressure means that any boiling will occur in the water and not the foodstuff or other product. Since the heat source is the heating fluid and not the foodstuff, the temperature will always be slightly higher in the vessel (120) than the bag. Therefore any tendencies to flash will be in the fluid and not the foodstuffs. The bag only has to hold a pressure slightly higher than atmospheric to prevent flash to vapor (boiling) within the bag.

A system, pursuant to this invention, that uses a heating fluid with a boiling temperature higher than that of the bag contents requires careful monitoring so that the bags are not exploded. On the other hand, a system that uses a heating fluid whose boiling point is equal to or lower than that of the bag contents would be intrinsically safe. The heating fluid likely has a lower boiling point than the foodstuff within because the water is relatively pure when compared to the bag contents. Pure water boils at a lower temperature than water that has salts (from the food) dissolved in it.

The lower the viscosity of the product 424 to be heated, the less horsepower required to circulate the contents. As the viscosity increases, the horsepower delivered to the bag must increase. The strength of the bag limits the amount of horsepower that can be delivered to the bag. High water content of the product 424 is not required. Even dry products can be heated as long as they have a fluid flowable consistency.

The product (424) is not limited to foodstuffs, such as tomatoes, peppers and peaches. The product, for example, can be certain medical products that need sterilization. Products that need heating to be "finished" can be processed in this system, such as a chemical reaction that may be catalyzed by heating and that cannot be conveniently bagged after that reaction. Also, system 420 would allow manufacturers, such as chemical manufacturers, to work easily with highly corrosive materials without using expensive anti-corrosion heat exchangers and piping systems by processing the materials in flexible bags.

Figure 35:
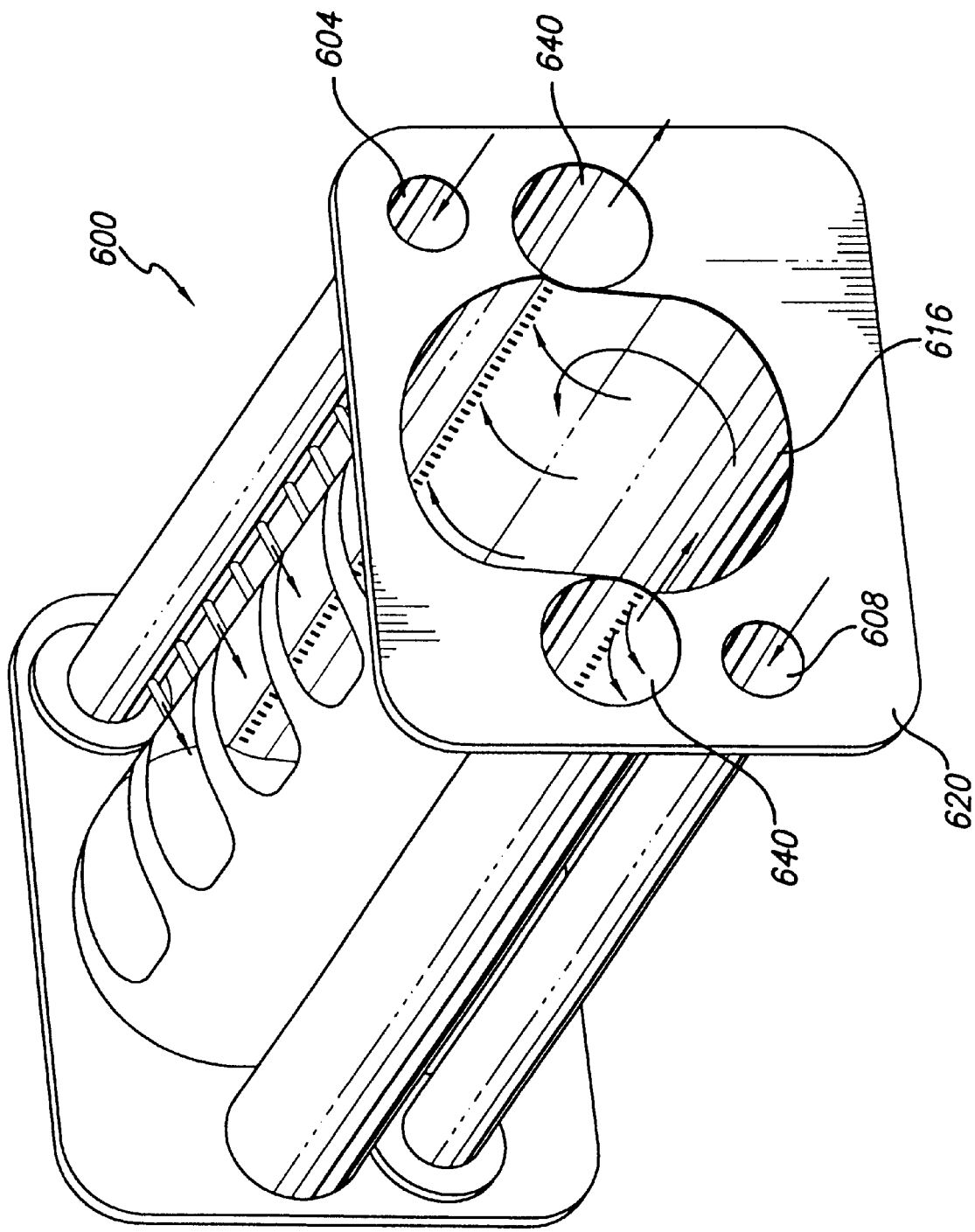
FIG. 35 is a first perspective view of a pipe section of an alternative design of the present invention.
Figure 36:
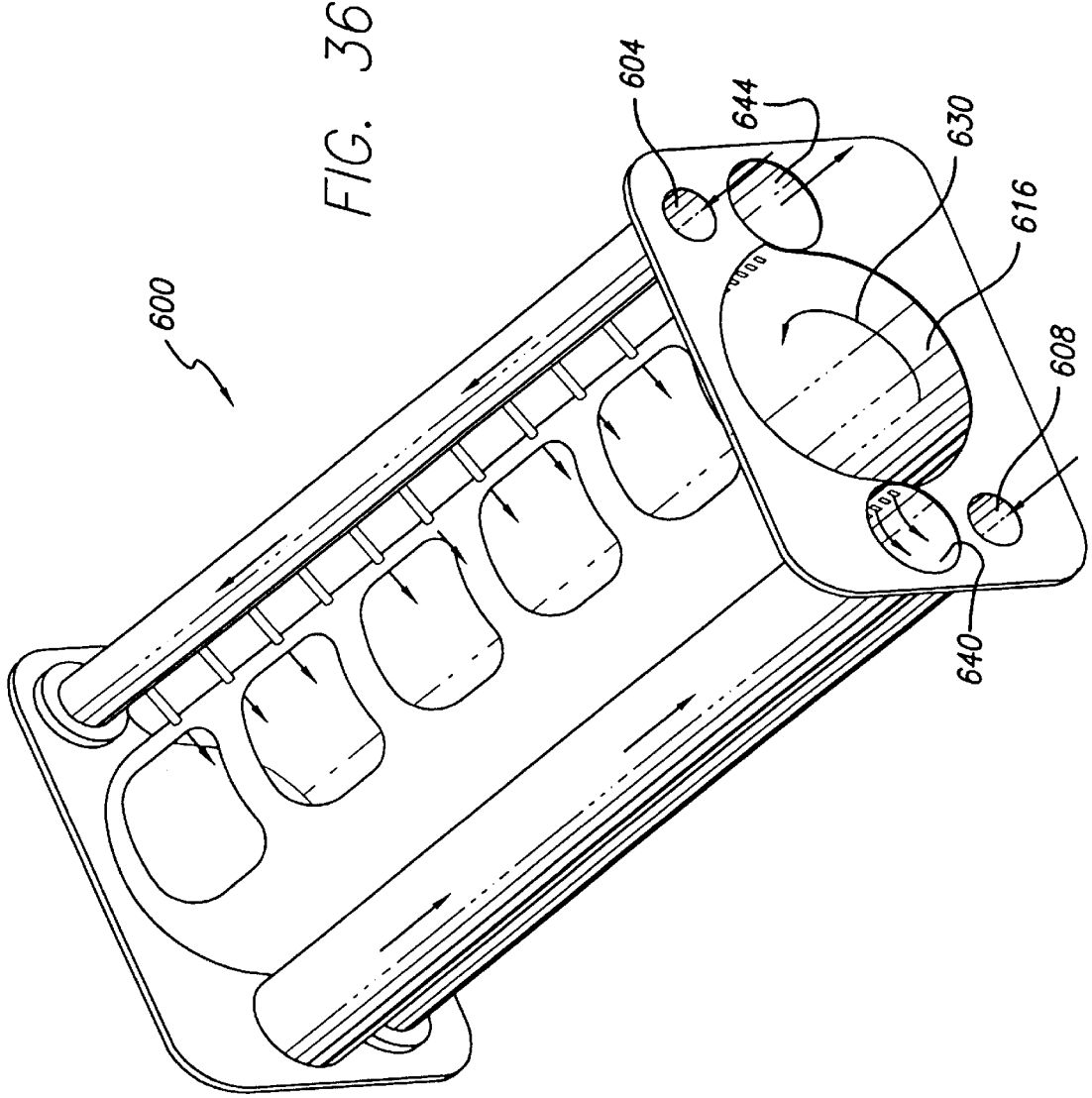
FIG. 36 is a second perspective view of the section of FIG. 35.
Figure 37:
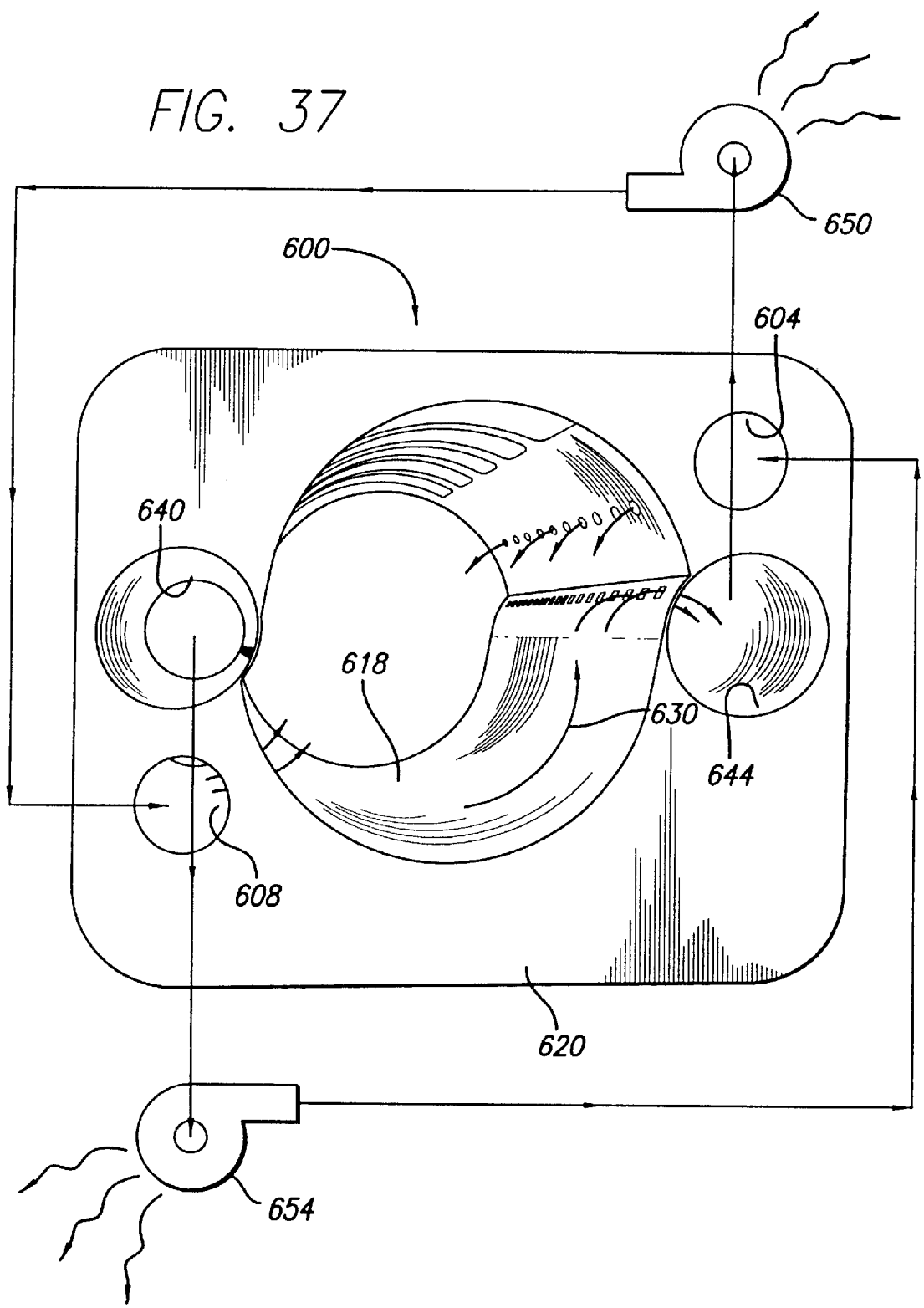
FIG. 37 is an end perspective view of the section and showing the fluid pump connections.

An alternative system 600 of the present invention is shown, for example, in FIGS. 35–37. This alternative system 600 can be adapted for either cooling (or heating) bagged or packaged products, as previously described. For discussion purposes, the method or system wherein the bags are cooled will be described herebelow. However, those skilled in the art would be able to readily adapt the cooling system for heating. The main modification for heating is to use metal piping for the pressure lines (nozzle supply) instead of PVC (or any other piping system that is greatly pressure de-rated by temperature increases). The bypass valve also needs to be selected to withstand the heat. The heating can be accomplished in the same ways described in the previous embodiments, namely, fire tubes, heat exchanger, steam lines, microwaves, and so forth. Similarly, the cooling can be established in any of the ways previously discussed, as by a cooling tower or a chiller.

Referring to FIGS. 35–37, a pair of high pressure cooling fluid (water) tubes 604, 608 are provided on opposite sides of the main trough or larger products conveyance tube 612. The cool water passing under high pressure in the cool water inlet tubes is then dispensed or sprayed into the main channel 616 by a plurality of nozzles, such as previously described and shown in previously-discussed FIGS. 26–28. Each trough assembly section 600, such as pictured in FIG. 1, is approximately eight feet long and its sealing surface gasket plate 620 is forty inches tall and forty-eight inches wide. Eleven nozzles can be used for each pressure supply tube section spaced equally along the tube length resulting in a total of twenty-two nozzles per section. Eight sections can be connected together making for a total of one hundred and seventy-six nozzles. The first and second sets of nozzles off of the first and second pressure supply tubes 604, 608 then induce a torque or a rotation of the flexible bagged product in the tube (enclosed trough) as shown by arrow 630. This causes not only a rotation of the bagged product but also a massaging action, similar to that described in the earlier-described embodiments of this invention. The cooling water after encircling and cooling the products in the bags is then dispensed out through the fluid outlet tubes 640, 644. The fluid outlet tubes or suction lines 640, 644 can be ten inch stainless steel pipes. In contrast, the cool water pressurized inlet pipes can be six inch PVC pipes.

Referring to FIG. 37, a simplified fluid circuit or plumbing design is illustrated. It is seen there that first and second pressure pumps 650, 654 are used. For the first pressure pump 650 the bag 670 moves to the far right until its suction to that pump is completely plugged at which point it quits pumping, since there is no flow from the lower left nozzles. The second pump 654 thereby pumps harder because its suction is opened wider. The second pump 654 then creates a force to the left and sweeps the bag 670 off of the first pump suction, and the first pump 650 then resumes pumping.

The bag 670 then moves to the far left and the second pump 654 quits pumping. The first pump 650 thereby is caused to pump harder and the bag 670 gets swept from the second pump suction. The second pump 654 resumes pumping and operation is restored automatically. The resulting action of these first and second pumps 650, 654 is that the bag 670 slowly oscillates between the first and the second sides, and the bag thereby never completely plugs either side pump suction.

Figure 38A:
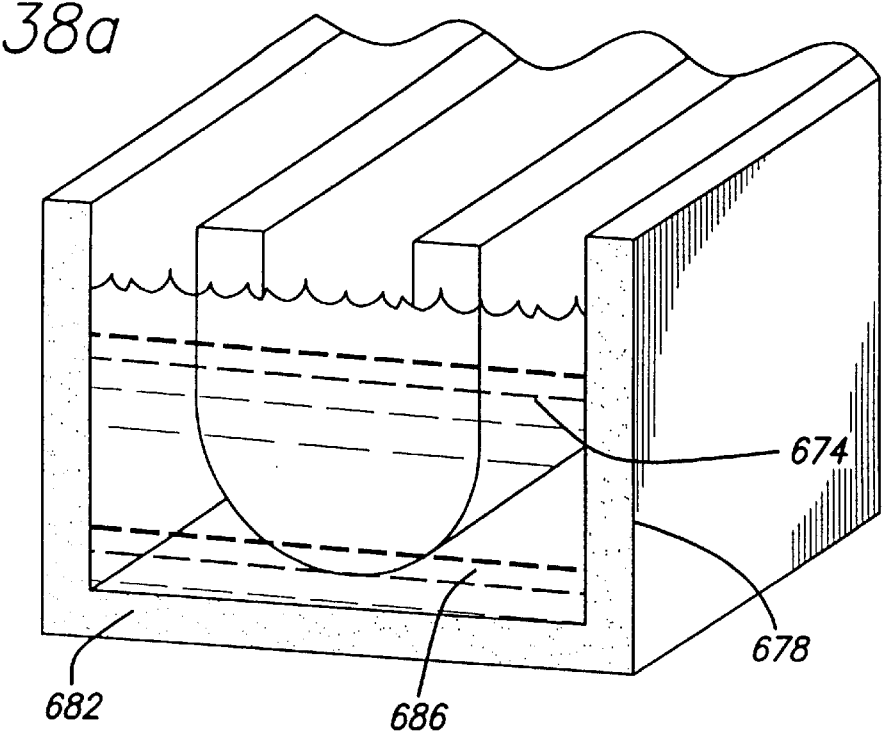
FIG. 38a is a perspective view of a cut-away of an earlier-described design.
Figure 38B:
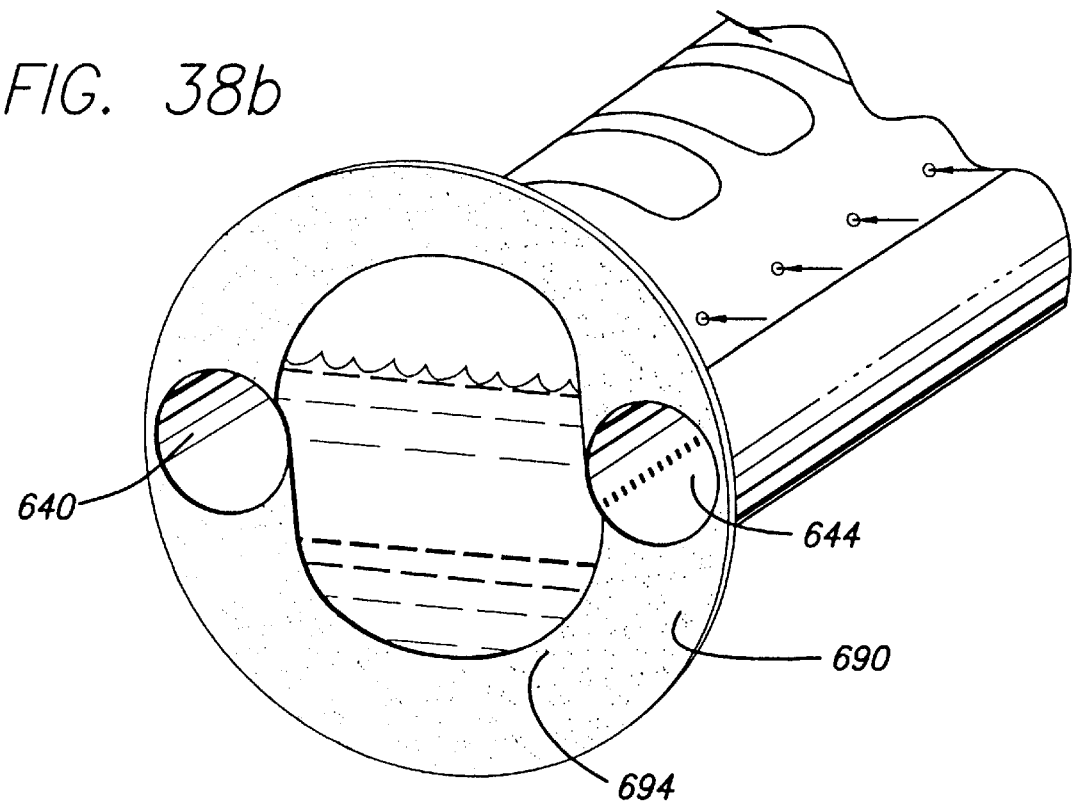
FIG. 38b is a perspective view for comparison purposes with FIG. 38a of the alternative design.

A comparison of the earlier-described design having the perforated trough sitting in the sump and the presently-described alternative design can be understood from a comparison of FIGS. 38a and 38b and the following discussion. FIG. 38a shows generally the old design with the perforated vessel 674, the outer tank 678, and the insulation 682, and the surface area 686 for heat loss to the environment is that of the outer tank. In contrast, referring to FIG. 38b, the insulation is shown at 690 and the surface area 694 for heat loss to the environment is that of the vessel. The alternative design is theoretically more efficient at inducing internal circulation. And better internal circulation means faster cooling and therefore smaller and less expensive machines. Also, better circulation allows the machines used to be extended to extremely viscous products, such as peanut butter and so forth, without damaging the fragile bags. In other words, the vessel design of FIGS. 35–37 allows for more efficient machines, smaller machines, wider range of applications with the same bag strength, easier assembly and more reliable sealing at modular interfaces as will be described later. Additionally, the alternative design is less sensitive to coolant level than the earlier-discussed design, which can operate within a range of a few inches about the ⅘ full level. Because the only escape for the coolant (cool water) is through the suction lines 640, 644, the alternative design can operate between a level between just above the suction lines all of the way to the top. A further advantage of the alternative design is that it is less sensitive to trough fluid levels making the operator's job easier.

Figure 39:
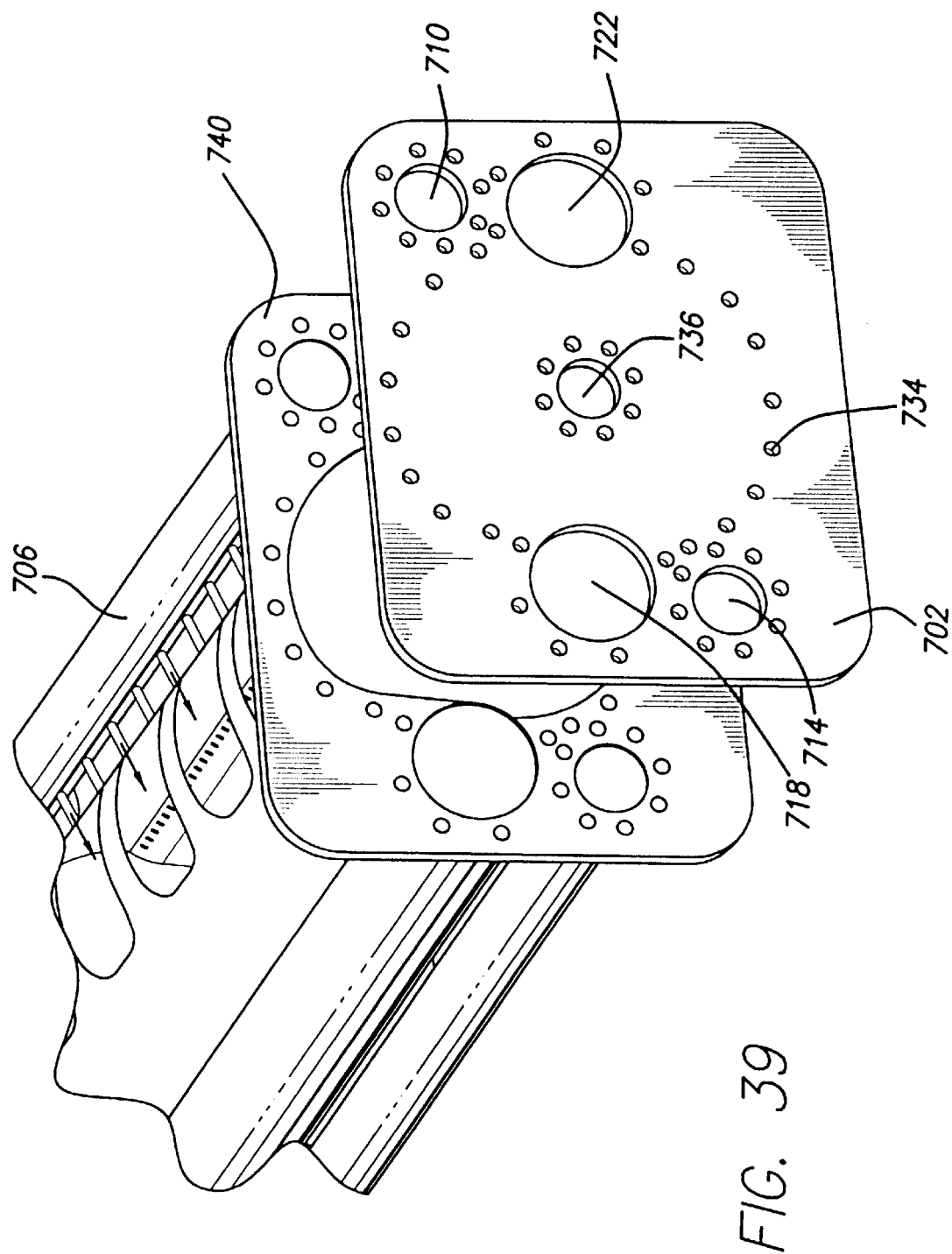
FIG. 39 is a perspective view showing the infeed module end plate for the design of FIG. 35.
Figure 40:
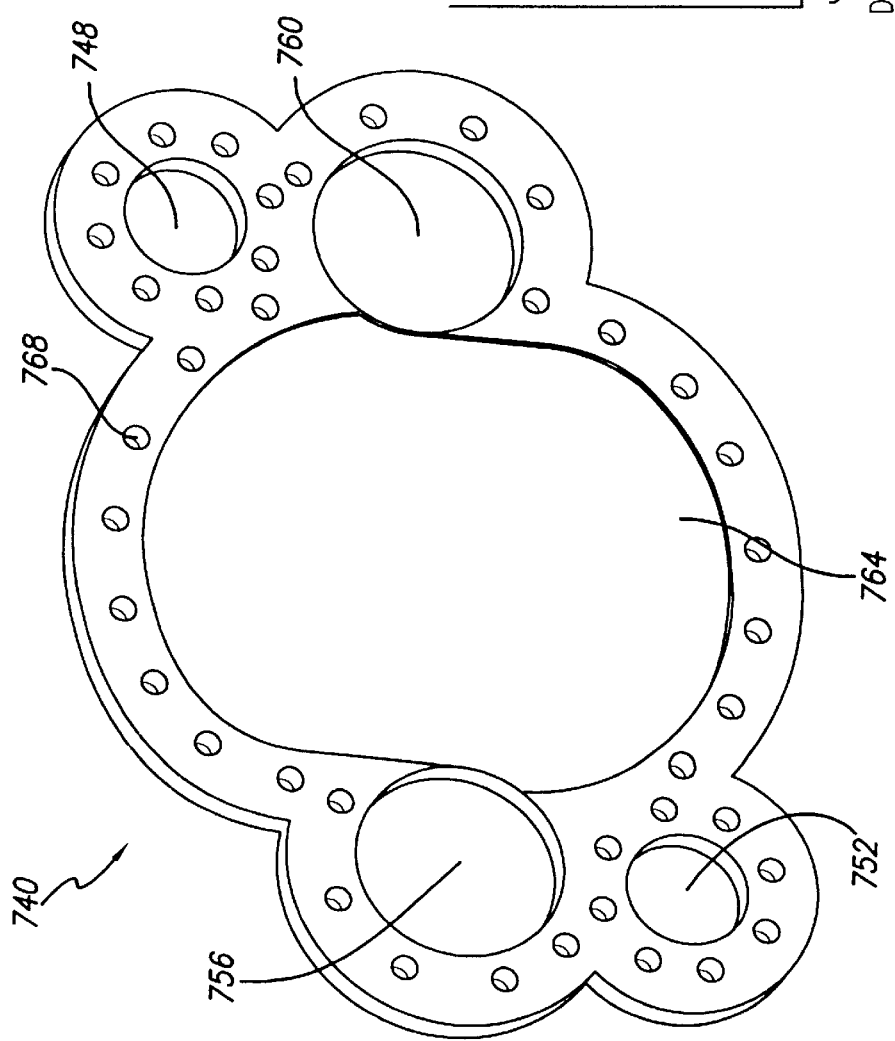
FIG. 40 is an enlarged end view of the gasket of FIG. 39 shown in isolation.

FIG. 39 shows how an endplate 702 for mounting to an infeed module 706 (or 600). The blind endplate 702 includes pressure line openings 710, 714 and suction line openings 718, 722 as well as the bypass or jet conveyor port 736. Further illustrated are the bolt hole openings 734. And the blind endplate 702 is mounted to the gasket 740. The gasket 740 is best shown in isolation in FIG. 40. It can be made of an elastomer, such as, Buna-N, Viton, Neoprene, and so forth. Teflon would be used for high temperatures, as an example. Gasket 740 includes pressure line openings 748, 752, suction line openings 756, 760, bag path opening 764 and bolt holes 768.

Figure 41:
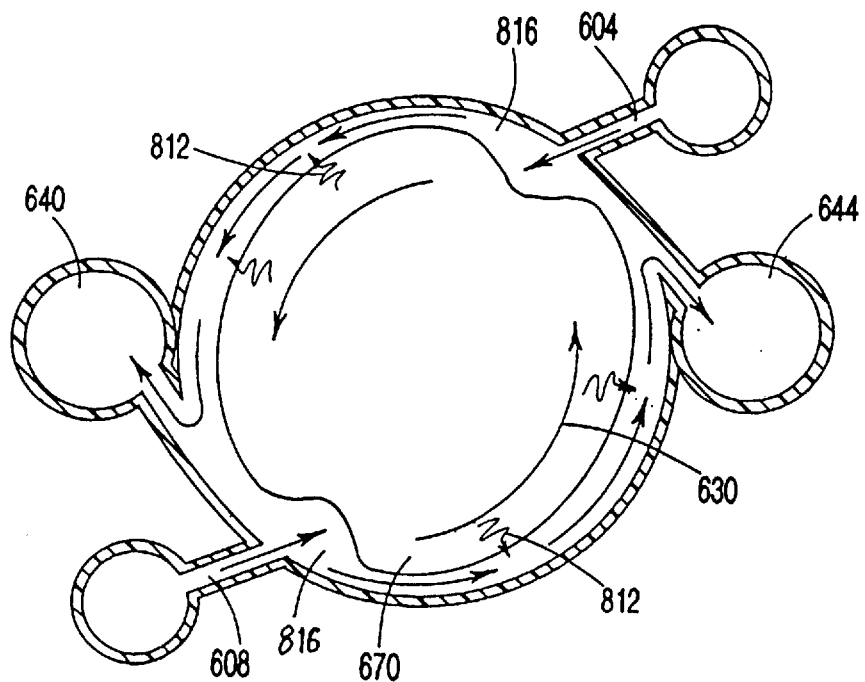
FIG. 41 is an end view showing bag movement in the alternative design.
Figure 42:
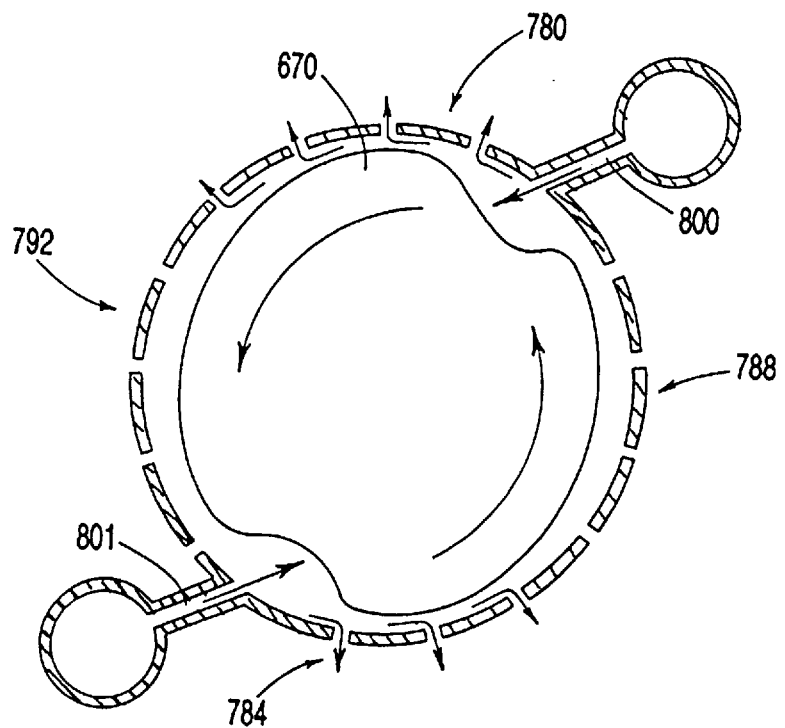
FIG. 42 is a view similar to FIG. 41 showing the earlier-described design.

A further comparison of the bag rotation and cooling action between the alternative designs and the prior designs is shown in FIGS. 41 and 42. FIG. 42 shows the earlier-described design. Referring thereto, it is seen that the cooling water is allowed to escape from the bag surface in a top zone 780 and at a bottom zone 784. Unlubricated zones 788, 792 on opposite sides provide high bag viscous friction. The jets 800, 801 are illustrated as well as the perforated vessel. The suction from the large tank or sump is difficult to insulate.

In contrast, the alternative design is shown in simplified cross-section in FIG. 41. It shows the conveyance tube, the first and second nozzle jets 604, 608, and the first and second suction tubes 640, 644. The bag 670 is shown, and its rotation is shown by rotation arrow 630. The heat 812 transfers across the bag. Advantageously, the cooling water 816 stays with the bag and lubricates for a better bag rotation. Thus, the alternative design has the advantage over the earlier-described design of having less exposed surface area per bag volume and thereby less heat gain/loss to the surroundings. This makes it easier to insulate, which is important and likely necessary when cold brine or very hot boiling water solutions are used. Only one sealing surface is necessary at the endplate 702. In contrast, the previous design can require inner and outer vessel seals, if modular. The crisscross plumbing design of the discharge pipes and the suction pipes creates perfect axial centering of the bag 670 in the tube or trough. Further, the unperforated vessel, trough or tube (600) of the alternative design allows for improved bag lubrication and therefore faster rotation. This results in better internal circulation, faster heat transfer, smaller machines, lower cost and a firmer product.

For each eight foot section (see FIGS. 35–37) there are typically two rotation stations therein. There will be a minimum of two bags per eight foot section, or a maximum of three. Variable bag populations are possible since the bags 630 are flexible and not totally filled, and their diameters can be increased if compressed end to end. The diameter of the vessel is such that there is a leeway for the bag 670 to increase its diameter and not stick to the walls.

The maximum practical dwell time per station is about fifteen minutes. And the minimum is determined by the production rate. Theoretically, on very large machines, the dwell time could be one second. However, as a practical matter the minimum dwell time is about fifteen seconds. Lower than that, as a practical matter, may require parallel systems. Fifteen minutes multiplied by forty rotations per minute gives a maximum of six hundred rotations. The practical minimum is fifteen seconds multiplied by forty rotations per minute to get ten rotations minimum per station.

As previously described with respect to FIG. 37, two pumps 650, 654 can be used. However, it is also within the scope of the invention to use one pump to pull from both suction lines 640, 644 manifolded together and the pump delivers to both pressure manifolds. Although the single pump system works, the preferred method is to use the two pump system because the natural centering action does not occur unless there is that tension between two opposing criss-cross systems. The centering results in faster rotations, which creates better internal circulation.

Figure 43:
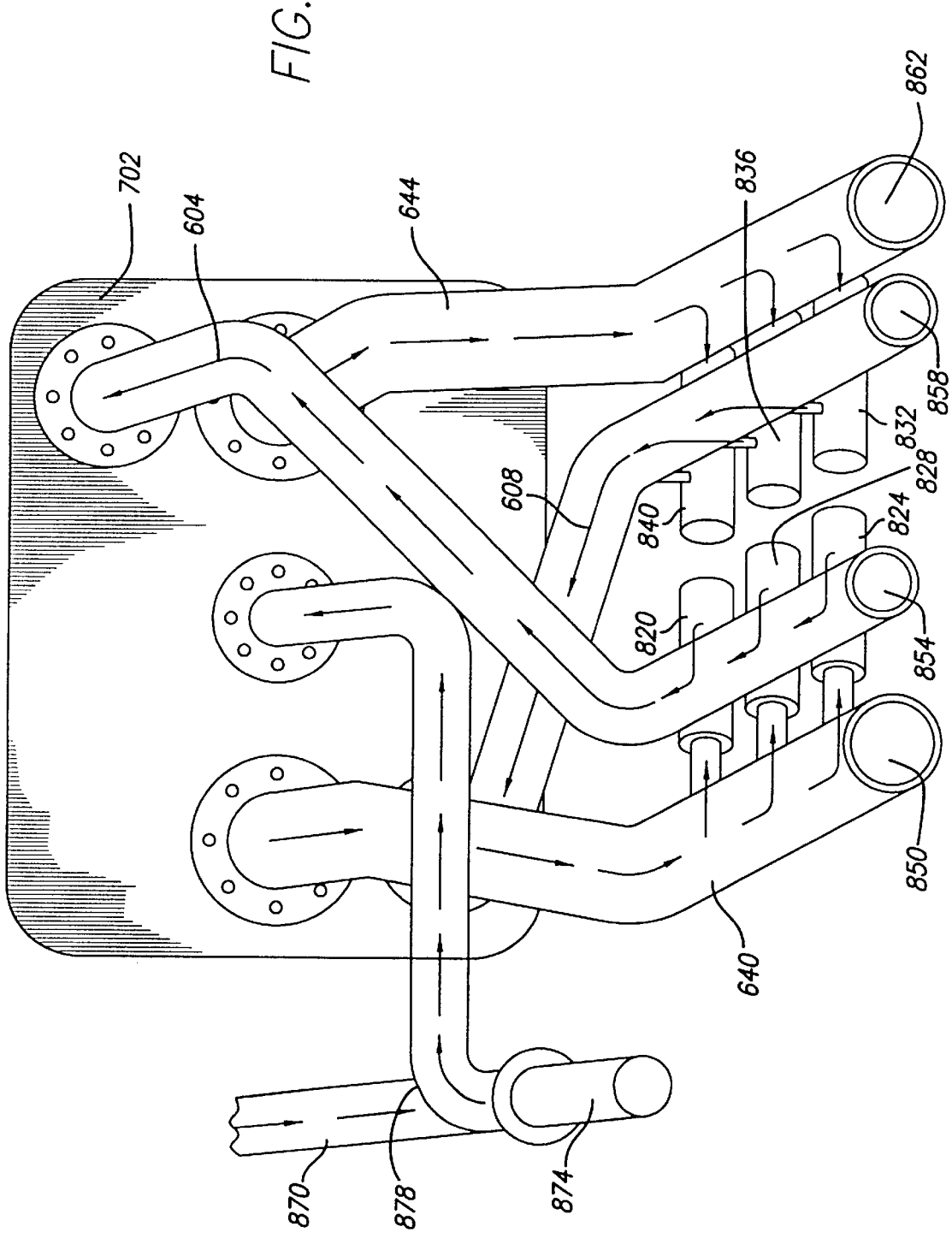
FIG. 43 is a perspective viewing showing the pump piping of the alternative system.

The pumping hydraulics with the criss-cross setup are shown in FIG. 43. It is seen therein that according to one embodiment six (instead of two) pumps 820, 824, 828, 832, 836, 840 are provided, each discharging into respective discharge lines 604, 608 and pumping fluid obtained from larger suction lines 640, 644 feeding in from the conveyance trough or tube. The left side suction 850, discharge 854 to the right side, the right side suction 862 and the discharge 858 to the left side are shown in the lower right portion of the drawing. Suction from the exit module 870 feeds into the bypass pump 874 which pumps the conveyance fluid into the conveyance tube. The bypass 878 for 90° modules, if used, will be described in detail later.

Figure 44:
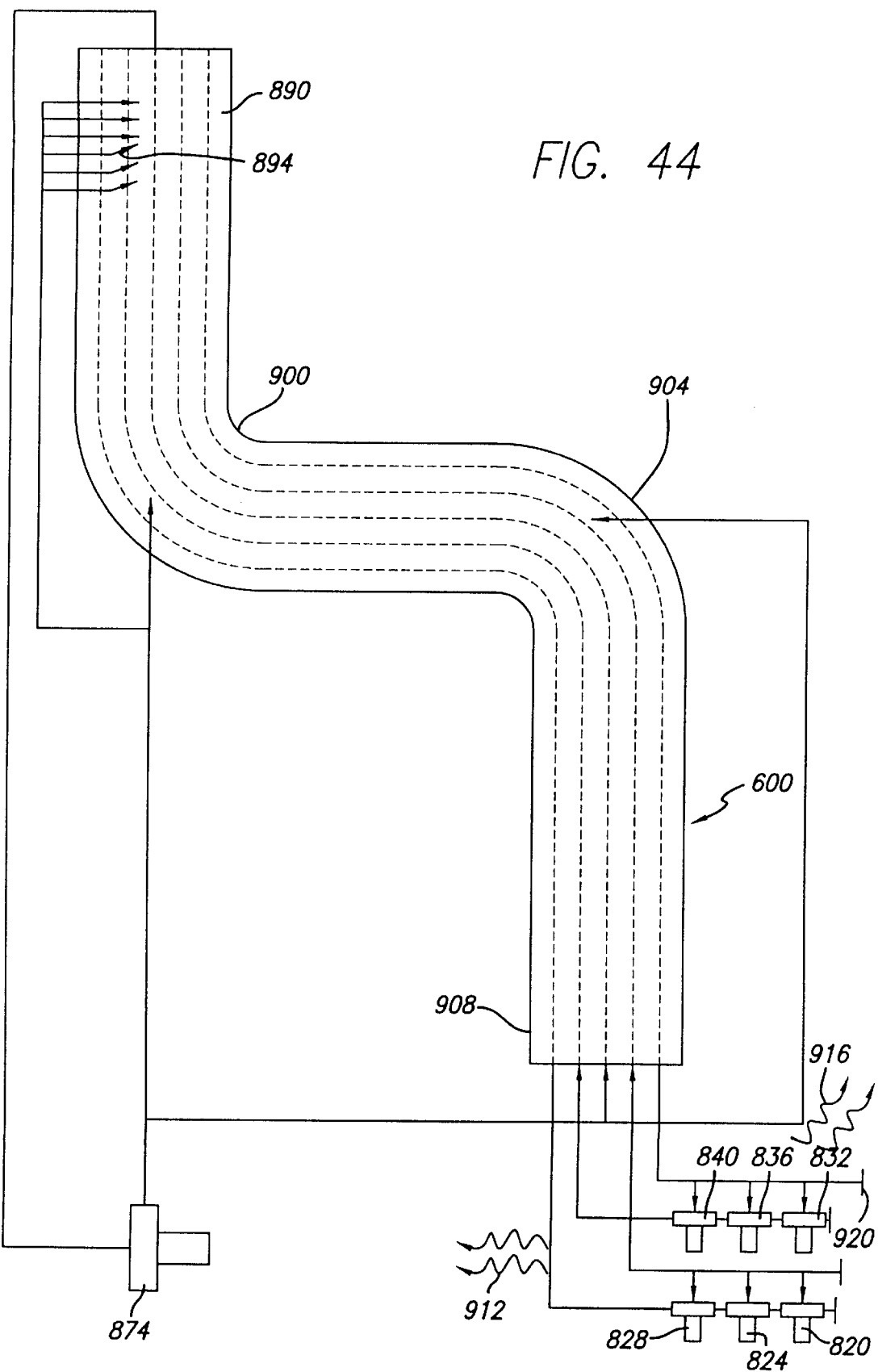
FIG. 44 is a schematic view of the pumping system of FIG. 43.

The schematic of the hydraulics of FIG. 43 is shown in FIG. 44. Referring thereto, the exit module is shown at 890 and the orienting jets 894 from below, if used, are shown. The 90° right turn module 900 is depicted in the upper portion of the drawing and the 90° left turn module 904 adjacent thereto. The vessel modules or sections 600 are illustrated, as is the infeed module at 908. Feeding into the infeed module 908 are the multiple pumps 820, 824, 828 on one side and pumps 832, 836, 840 on the other. Multiple pumps are provided for redundancy. The heat rejection systems are shown schematically at 912 and 916. The blind manifold for additional expansion is shown at 920. The bypass pump 874 can take the place of the valve when the cycles are low and the high cycles require valves because stopping and starting the pump motor would overheat the motor.

Three methods of timing of the pumps can be used. The first method is to use the bypass pump 874 which is separate from the other pumps. This is good for low frequency or multiple 90° turns. The jet pumps (e.g., 820, 832, etc.) are always "on" for this method. The bypass pump 874 or main conveyance pump is on when it is time to advance the bags. The timing of this system is shown in FIG. 45 generally at 930. A second timing method uses a bypass valve which works in high frequency and straight line applications. The timing is the same as in the first method except that the main conveyance fluid is tapped from one or both of the pressure manifolds. The third method is used on a 90° turn. The outer pressure manifold 934 is tapped at the outside for flow providing less plumbing. This is shown in FIG. 46 where the bypass valve is shown at 938 and the bag flow is shown by arrow 942. The timing is the same as for the first method.

The pump (e.g., 650 or 828) can be a twenty horsepower, one hundred thrity-five PSIG deadhead, one hundred and twenty PSIG at two hundred and seventy-five GPM, open drip-proof motor, centrifugal pumps with retrofitted air purge systems. Alternatively, forty or sixty horsepower pumps can be used for larger system as long as at least four total pumps are used—two for the criss-cross piping and two for the redundancy. That is, if one fails, the system does not have to be shut down. The number of eight foot modules (600) used depends on the bag weight and the product viscosity, insulative quality, the bags used, the product temperature, and so forth. A typical size would use approximately sixty total feet including infeed. Therefore, approximately seven center modules and one infeed for about a sixty-four foot active length for a space for sixteen bag minimums or twenty-four bags maximum can be used.

The overall cooling system will look the same as that described earlier in this disclosure except for the criss-cross plumbing design and, the orientation section, the vessel design, the anti-injection filter which stops particulates generated by the self-destructing pump from being injected into the bags by the nozzles. The electrical schematic will preferably have an isolation transformer to eliminate grounding problems at the plant.

The bypass valve will preferably be a ball valve to provide for more positive shutoff and better flow direction than a butterfly valve. FIGS. 47 and 48 show straight down axis flow pattern of a ball valve 944 and canted axis flow of a butterfly valve 948, respectively. Additionally, the check valves on the cavitation eliminator system on the pumps will preferably be diaphragm check valves, rather than ball check valves, for lighter forward pressure opening and more positive closing.

Figure 51:
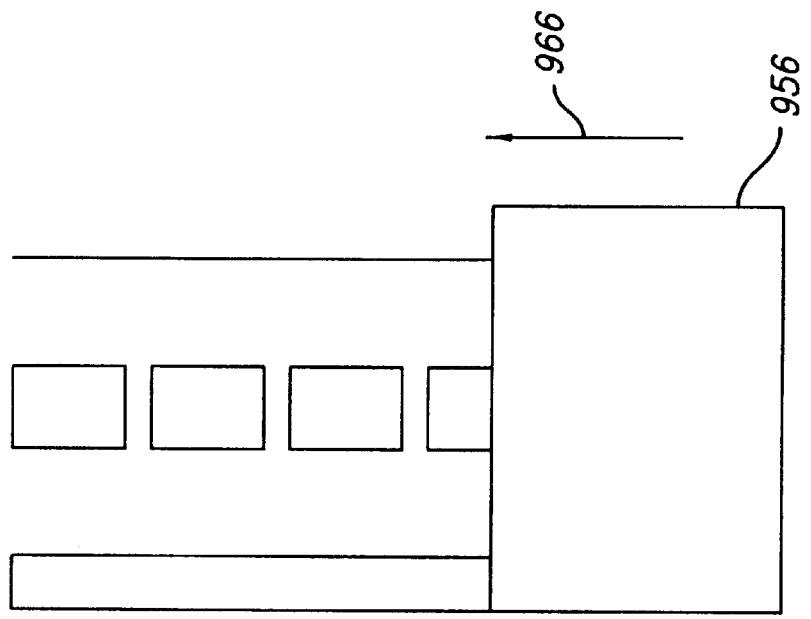
FIGS. 49, 50 and 51 show side, end and top views, respectively, of a hopper for the alternative design.
Figure 49:
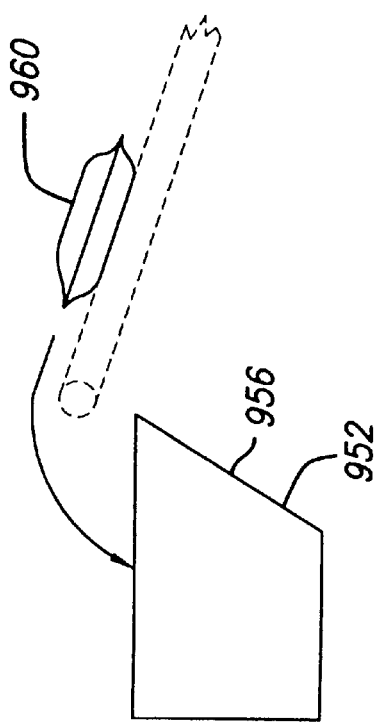
Figure 50:
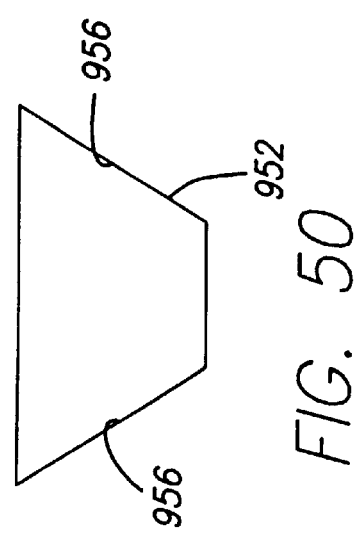

The entrance module would be the same as a regular eight foot module 600 with an infeed hopper bolted on top and a larger access hole to accept the bag. Also, the pumping manifold would have connections attached to a blind end plate (blind to the bag but not to the suction and discharge lines). The side and end views of the infeed hopper 952 are shown in FIGS. 49 and 50 with the slide surface shown at 956 and the bag shown at 960. A top view of the hopper is shown in FIG. 51 with feed bag flow 966 extending up in the drawing.

An important function of the exit modules is bag orientation. There are two preferred ways to accomplish this pursuant to this invention. Referring to FIG. 52, the bag 970 is forced through an elliptical opening 974 and is made to stand on its edge 978. More particularly, the random orientation about the axis is shown at 982 within the round vessel 974. The edge is placed at one side of the conveyor 990 and the bag lays down as shown by arrow 994, and the bag is centered on the conveyor 998 after it rolls over.

The second method is best shown in FIG. 53. Referring thereto the random orientation about this axis is shown at 1000. And the jets 1004 impinging on the center of the axis cause the bag 1008 to orient with its seams horizontal. The oriented bag 1012 is centered on the exit conveyor 1016.

Figure 54:
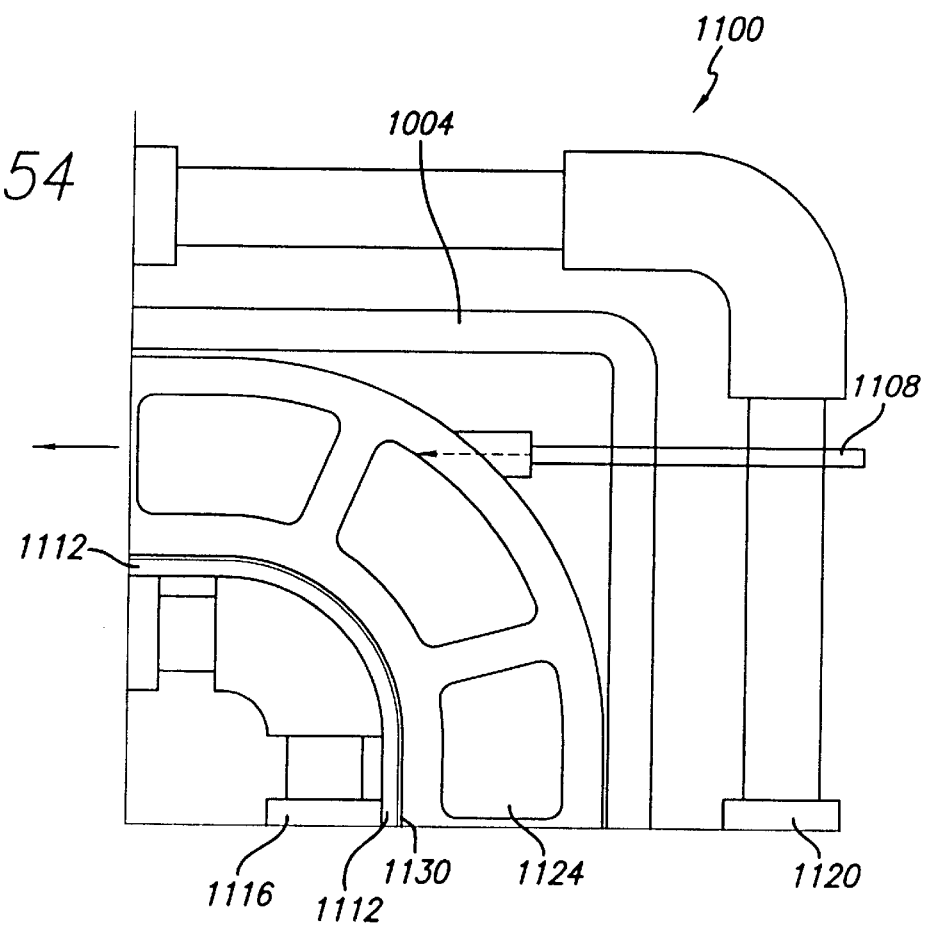
FIG. 54 is a top view of a 90° section of the alternative design.

An example of the previously disclosed 90° section is shown in FIG. 54 at 1100. Referring thereto the right suction manifold is shown at 1120. The bypass jet which is in line with the exit axis is shown at 1108 and the left suction manifold is shown at 1112 with the left pressure manifold and the right pressure manifold shown at 1112, 1004, respectively. The access hatches 1124 are shown at the top of the product conveyance tube 1130. This 900 section is for turning corners while continuing the vessel conveyance. The bypass jet 1108 is piped in parallel with the bypass at the infeed. This way whenever the signal to advance the bags is given, the bags are helped around or assisted around the corners. Right and left turn sections can be used with vessel modules to form any configuration, and two can be combined to form a 180° turn (as shown in FIG. 44, for example).

A variation to this alternative vessel design is to use the same concept except larger and fewer holes in the suction manifold are used. Alternatively, smaller and more numerous holes can be used in the suction manifold. Although three or four suction manifolds can be used in place of two, one suction manifold is not preferred because it would allow for complete coverage by a limp bag. A complete suction occlusion by a bag would create a system shutdown requiring operator intervention to remedy. In other words, the suction system requires that one bag never completely cover the system. A preferred design is one that sets up a tension for the bag on opposite points to cover. In that way the bag always oscillates between the two states, never completely plugging any suction hole. The bag stays centered axially because it prefers to reside at the low velocity center region. This preferred geometry creates an axial region where the bag experiences the lowest velocity from the jets. If the bag can cover a suction line completely, then as it slows the jet velocity by plugging the suction, it is creating its own lower velocity region and plugs the suction more until the flow drops to zero. And it is satisfied (now the system is shut down). The way to create the balance is to set up the geometry so that as the bag plugs one suction line, it relieves another. By relieving the other and each jet discharges prior to the suction line generally on opposite sides. Opposite the vessel, the flow from the jet on the blocked suction line creates a backwashing action that pushes the bag off of the blocked suction area.

Figure 55:
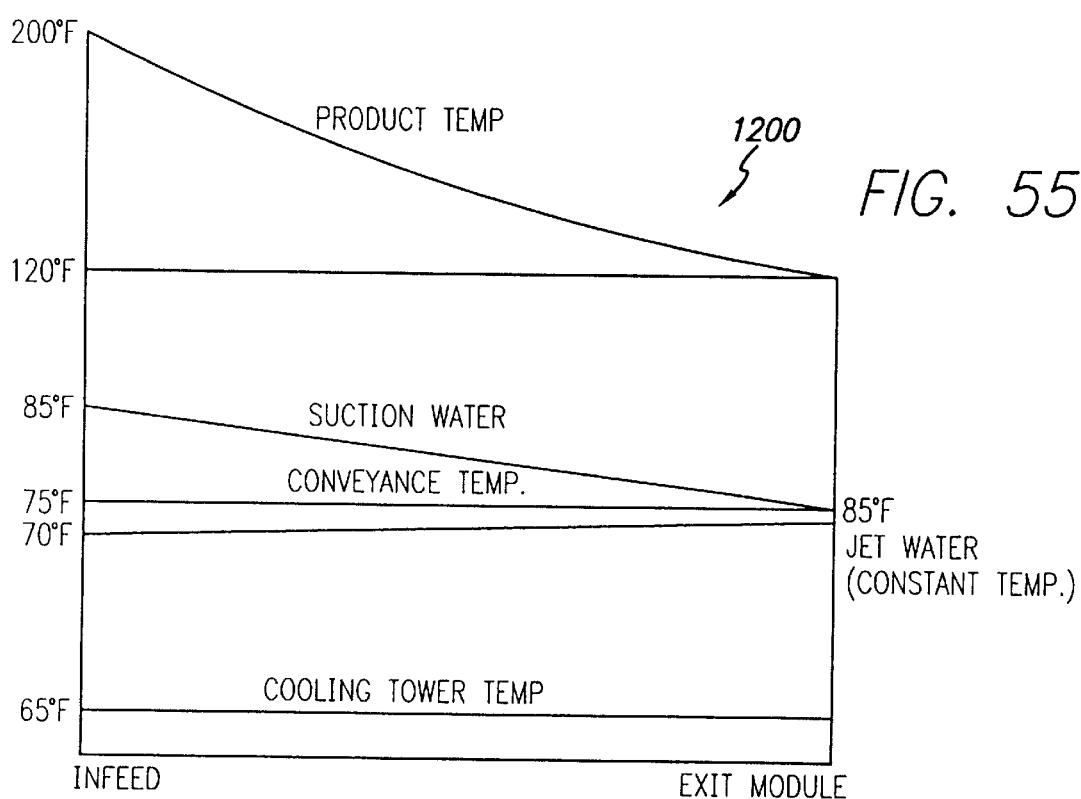
FIG. 55 is a water temperature diagram of the alternative design.

FIG. 55 shows generally at 1200 the various temperatures between the infeed and the exit modules. The product temperatures can be seen therein. The product temperature drops asymtotically towards the cooling tower temperature of 65° F. (or 45° if a chiller water is used). The suction water increases in a straight line from 75° to 85° F., traveling from discharge to the infeed end. As can be seen the conveyance water temperature is steady at 75° and the jet water temperature is constant at 70°. The cooling tower is constant at 65° or 45° if a chiller is used.

From the foregoing detailed description, it will be evident that there are a number of changes, adaptations and modifications of the present invention which come within the province of those skilled in the art. For example, certain features of this invention can be used to heat or cool contents of rigid (as opposed to flexible) containers. However, it is intended that all such variations not departing from the spirit of the invention be considered as within the scope thereof.

What is claimed is:

1. A cooling or heating trough assembly, comprising:
   a bagged product conveyance trough;
   a first nozzle positioned to direct cooling or heating fluid into the trough at a first angle relative to the trough; and
   a second nozzle positioned to direct cooling or heating fluid into the trough at a second angle relative to the trough;
   wherein the first and second nozzles are oriented relative to the trough and to each other such that the fluid directed out therefrom rotates the bagged product conveyed in the trough generally about a longitudinal axis of the trough to thereby promote cooling or heating of the product.

2. The assembly of claim 1 wherein the trough is constructed as a tube.

3. The assembly of claim 1 further comprising a first pump to pump the fluid out of the first nozzle and into the trough, and a second pump to pump the fluid out of the second nozzle and into the trough.

4. The assembly of claim 1 further comprising a high pressure supply tube which supplies the cooling or heating fluid to the first nozzle.

5. The assembly of claim 4 wherein the trough defines a conveyance tube, and the conveyance tube is parallel to the high pressure supply tube, and further comprising a plurality of nozzles through which the cooling or heating fluid flows from the supply tube to the conveyance tube, the plurality of nozzles including the first nozzle.

6. The assembly of claim 1 further comprising a fluid outlet tube out through which fluid in the trough passes.

7. A cooling or heating trough assembly, comprising:
   a packaged product conveyance trough; and
   a nozzle system including a plurality of nozzles positioned to direct cooling or heating fluid into the trough and thereby rotate packaged product conveyed in the trough to cool or heat the product.

8. The assembly of claim 7 wherein the plurality of nozzles includes first and second sets of nozzles, the nozzle system includes a first pressure supply pipe which supplies cooling or heating fluid to the first set of nozzles and a second high pressure supply pipe which supplies cooling or heating fluid to the second set of nozzles.

9. The assembly of claim 8 wherein the nozzle system includes a first suction pipe in fluid communication with the trough and forming a first fluid circuit with the first set of nozzles and a second suction pipe in fluid communication with the trough and forming a second fluid circuit with the second set of nozzles.

10. The assembly of claim 9 wherein the nozzle system includes a first pump which pumps fluid in the first fluid circuit and a second pump which pumps fluid in the second fluid circuit.

11. The assembly of claim 10 wherein the first and second pumps cause the packaged product to oscillate back and forth in the trough between suction openings in one or more walls of the trough.

12. A cooling or heating trough assembly, comprising:
a bagged product conveyance trough; and
a plurality of nozzles disposed to direct pressurized cooling or heating fluid into the trough and cause bagged products conveyed in the trough to rotate and thereby cool or heat the product.

13. The assembly of claim 12 wherein the trough comprises a conveyance tube and the plurality of nozzles includes first and second sets of nozzles on generally opposite sides of the tube.

14. The assembly of claims 12 wherein the trough includes a first set of suction openings on an opposite side of the tube as the first set of nozzles and forming a first fluid circuit therewith and the trough further includes a second set of suction openings on an opposite side of the tube as the second set of nozzles and forming a second fluid circuit therewith.

15. The assembly of claim 14 wherein the operation of the nozzles causes the bagged product to oscillate between the first and second sets of suction openings.

16. The assembly of claim 12 wherein the trough includes first and second sets of side suction openings.

17. A cooling or heating trough assembly, comprising:
a bagged product conveyance trough; and
a fluid pressure supply pipe having a plurality of openings along its length and out through which cooling or heating fluid is discharged into the trough to cool or heat bagged product in the conveyance trough.

18. The assembly of claim 17 wherein the fluid pressure supply pipe defines a first fluid pressure supply pipe, and further comprising a second fluid pressure pipe having a plurality of openings along its length and out through which cooling or heating fluid is discharged into the trough to cool or heat the bagged product.

19. The assembly of claim 18 wherein the first and second fluid pressure pipes are on opposite sides of the trough whereby the fluid dispensed out through their respective openings imparts a rotation on the bagged product.

20. The assembly of claim 19 further comprising first and second suction lines each having one or more openings for sucking fluid from the trough.

21. The assembly of claim 20 further comprising a first pressure pump for pumping fluid from the first suction line to the first supply pipe and a second pressure pump for pumping fluid from the second suction line to the second supply pipe.

22. The assembly of claim 21 further comprising first means for removing heat from or adding heat to the fluid passing from the first suction line to the first supply pipe and second means for removing heat from or adding heat to the fluid passing from the second suction line to the second supply pipe.

23. The assembly of claim 22 wherein when a bagged product in the trough covers openings in the first suction line, the first pump quits pumping.

24. The assembly of claim 21 wherein the first and second pumps cause the bagged product in the trough to oscillate back and forth between the openings in the first suction line and the openings in the second suction line.

25. The assembly of claim 21 wherein the trough comprises a covered tube.

26. The assembly of claim 17 wherein the fluid pressure supply pipe includes fluid nozzles at each of the openings into the trough.

27. The assembly of claim 17 further comprising a suction tube having openings communicating with openings in a wall of the trough for dispensing fluid out of the trough.

28. A method of heating or cooling bagged product, comprising:
providing a heating or cooling trough having a trough wall;
directing heating or cooling fluid into the trough through discharge openings in the trough wall at a bagged product in the trough and thereby imparting a rotation force on the bagged product; and
sucking fluid out of the trough through suction openings in the trough wall.

29. The method of claim 28 wherein the suction openings are on opposite sides of the trough whereby the directing causes the bagged product to oscillate between one side of the trough and another.

30. The method of claim 28 wherein the trough is an enclosed tube.

31. A trough construction, comprising:
a sump structure;
a trough disposed in the sump structure and having at least one opening such that liquid in the trough communicates with that in the sump structure; and
a plurality of nozzles disposed to project liquid into the trough.

32. The construction of claim 31 wherein the nozzles are positioned in a line along one side of the trough.

33. The construction of claim 31 wherein some of the nozzles are positioned on one side of the trough and others on an opposite side of the trough.

34. The construction of claim 31 wherein some of the nozzles are positioned in a first line on a first side of the trough and others are positioned in a second line on an opposite second side of the trough, wherein the first line is in a first horizontal plane and the second line is in a second horizontal plane spaced a distance from the first horizontal plane.

35. The construction of claim 31 wherein the trough includes a first elongate portion and a second elongate portion, the first elongate portion is at an entrance end of the trough, the second elongate portion is at an exit end of the trough and adjacent to the first elongate portion, all of the nozzles are positioned along the first elongate portion, and the second elongate portion defines a nozzle-free zone of the trough.

36. The construction of claim 35 wherein the first elongate portion is secured to an entrance end of the sump structure.

37. The construction of claim 31 wherein the trough includes a pair of perforated side members with an elongate slot defined between lower ends thereof.

38. The construction of claim 31 wherein an exit end of the trough is spaced a distance inward from an exit end of the sump structure such that a backliquid area is defined therebetween.

39. The construction of claim 31 wherein an inlet end of the sump structure through includes a liquid inlet which liquid can be propelled into an inlet end of the trough.

40. The construction of claim 31 wherein the trough includes first and second trough side members, and the at least one opening includes an exit opening between the side members and at exit ends thereof, perforations in the side members and a slot between lower ends of the side members.

41. The construction of claim 31 wherein the at least one opening causes a level of liquid in the sump structure to be the same as that in the trough.

42. The construction of claim 31 wherein the nozzles direct liquid into the trough below the liquid line in the trough.

43. The construction of claim 31 further comprising a liquid jet operatively positioned at an end of the trough to convey product along the trough.

44. The construction of claim 43 wherein at least some liquid from the liquid jet flows out a longitudinal end of the trough.

45. The construction of claim 43 wherein at least some liquid from the liquid jet flows out a central longitudinal slot of the trough.

46. The construction of claim 43 wherein liquid flows alternately from a source to the liquid jet and then to the nozzles and back to the liquid jets.

47. The construction of claim 31 wherein liquid in the trough flows parallel to a product conveyance path in the trough.

48. The construction of claim 31 wherein the trough is filled with product-cooling water which is at a temperature of approximately seventy degrees Fahrenheit.

49. The construction of claim 31 wherein the trough is filled with product-heating water which is at a temperature of two hundred and eight degrees Fahrenheit.

50. The construction of claim 31 further comprising a liquid outlet pipe out through which liquid in the sump structure can flow.

51. The construction of claim 31 wherein the nozzles comprise a first line of nozzles spaced between three and twelve inches apart and an opposing second line of nozzles spaced between three and twelve inches apart.

52. The construction of claim 31 wherein the trough is approximately twelve feet long.

53. The construction of claim 52 wherein the sump structure is approximately twenty-eight feet long.

54. The construction of claim 53 wherein the sump structure is one foot deeper than the trough.

55. The construction of claim 31 wherein each of the nozzles has an elastomeric lining.

56. The construction of claim 31 wherein each of the nozzles has a nozzle pressure of thirty to one hundred and twenty psi.

57. A trough construction, comprising:

a sump structure;

a trough disposed in the sump structure;

the trough including a trough inlet end secured to an end of the sump structure; and the trough including a trough outlet end out through which at least some of the liquid in the trough passes into the sump structure.

58. The construction of claim 57 further comprising a conveyor generally at the trough outlet end which conveys product transported along the trough out and away from the sump structure.

59. The construction of claim 58 further comprising nozzles positioned to dispense liquid into the trough at spaced points along its length.

60. A product heating or cooling method, comprising:

(a) providing a trough construction including an elongate trough disposed in a sump structure wherein liquid in the trough communicates with and is thereby at the same level as that in the sump structure;

(b) projecting product-transporting liquid generally from one end of the trough towards another end; and (c) dispensing heating or cooling liquid into the trough from longitudinally spaced nozzles.

61. The method of claim 60 wherein the dispensing is laterally into the trough against product being transported along the trough by the product-transporting liquid.

62. The method of claim 60 wherein the projecting and dispensing are conducted alternately, one after the other.

63. A trough construction, comprising:

a trough;

a liquid jet positioned at an end of the trough to convey product along the trough and towards an opposite end of the trough; and a plurality of nozzles disposed to project liquid into the trough and against the product conveyed therealong by the liquid jet, to cause the product to rotate.

64. The construction of claim 63 wherein the nozzles direct liquid into the trough below a liquid level in the trough.

65. The construction of claim 64 wherein some of the nozzles are positioned on one side of the trough and others on an opposite side of the trough.

66. The construction of claim 63 wherein the nozzles are positioned in a line along one side of the trough.

67. The construction of claim 63 wherein some of the nozzles are positioned in a first line on a first side of the trough and others are positioned in a second line on an opposite second side of the trough.

68. The construction of claim 67 wherein the first line is in a first horizontal plane and the second line is in a second horizontal plane spaced a distance from the first horizontal plane.

69. The construction of claim 63 wherein liquid flows alternately from a source to the liquid jet and then to the nozzles and back to the liquid jets.

70. The construction of claim 63 wherein each of the nozzles has an elastomeric lining.

71. The construction of claim 63 wherein the trough is filled with product-cooling water which is substantially cooler than contents of the product when at the end of the trough to thereby cool the contents as the product is conveyed along the trough to the opposite end.

72. The construction of claim 63 wherein the trough is filled with product-heating water which is substantially hotter than contents of the product when at the end of the trough to thereby heat the contents as the product is conveyed along the trough to the opposite end.

* * * * *